(12) United States Patent
Kadota et al.

(10) Patent No.: US 7,004,018 B2
(45) Date of Patent: Feb. 28, 2006

(54) VEHICLE DRIVING FORCE CONTROL APPARATUS

(75) Inventors: Keiji Kadota, Zama (JP); Kouichi Shimizu, Sagamihara (JP); Tatsuya Kamata, Atsugi (JP); Hiroyuki Ohya, Zama (JP); Keigo Nishio, Atsugi (JP); Ping Chen, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 168 days.

(21) Appl. No.: 10/636,597

(22) Filed: Aug. 8, 2003

(65) Prior Publication Data

US 2004/0040375 A1 Mar. 4, 2004

(30) Foreign Application Priority Data

| Aug. 27, 2002 | (JP) | 2002-247554 |
| Sep. 4, 2002 | (JP) | 2002-259158 |
| Sep. 4, 2002 | (JP) | 2002-259161 |
| Sep. 4, 2002 | (JP) | 2002-259162 |
| Oct. 3, 2002 | (JP) | 2002-291241 |

(51) Int. Cl.
 *G01L 3/26* (2006.01)
 *G01L 5/13* (2006.01)
 *G01M 15/00* (2006.01)

(52) U.S. Cl. .................................. 73/116
(58) Field of Classification Search ............... 73/116; 701/85, 90, 88, 84, 55, 51, 29; 180/197, 248, 180/243; 477/14
See application file for complete search history.

(56) References Cited

U.S. PATENT DOCUMENTS

| 5,038,288 A | * 8/1991 | Moride et al. ............. 701/85 |
| 6,434,469 B1 | 8/2002 | Shimizu et al. |
| 6,442,454 B1 | 8/2002 | Akiba et al. |
| 2002/0094908 A1 | 7/2002 | Urasawa et al. |
| 2003/0010559 A1 | 1/2003 | Suzuki |
| 2003/0064858 A1 | 4/2003 | Saeki et al. |
| 2003/0089539 A1 | 5/2003 | Kadota |
| 2003/0151381 A1 | 8/2003 | Kadota et al. |

FOREIGN PATENT DOCUMENTS

| EP | 1 127 735 A | 8/2001 |
| EP | 1 205 331 A2 | 5/2002 |
| JP | 55-138129 U | 10/1980 |
| JP | 11-243604 A | 9/1999 |
| JP | 2000-079830 A | 3/2000 |
| JP | 2000-318472 A | 11/2000 |
| JP | 2001-071777 A | 3/2001 |
| JP | 2001-138764 A | 5/2001 |
| JP | 2002-218605 A | 8/2002 |
| JP | 2003-025861 A | 1/2003 |
| JP | 2003-130200 A | 5/2003 |
| JP | 2003-156079 A | 5/2003 |
| JP | 2003-209902 A | 7/2003 |
| WO | WO 01/70533 A2 | 9/2001 |

* cited by examiner

*Primary Examiner*—Eric S. McCall
*Assistant Examiner*—Octavia Davis
(74) *Attorney, Agent, or Firm*—Shinjyu Global Counselors, LLP

(57) ABSTRACT

A vehicle driving force control apparatus controls a control torque command of an electric motor based on a power supplying condition of an electric power source. The power source supplies electric power to the electric motor that drives at least one wheel of the vehicle. An electric power supplying status detecting section determines an electric power supplying capacity of the electric power source based on the power supplying condition of the power source, while an electric motor torque control section controls the control torque command of the electric motor based on the power supplying condition determined by the electric power supplying status detecting section. Preferably, an internal combustion engine that drives at least one other wheel also drives a generator that acts as the power source of the electric motor. The vehicle driving force control apparatus is especially useful in a four-wheel drive vehicle.

68 Claims, 34 Drawing Sheets

VEHICLE DRIVING FORCE CONTROL APPARATUS

BACKGROUND OF THE INVENTION

1. Field of the Invention

The present invention generally relates to a driving force control apparatus for a vehicle in which a pair of drive wheels are driven by a drive torque from an electric motor. Preferably, the electric motor is driven with electric power generated by a generator that is driven by an internal combustion engine. The present invention especially useful in an all wheel drive vehicle in which a pair of main drive wheels are driven by a main drive source, such as internal combustion engine, and a pair of subordinate drive wheels are driven by the electric motor. Thus, the invention is particularly well-suited for a so-called battery-less four-wheel drive vehicle in which the engine drives the generator and the electric power from the generator is supplied to the electric motor.

2. Background Information

One example of a conventional vehicle driving force control apparatus in which a pair of front wheels are driven with an engine, a pair of rear wheels are configured such that they can be driven with an electric motor, and a clutch and a reduction gear are installed in the torque transmission path between the motor and the rear wheel axles is presented in Japanese Laid-Open Patent Publication No. 11-243604. This publication discloses a technology in which when the vehicle shifts into a four-wheel drive state while traveling. The clutch is connected after the motor has been rotated in an unloaded state until the rotational speed of the motor equals a rotational speed corresponding to the rotational speed of the wheel axles. As a result, the occurrence of shock is avoided when the clutch is connected. This publication discloses shifting a vehicle into a four-wheel drive state such that the rear wheels are driven by an electric motor when a speed difference equal to or exceeding a prescribed value occurs between the front and rear wheels. Meanwhile, driving of the rear wheels by the electric motor is stopped when the depression amount of the accelerator pedal becomes equal to or less than a prescribed value or the vehicle speed becomes equal to or greater than a prescribed speed.

Another example of a conventional vehicle driving force control apparatus is disclosed in Japanese Laid-Open Utility Model Publication No. 55-138129 (see, page 1, FIG. 2). In this vehicle driving force control apparatus, either the front wheels or the rear wheels are treated as main drive wheels that are driven by power delivered from an internal combustion engine through a transmission, while the rear wheels or front wheels (whichever are not driven by the internal combustion engine) are driven by an electric motor. The electric motor is driven with electric power generated by a generator. The generator is driven by a driving force from the internal combustion engine. When the accelerator pedal is depressed and the vehicle speed is less than or equal to a prescribed value, the electric motor operates such that both the front wheels and rear wheels are driven.

Another example of a conventional vehicle driving force control apparatus is disclosed in Japanese Laid-Open Patent Publication No. 2000-318472. This publication discloses a vehicle driving force control apparatus for a battery-less four-wheel drive vehicle. In this vehicle driving force control apparatus, when the vehicle is traveling at or below a prescribed speed, e.g., 15 km/h, and the speed difference between the front and rear wheels reaches or exceeds a prescribed value, i.e., the acceleration slippage amount reaches or exceeds a prescribed value, a clutch is connected between the motor and the subordinate drive wheels. This clutch connection shifts the vehicle into a four-wheel drive state in which the motor is merely driven or is driven in accordance with the accelerator position. When the accelerator position is at or above a prescribed value, a fixed portion of the engine output is used to drive the generator and the electric power generated with the portion of the engine output being fed to the motor, which drives the subordinate drive wheels. Moreover, when it is time for the vehicle to shift from the four-wheel drive state to the two-wheel drive state, the motor torque command value (target motor torque) is typically reduced and the clutch is released when the target motor torque reaches or falls below a prescribed value.

In view of the above, it will be apparent to those skilled in the art from this disclosure that there exists a need for an improved driving force control apparatus. This invention addresses this need in the art as well as other needs, which will become apparent to those skilled in the art from this disclosure.

SUMMARY OF THE INVENTION

It has been discovered that vehicle driving force control apparatuses described above do not take into consideration the power supplying condition (e.g., the electric power supplying capacity, the electric power supplying limit or thee electric power shortage) of the electric power source that supplies electric power to the electric motor. For example, if the electric power source is a battery, it is conceivable that a situation might occur in which the electric motor cannot be controlled to the target torque (torque command value) because the electric power of the battery has declined for some reason. The aforementioned publications make no mention of how to accommodate such a situation.

The present invention was conceived in view of this kind of situation and one object is to provide a vehicle driving force control apparatus that the power supplying conditions of the electric power source that supplies electric power to the electric motor.

Moreover, it has been discovered that the generator controlled by the vehicle driving force control apparatuses described above cannot deliver an electric current to the electric motor if it cannot overcome the counter electromotive force of the electric motor which is driven by electric power from the generator that is driven by the internal combustion engine. More specifically, the electric power generation capacity of the generator is zero when the vehicle speed is zero and increases along a quadratic curve as the vehicle speed increases. Thus, the rate at which the electric power generation capacity increases is small when the vehicle speed is low and increases as the vehicle speed increases. Meanwhile, as indicated by the solid curve, the counter electromotive force of the electric motor is also zero when the vehicle speed is zero but increases at a constant rate of increase as the vehicle speed increases. Thus, in the range of vehicle speeds from zero to a prescribed vehicle speed Vs, the generator cannot deliver generated current to the electric motor and the electric motor cannot produce a drive torque because the electric power generation capacity of the generator is below the counter electromotive force of the motor. When the vehicle speed exceeds the prescribed vehicle speed Vs, however, the generated current of the generator increases and it becomes possible for the electric motor to produce a drive torque.

A transmission is arranged on the output side of the internal combustion engine and the rotational speed of the internal combustion engine can be varied while maintaining a constant vehicle speed by changing the gear ratio of the transmission. The electric power generation capacity of the generator, which is driven by the internal combustion engine, varies in accordance with the rotational speed of the internal combustion engine. Consequently, if, for example, the electric power generation capacity of the generator is set according to the maximum gear ratio of the transmission, which is used in the low vehicle speed region, then the rotational speed inputted to the generator will decline and a state of insufficient power generation will occur when the selected gear ratio of the transmission is smaller than the maximum gear ratio. As a result, the electric motor will not be able to produce a drive torque. This is a problem that has yet to be solved.

In particular, when an automatic transmission is used, the torque converter allows the engine rotational speed to decrease whenever the accelerator is not depressed, thus worsening the tendency for insufficient power generation to occur.

The present invention was further conceived in view of the aforementioned unsolved problem and another object is to provide a vehicle driving force control apparatus that is configured such that the electric motor can produce the required drive torque even when the generator is in a state of insufficient electric power generation.

Moreover, in the conventional four-wheel drive vehicle driving force control apparatus described above, there are times when the motor torque does not reach the command value, i.e., target motor torque, because the portion of the engine output allotted to drive the generator is fixed and the engine does not provide enough driving force to the generator to generate a sufficient quantity of electric power. For example, if the actual motor torque no longer reaches the target motor torque when it is time for the vehicle to shift from the four-wheel drive state to the two-wheel drive state, the motor torque will be below the target value before the clutch is released. Thus, when the clutch is released, there will be a gap between the actual motor torque and the motor torque prescribed value and shock may occur when the clutch is released.

The present invention was further conceived in view of this problem and another object is to provide a four-wheel drive vehicle driving force control apparatus in which shock does not occur when the clutch is released in order to shift from the four-wheel drive state to the two-wheel drive state.

The conventional technology described above is based on the idea that the occurrence of shock when the clutch is operated is caused by the rotational speed difference between the output shaft and input shaft of the clutch. It is normally believed that there is no rotational speed difference between the output shaft and the input shaft of the clutch when the clutch is being released. Consequently, based on this technological concept, shock does not occur when the clutch is released and processing to match the rotational speeds of the output shaft and the input shaft are not necessary. However, the inventors of the present invention have confirmed that there are cases in which shock does occur when releasing the clutch.

More specifically, in a system configured such that the drive sources that drive the main drive wheels and the subordinate drive wheels are separate entities and the subordinate drive wheels are only driven when necessary, when the vehicle shifts from a four-wheel drive state to a two-wheel drive state while traveling, the subordinate drive wheels will exert a torque on the clutch if the clutch is released after the motor output has gone to zero. Consequently, although there is no rotational speed difference between the input shaft and output shaft of the clutch, shock will occur if a torque greater than a prescribed torque is exerted at the clutch position.

In a system in which the motor is driven by electric power from a generator driven by the engine, the torque of the motor is affected by the rotational speed of the engine because the generator is affected by the rotational speed of the engine.

In view of this problem, the object of the present invention is to provide a vehicle driving force control apparatus that can suppress undesirable effects on the vehicle drive caused by the electric power generation capacity of the generator.

The aforementioned "torque that exceeds the prescribed clutch release torque" is defined to be the sum of the prescribed clutch release torque and a prescribed tolerance torque, and it is preferred that said torque be of such a magnitude as to ensure that sufficient electric power generation capacity can be secured to enable the motor torque to be held at the clutch release torque.

In view of the above, a vehicle driving force control apparatus of a vehicle provided with at least one first drive wheel, and a second drive wheel driven independently of the first drive wheel, the driving force control apparatus comprises a power source, an electric motor, an electric power supplying status detecting section, and an electric motor torque control section. The power source is configured to supply electric power. The electric motor is configured to be supplied with electric power from the power source and transfer a drive torque to the first drive wheel. The electric power supplying status detecting section is configured to determine an electric power supplying capacity of the power source based on a power supplying condition of the power source. The electric motor torque control section is configured to control a control torque command of the electric motor based on the power supplying condition determined by the electric power supplying status detecting section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
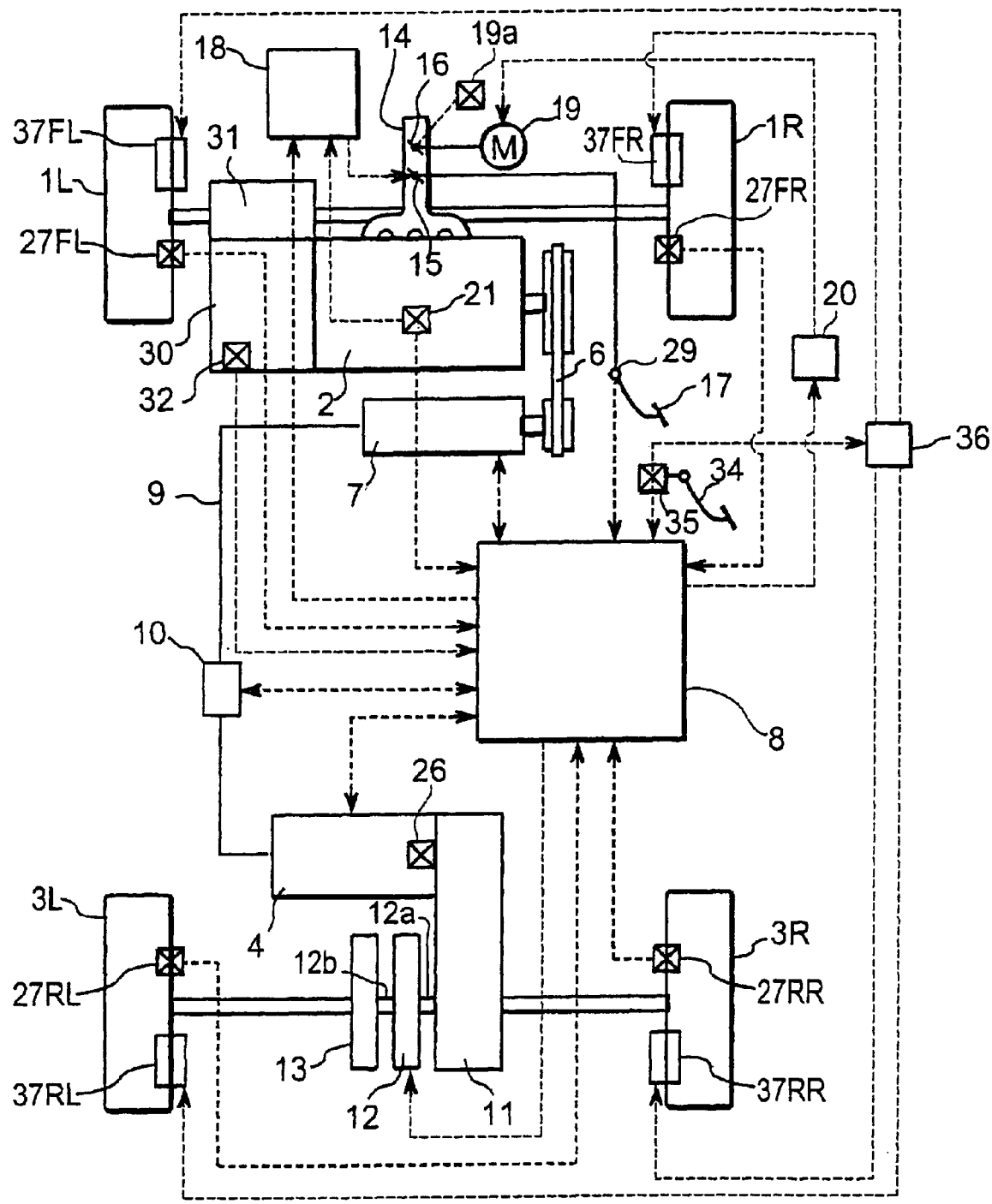
FIG. 1 is a schematic block diagram of a vehicle equipped with a vehicle driving force control apparatus in accordance with preferred embodiments of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the subsequent detailed descriptions of the present invention, the parts of the embodiments that are identical will be given the same reference numerals. Moreover, the descriptions of the component parts of the second embodiment and other embodiments, that are the same or have similar functions as corresponding component parts of the first embodiment may be simplified or omitted.

First Embodiment

Referring initially to FIGS. 1–12, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels. An endless drive belt 6 transfers power from the internal combustion engine 2 to a generator 7, which supplies electrical energy to the electric motor 4.

As explained in more detail below, the first embodiment of the present invention is particularly applicable to situations where, for example, it is determined that the output torque of the electric motor 4 is less than or equal to a prescribed threshold torque value and the vehicle will shift from a four-wheel drive state to a two-wheel drive state. In this situation, the field current Ifm of the electric motor 4 is reduced by the present invention for reducing the motor torque Tm of the electric motor 4. Thus, in such cases, the present invention makes it possible to control the motor torque Tm of the electric motor 4 to a torque that is less than or equal to the maximum torque of the electric motor 4 as determined in accordance with the electric power generation capacity limit by setting the field current reduction rate at which the field current Ifm is reduced such that the smaller the electric power generation capacity limit is, the larger the field current reduction rate becomes.

The generator 7 rotates at a rotational speed Nh that is equal to the product of the rotational speed Ne of the internal combustion engine 2 and the pulley ratio of the endless drive belt 6. The load placed on the internal combustion engine 2 by the generator 7 due to the field current Ifh of the generator 7 is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner.

The clutch 12 is preferably an electromagnetic clutch having an input shaft 12a coupled to the electric motor 4 via the reduction gear 11 and an output shaft 12b coupled to the rear wheels 3L and 3R via the differential gear 13. Preferably, the clutch 12 is turned on to perform an engagement operation in which the input and output shafts 12a and 12b are connected such that the drive torque from the electric motor 4 is transmitted to the rear wheels 3L and 3R. When the clutch 12 is turned off, a disengagement or release operation occurs in which the input and output shafts 12a and 12b are disengaged such that the drive torque from the electric motor 4 is no longer transmitted to the rear wheels 3L and 3R. Thus, when the clutch 12 is engaged, the vehicle is in a four-wheel (multi-wheel) drive state in which all of the wheels 1L, 1R, 3L and 3R are driven. When the clutch 12 is released, the vehicle is in a two-wheel (non-all wheel) drive state in which only the front wheels 1L and 1R are driven by the internal combustion engine 2. It is preferable in accordance with the present invention to release the clutch 12, during the vehicle traveling, such that substantially no shock occurs in the vehicle, or at least the shock to the vehicle is below a prescribed limit. Preferably, the clutch 12 is released in accordance with the present invention when the vehicle is traveling such that the drive torque of the electric motor 4 is sufficient to avoid a vehicle shock above a prescribed limit.

A main throttle valve 15 and a sub throttle valve 16 are disposed inside the intake passage 14 (e.g., an intake manifold) of the internal combustion engine 2. The throttle opening of the main throttle valve 15 is adjusted/controlled in accordance with the amount of depression of the accelerator pedal 17. In order to adjust the throttle opening of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 29 that detects the depression amount of the accelerator pedal 17 or the degree of opening of the main throttle valve 15. The depression amount detection value from the accelerator sensor 29 is outputted as a control signal to the 4WD controller 8. The accelerator sensor 29 constitutes an acceleration or throttle instruction sensor, which can also be referred to as an accelerator pedal position detecting section or an acceleration instruction detecting section. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening. Specifically, the throttle opening of the sub throttle valve 16 is adjusted/controlled by the rotational angle of the stepper motor 19, which corresponds to the step count. The rotational angle of the stepper motor 19 is adjusted/controlled by a drive signal from the motor controller 20. The sub throttle valve 16 is provided with a throttle sensor 19a shown in FIG. 2. The throttle sensor 19a constitutes or functions an acceleration or throttle instruction device or sensor, which can also be referred to as a throttle opening detecting section or an acceleration instruction detecting section. The step count of the stepper motor 19 is feedback-controlled based on the throttle opening detection value detected by this throttle sensor 19a. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed Ne of the internal combustion engine 2. The engine rotational speed sensor 21 outputs a control signal that is indicative of the engine rotational speed Ne to both the engine controller 18 and the 4WD controller 8.

As shown in the FIG. 1, the engine output torque Te of the internal combustion engine 2 is transferred to the left and right front wheels 1L and 1R through an automatic transmission 30 using a torque converter and a differential gear 31 in a conventional manner. A portion of the engine output torque Te of the internal combustion engine 2 is transferred to the generator 7 using the endless drive belt 6 to supply electrical energy to the electric motor 4. In other words, the generator 7 is rotated at a rotational speed Nh, which is obtained by multiplying the rotational speed Ne of the internal combustion engine 2 by the pulley ratio of the endless drive belt 6.

The transmission 30 is provided with a shift position detecting device or sensor 32 (gear ratio detecting section or device) that is configured and arranged to detect the current gear range of the automatic transmission 30. The shift position detecting sensor 32 is configured and arranged to output or send a detected shift position signal that is indicative of the current gear range of the transmission 30 to the 4WD controller 8.

A brake pedal 34 is provided that constitutes a brake instructing/operating section. The stroke amount of the brake pedal 34 is detected by a brake stroke sensor 35, which constitutes a brake operation amount sensor or sensing section. The brake stroke sensor 35 outputs the brake stroke amount it detects to a brake controller 36 and the 4WD controller 8.

The brake controller 36 controls the braking force acting on the vehicle by controlling the braking devices (e.g., disc brakes) 37FL, 37FR, 37RL and 37RR installed on the wheels 1L, 1R, 3L and 3R in response to the inputted brake stroke amount by the brake pedal 34.

Figure 2:
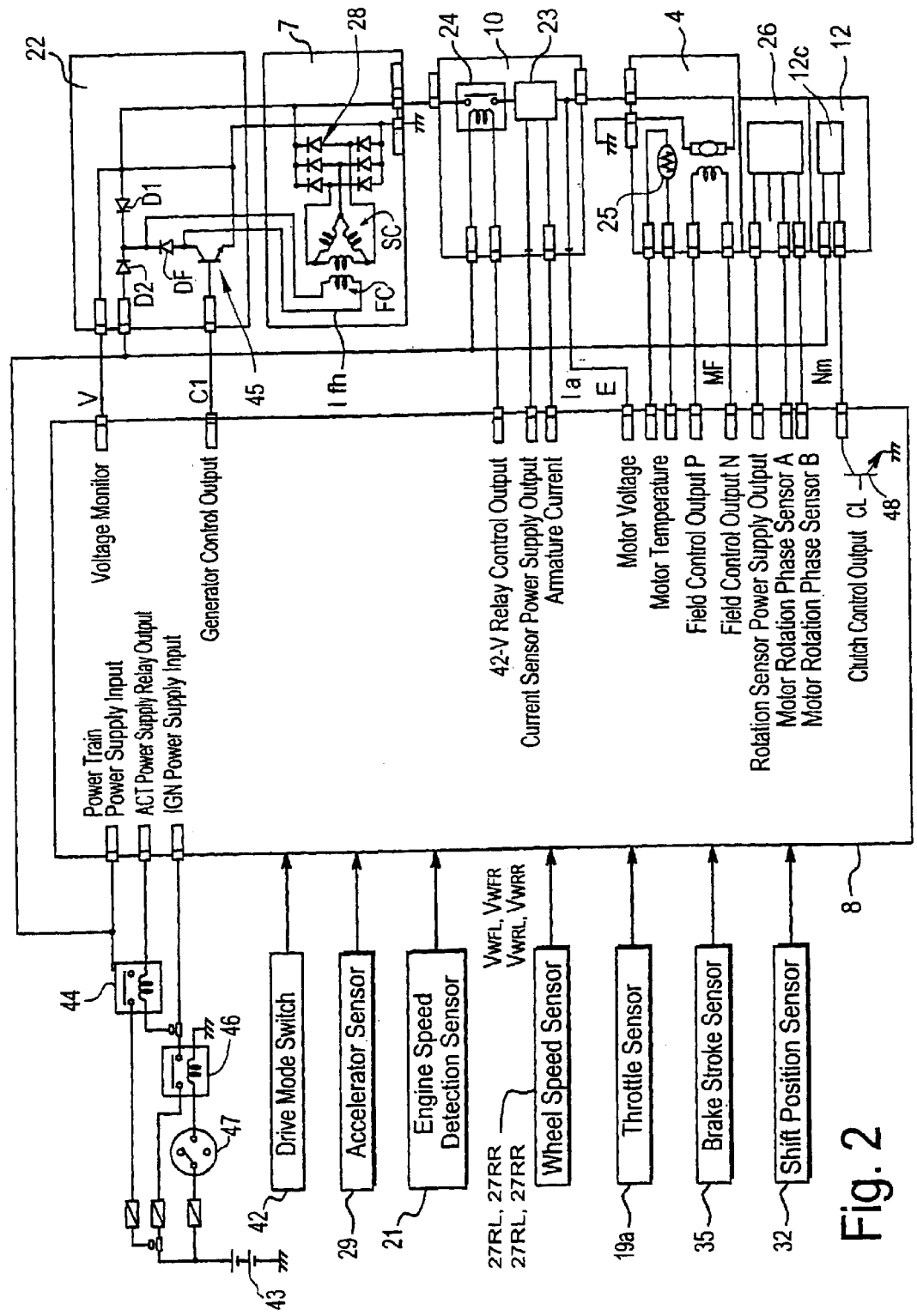
FIG. 2 is a block diagram showing a control system configuration for the vehicle driving force control apparatus illustrated in FIG. 1 in accordance with the illustrated embodiments of the present invention.

As shown in FIG. 2, the generator 7 is equipped with a voltage adjuster 22 (regulator) for adjusting the output voltage V. The 4WD controller 8 controls the generator load torque Th against the internal combustion engine 2 and the generated voltage V by adjusting the field current Ifh such as controlling a generator control command value C1 (duty ratio or field current value). The voltage adjuster 22 receives the generator control command value C1 (duty ratio or field current value) from the 4WD controller 8 and adjusts the field current Ifh of the generator 7 to a value corresponding to the generator control command value C1. The voltage adjuster 22 is also configured and arranged to detect the output voltage V of the generator 7 and then output the detected voltage value to the 4WD controller 8.

Additionally, the rotational speed Nh of the generator 7 can be computed based on the rotational speed Ne of the internal combustion engine 2 and the pulley ratio of the endless drive belt 6.

A current sensor 23 is provided inside the junction box 10. The current sensor 23 detects the current value Ia of the electrical power supplied from the generator 7 to the electric motor 4 and outputs a detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a control command from the 4WD controller 8.

Thus, the control command from the 4WD controller 8 is executed by processing in the 4WD controller 8 that constitutes a field current adjusting or controlling section for controlling the field current Ifm of the electric motor 4. Thus, the adjustment of the field current Ifm by the 4WD controller 8 adjusts the drive torque Tm of the electric motor 4. A thermistor 25 measures the temperature of the electric motor 4 and produces a control signal indicative of the temperature of the electric motor 4 that is outputted to the 4WD controller 8.

The vehicle driving force control apparatus is also equipped with a motor rotational speed sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor of the clutch 12.

The clutch 12 is preferably an electromagnetic clutch that connects and disconnects in response to a clutch control command issued from the 4WD controller 8. Of course, a hydraulic clutch can be used for clutch 12 is certain situations to carry out the present invention. Thus, the clutch 12 transmits torque from the electric motor 4 to the rear wheels 3L and 3R at a torque transfer rate corresponding to the clutch control command from the 4WD controller 8.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12.

As shown in FIG. 2, the generator 7 has a three-phase stator coil SC connected in a delta formation and a field coil FC. Each of the connection nodes of the stator coil SC is connected to a rectifying circuit 28 made up of diodes and the rectifying circuit 28 delivers a maximum DC voltage V of, for example, 42 V.

One end of the field coil FC is connected to the output side of the rectifying circuit 28 through a diode D1 and to a battery 43 of a prescribed voltage (e.g., 12 volts) through a diode D2 in the reverse direction and a 4WD or 12-volt relay 44. The other end of the field coil FC is connected to the cathode sides of the diodes D1 and D2 through a flywheel diode DF in the forward direction, and is grounded through a bipolar transistor 45.

The 12-volt battery 43 supplies operating electric power to the 4WD controller 8 with the 12-volt relay 44 that is installed in the 12-volt electric power supply line in order to connect and disconnect the power to the clutch 12, which is preferably an electromagnetic clutch.

The circuitry that supplies the field current Ifh through the rectifying circuit 28 and the diode D1 forms a self excited circuit and the circuitry that supplies the field current Ifh through the battery 43 and the diode D2 forms a separately excited circuit. The diodes D1 and D2 function as a select-high mechanism that selects the higher voltage between the voltage of the self excited circuit and the voltage of the separately excited circuit.

The 4WD or 12-volt relay 44 is configured such that one end of its relay coil is connected to the output side of an ignition relay 46 that is connected to the battery 43 through an ignition switch 47 and the other end of the relay coil connected to the 4WD controller 8.

The generator load torque Tg that the generator 7 imposes on the engine 2 and the generated voltage V are controlled by the 4WD controller 8 by adjusting the field current Ifh going through the field coil FC. The bipolar transistor 45 receives a pulse width modulated (PWM) generator control command (duty ratio or field current value) C1 from the 4WD controller 8 and adjusts the value of the field current Ifh of the generator 7 in accordance with the generator control command C1.

The motor relay 24 and the current sensor 23 are connected in series inside the junction box 10. The motor relay 24 connects and disconnects the electric power supplied to the electric motor 4 in accordance with a command from the 4WD controller 8. The current sensor 23 detects the armature current Ia supplied to the electric motor 4 from the generator 7 and outputs the detected armature current Ia to the 4WD controller 8. The motor voltage Vm of the electric motor 4 is detected at the 4WD controller 8.

The field current Ifm of the electric motor 4 is controlled by a pulse width modulated field current control command, i.e., motor output torque command, from the 4WD controller 8 and the drive torque Tm is adjusted by adjusting the field current Ifm. The temperature of the electric motor 4 is detected by the thermistor 25 and the temperature detection value is fed to the 4WD controller 8. The rotational speed Nm of the output shaft of the electric motor 4 is detected by the motor rotational speed sensor 26 and the rotational speed Nm is also fed to the 4WD controller 8.

The electric clutch 12 has an excitation coil 12c having one end connected to the output side of the 4WD relay 44 and the other end connected to the 4WD controller 8. Inside of the 4WD controller 8, the other end of the excitation coil 12c is connected to ground via a switching transistor 48 that serves as a switching element. The current in the excitation coil 12c is controlled by a pulse width modulated clutch control command CL supplied to the base of the transistor 48. As a result, the torque transmitted to the rear wheels 3L and 3R (subordinate drive wheels) from the electric motor 4 is controlled.

Figure 3:
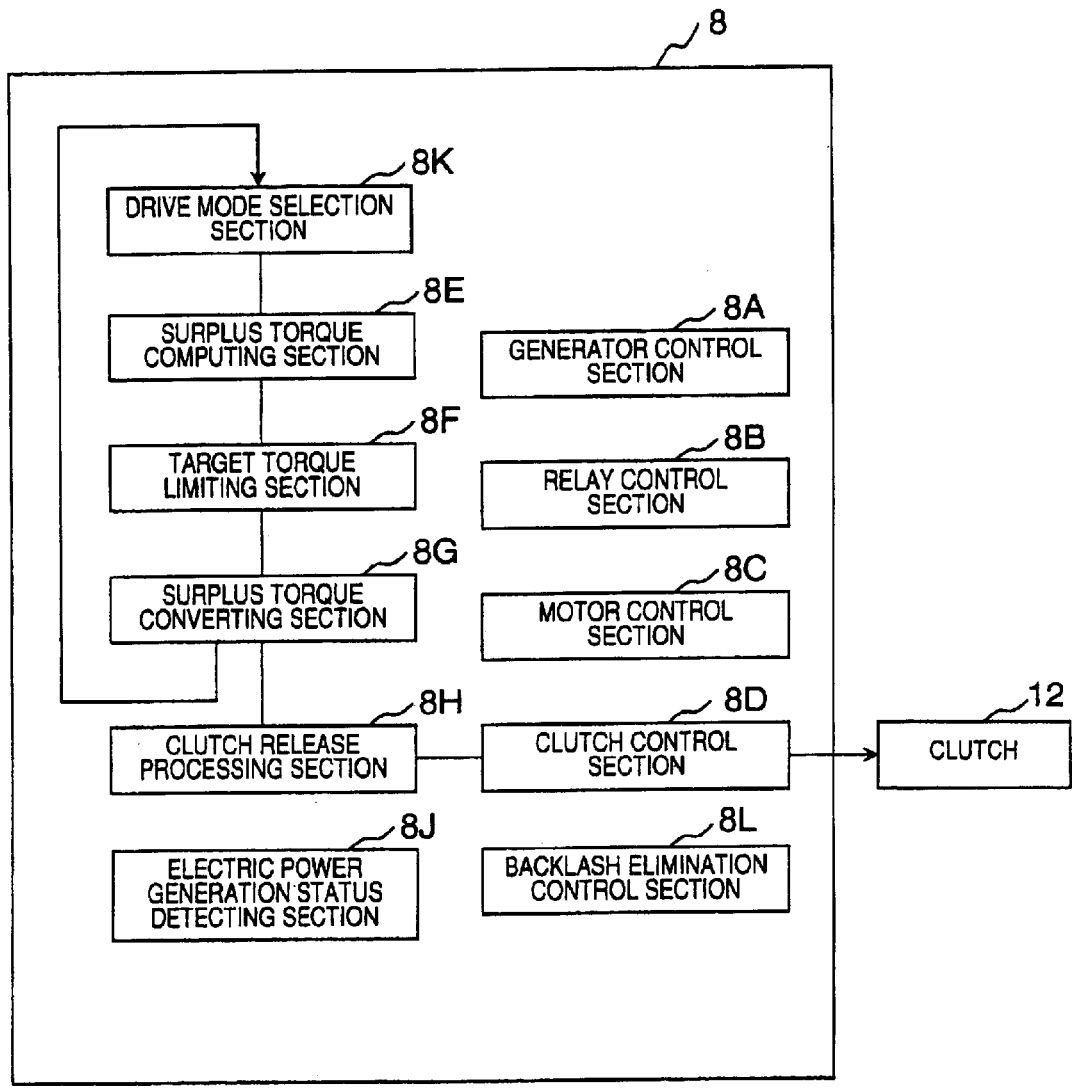
FIG. 3 is a block diagram showing the 4WD controller for the vehicle driving force control apparatus illustrated in FIG. 1 in accordance with the illustrated preferred embodiments of the present invention.

As shown in FIG. 3, the 4WD controller 8 is equipped with a generator control section 8A, a relay control section 8B, a motor control section 8C, a clutch control section 8D, a surplus torque computing section 8E, a target torque limiting section 8F, a surplus torque converting section 8G, a clutch release processing section 8H, an electric power generation (supplying) status detecting section 8J, a drive mode selection section 8K, and a backlash or play elimination control section 8L. The clutch release processing section 8H constitutes or includes an output shaft stop estimating section, an input shaft stop estimating section, and a clutch connection command outputting section. However, in this first embodiment of the present invention, the 4WD controller 8 does not utilize the backlash elimination control section 8L. Of course, it will become apparent to those skilled in the art from this disclosure that the backlash elimination control section 8L can be incorporated into this first embodiment as needed and/or desired.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

Through the bipolar transistor 45 of the voltage adjuster 22, the generator control section 8A monitors the generated voltage V of the generator 7 and adjusts the generated voltage V of the generator 7 to the required voltage by adjusting the field current Ifh of the generator 7. Thus, the generator control section 8A includes a generation load torque adjusting section as discussed below. The relay control section 8B controls shutting off and connecting the electrical power supply from the generator 7 to the electric motor 4. The motor control section 8C adjusts the field current Ifm of the electric motor 4 in order to adjust the torque of the electric motor 4 to the required value. The clutch control section 8D controls the state of the clutch 12 by outputting a clutch control command to the clutch 12.

The vehicle driving force control apparatus is also equipped with a drive mode or 4WD switch 42 that allows the driver to manually select either a two-wheel (non-all wheel) drive mode or a four-wheel (multi-wheel) drive mode. The drive mode switch 42 is configured and arranged to output to the 4WD controller 8 a control signal that is indicative of the selected or designated drive mode to the 4WD controller 8. In other words, the drive mode switch 42 of the present invention constitutes the drive mode selection section 8K that is configured to select one of a multi-wheel drive mode and a non-all wheel drive mode. Thus, the 4WD controller 8 has a clutch connection command outputting section that is configured to output a clutch connection command 12 to connect the clutch 12 when the four-wheel drive mode has been designated. When the present invention is utilized in vehicles equipped with more than four wheels or without an all wheel drive mode, the multi-wheel drive mode refers to a mode in which at least one of (main) drive wheel driven by a first (main) drive source is driven and at least one second (subordinate) drive wheel driven by a second (subordinate) drive source with a clutch disposed between the second drive wheel and the second drive source is driven. In this situation, a non-all wheel drive mode refers to a mode in which at least the clutch disconnects the second (subordinate) drive source from the second (subordinate) wheel.

Figure 4:
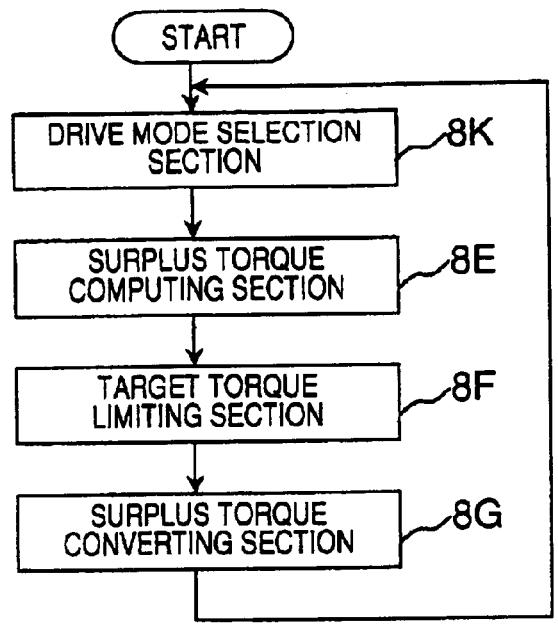
FIG. 4 is a flow chart showing the processing sequence executed by the 4WD controller for the vehicle driving force control apparatus illustrated in FIG. 1 in accordance with the illustrated embodiments of the present invention.

As shown in FIG. 4, at a prescribed sampling time cycle, the 4WD controller 8 executes the processing of the drive mode selection section 8K, the surplus torque computing section 8E, the target torque limiting section 8F, and the surplus torque converting section 8G in sequence based on the input signals. Together, the drive mode selection section 8K, the surplus torque computing section 8E, the target torque limiting section 8F, and the surplus torque converting section 8G constitute an output torque control section of the 4WD controller 8.

Figure 5:
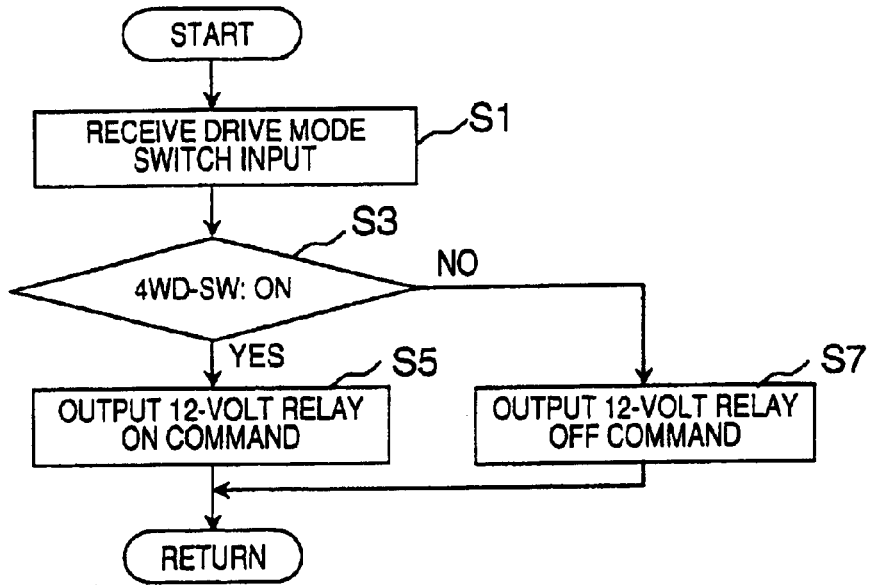
FIG. 5 is a flow chart showing the processing sequence executed by the drive mode selection section of the 4WD controller for the vehicle driving force control apparatus illustrated in FIG. 1 in accordance with the illustrated embodiments of the present invention.

First, the processing shown in FIG. 5 is executed by the drive mode selection section 8K in step S1, mode information is received from the drive mode switch 42, while in step S3, the 4WD controller 8 determines if a four-wheel drive mode or a two-wheel drive mode has been selected. If the four-wheel drive mode has been selected, the 4WD controller 8 proceeds to step S5. If the two-wheel drive mode has been selected the 4WD controller 8 proceeds to step S7.

In step S5, the 4WD controller 8 outputs a 12-volt relay ON command such that electric power is supplied to activate the clutch 12 and the 4WD controller 8 returns to the beginning of the control loop. Meanwhile, in step S7, the 4WD controller 8 outputs the 12-volt relay OFF command such that electric power is shut off to the clutch 12 and the 4WD controller 8 returns to the beginning of the control loop.

Next, the surplus torque computing section 8E will be discussed which executes the processing shown in FIG. 6. First, in step S110, the wheel speeds computed based on the signals from the wheel speed sensors 27FL, 27FR, 27RL and 27RR are used to subtract the wheel speed of the rear wheels 3L and 3R (subordinate drive wheels) from the wheel speed of the front wheels 1L and 1R (main drive wheels) and find the slippage speed ΔVF, which is the magnitude of the acceleration slippage of the front wheels 1L and 1R. Then, the 4WD controller 8 proceeds to step S20.

The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (1) and (2):

$$V_{Wf}=(V_{Wfl}+V_{Wfr})/2 \quad (1)$$

$$V_{Wr}=(V_{Wrl}+V_{Wrr})/2 \quad (2).$$

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as set forth in the following Equation (3):

$$\Delta V_F = V_{Wf} - V_{Wr} \quad (3)$$

In step S20, the 4WD controller 8 determines whether or not the calculated slippage speed $\Delta V_F$ exceeds a prescribed value, such as zero. Thus, steps S10 and S20 constitute an acceleration slippage detection section that estimates if acceleration slippage is occurring in the front wheels 1L and 1R that is driven by the internal combustion engine 2. If slippage speed $\Delta V_F$ is determined to be zero or below, it is estimated that the front wheels 1L and 1R are not experiencing acceleration slippage and the 4WD controller 8 proceeds to step S30, where a target generator load torque Th is set to zero and the 4WD controller 8 returns to the beginning of the control loop.

Conversely, if in step S20 slippage speed $\Delta V_F$ is determined to be larger than zero, it is estimated that the front wheels 1L and 1R are experiencing acceleration slippage, and thus, control proceeds to step S40. In step S40, the absorption torque $T\Delta V_F$ required for suppressing the acceleration slippage of the front wheels 1L and 1R is calculated using the equation below and the 4WD controller 8 proceeds to step S50. The absorption torque $T\Delta V_F$ is an amount that is proportional to the acceleration slippage magnitude, as set forth in the following Equation (4):

$$T\Delta V_F = K1 \times \Delta V_F \quad (4)$$

where: K1 is a gain that is found through experimentation or the like.

In step S50, a current load torque TG of the generator 7 is calculated based on the Equation (5) below, and then the 4WD controller 8 proceeds to step S60.

$$TG = K2 \frac{V \times Ia}{K3 \times Nh} \quad (5)$$

where: V: voltage of the generator 7,
Ia: armature current of the generator 7,
Nh: rotational speed of the generator 7,
K3: efficiency, and
K2: coefficient.

In step S60, the surplus torque, i.e., the target generator load torque Th that the generator 7 should impose, is found based on the Equation (6) stated below, and the 4WD controller 8 returns to the beginning of the control loop.

$$Th = TG + T\Delta V_F \quad (6)$$

Next, the processing executed by the target torque (control) limiting section 8F will be explained based on FIG. 7. The processing of the target generator load torque Th in the flow chart of FIG. 7 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step S110, the target torque limiting section 8F of the 4WD controller 8 determines whether or not the target generator load torque Th is larger than the maximum load capacity HQ of the generator 7. The 4WD controller 8 proceeds to the beginning of the control program to repeat the processing if the 4WD controller 8 determines that target generator load torque Th is less than or equal to the maximum load capacity HQ of the generator 7. Conversely, the 4WD controller 8 proceeds to step S120 if the 4WD controller 8 determines that the target generator load torque Th is larger than the maximum load capacity HQ of the generator 7.

In step S120, the excess torque ΔTb, which is the portion of target generation load torque Th that exceeds the maxi mum load capacity HQ, is found according to the following Equation (7):

$$\Delta Tb = Th - HQ. \qquad (7)$$

Then, the 4WD controller 8 proceeds to step S130.

Figure 8:
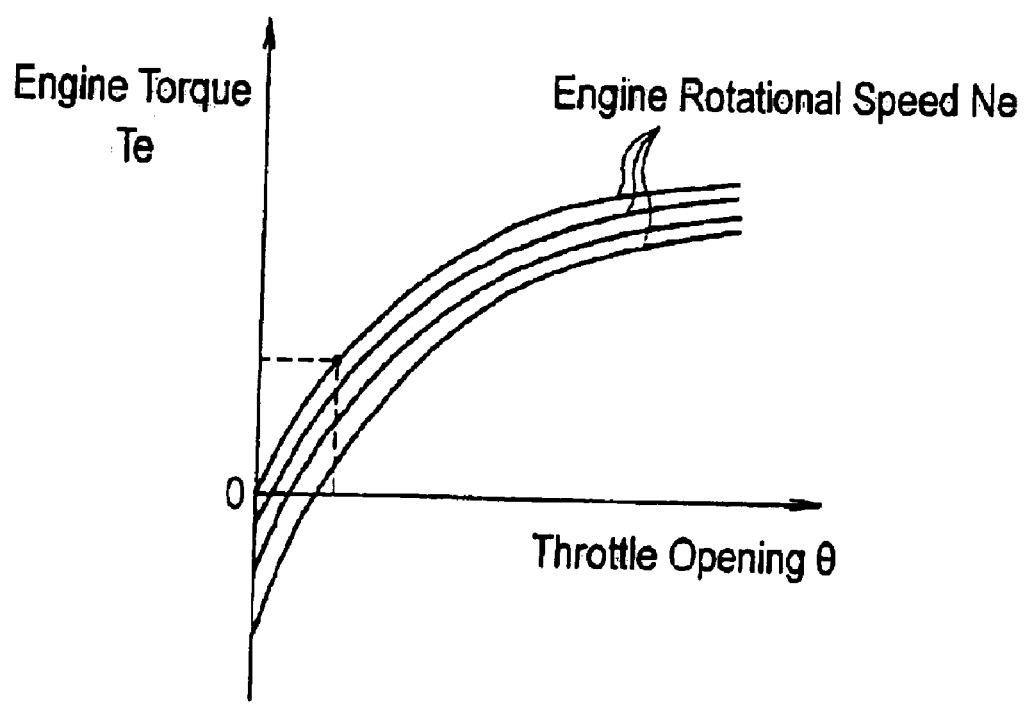
FIG. 8 is an engine torque calculation map showing the relationship between the throttle opening θ and the engine torque Te for different engine rotational speeds Ne.

In step S130, the current engine torque Te is computed based on the signals from the throttle sensor 19a and the engine rotational speed sensor 21 using engine torque calculation map shown in FIG. 8. Then, the 4WD controller 8 proceeds to step S140.

In step S140, the engine torque upper limit value TeM is calculated by subtracting the excess torque ΔTh from the engine torque Te, as set forth in the following Equation (8):

$$TeM = Te - \Delta Tb. \qquad (8)$$

After the engine torque upper limit value TeM is outputted to the engine controller 18, the 4WD controller 8 proceeds to step S150.

In step S150, the maximum load capacity HQ is assigned as the target generation load torque Th, and then the 4WD controller 8 returns to the beginning of the control loop.

Next, the processing executed by the surplus torque converting section 8G of the 4WD controller 8 will be explained based on FIG. 9. First, in step S200, the 4WD controller 8 determines if the target generator load torque Th is larger than 0. If the target generator load torque Th is determined to be larger than 0, then the 4WD controller 8 proceeds to step S210 because the front wheels 1L and 1R are experiencing acceleration slippage. If the 4WD controller 8 determines that the target generator load torque Th is less than or equal to 0, then the 4WD controller 8 returns to the beginning of the control loop because the front wheels 1L and 1R are not experiencing acceleration slippage.

In step S210, the 4WD controller 8 determines if the target motor torque, i.e., the torque command value sent to the electric motor 4, is decreasing. The 4WD controller 8 proceeds to step S220 if the target motor torque is decreasing and to step S230 if the target motor torque is not decreasing.

It is acceptable to determine if the target motor torque is decreasing by simply comparing the current target motor torque with the target motor torque from the previous processing cycle using Equation (9) below:

$$Tm(n-1) - Tm(n-2) < 0 \qquad (9)$$

In Equation (9), the subscript (n−1) indicates that the target motor torque is from one processing cycle previous and the subscript (n−2) indicates that the target motor torque is from two processing cycles previous. However, in order to suppress the effects of noise, it is also acceptable to determine if the target motor torque is decreasing based on target motor torque values from three or more previous cycles (for example, the equation shown below uses values from six processing cycles). It is also acceptable to determine that the target motor torque is decreasing when the target motor torque decreases continuously over a plurality of processing cycles using the Equation (10) below:

$$[Tm(n-1) + Tm(n-2) + Tm(n-3)] - [Tm(n-4) + Tm(n-6)] < 0 \qquad (10)$$

In step S220, the 4WD controller 8 determines if the target motor torque Tm(n−1) is less than or equal to a prescribed threshold torque value (T−TM1) at which the clutch 12 should be released, such as when the vehicle shifts from the four-wheel drive state or mode to the two-wheel drive state or mode. Thus, the program of step S220 constitutes a target drive torque determining section that is configured to determine whether the drive torque of the electric motor 4 is at most equal to a prescribed threshold torque by comparing the target motor torque Tm(n−1) to the prescribed threshold torque value (T−TM1). If the target motor torque Tm(n−1) is determined to be less than or equal to the prescribed threshold torque value (T−TM1), the 4WD controller 8 proceeds to step S240. If it is greater than the prescribed threshold torque value (T−TM1), the 4WD controller 8 proceeds to step S230 so as to execute normal processing.

In step S230, the rotational speed Nm of the electric motor 4 detected by motor rotational speed sensor 26 is received as input. The target motor field current Ifmt corresponding to the rotational speed Nm of the electric motor 4 is calculated and the target motor field current Ifmt is outputted to the motor control section 8C. Then, the 4WD controller 8 proceeds to step S280.

The target motor field current Ifmt corresponding to the rotational speed Nm of the electric motor 4 is held to a fixed prescribed current value when rotational speed Nm is below a prescribed rotational speed and the field current Ifm of the electric motor 4 is reduced by a known weak magnetic field control method when the electric motor 4 is rotating above a prescribed rotational speed. In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm(n) is obtained by reducing the field current Ifm of the electric motor 4 and lowering the required motor induced voltage E. As a result, even if the electric motor 4 rotates at a high speed, the required motor torque Tm(n) can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque Tm(n) by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm(n) can be obtained because the motor induced voltage E of the electric motor 4 is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

Meanwhile, if the target motor torque Tm(n−1 is determined to be less than or equal to the clutch release torque (T−TM1), the 4WD controller 8 proceeds to step S240. In step S240, the 4WD controller 8 determines whether the field current Ifm is larger than a prescribed (end-time) field current limit value (D-Ifm). If so, the 4WD controller 8 proceeds to step S250. If the field current Ifm is less than or equal to the prescribed field current limit value (D-Ifm), the 4WD controller 8 proceeds to step S280 where it keeps the field current Ifm at the prescribed field current limit value (D-Ifm).

The prescribed field current limit value (D-Ifm) is the minimum field current value at which the electric motor 4 is capable of generating very small torque. Setting the limit value to such a small value serves to curb power consumption during two-wheel drive operation. Needless to say, it is acceptable for the prescribed field current limit value (D-Ifm) to be larger than the minimum field current value at which the electric motor 4 is capable of generating very small torque. In other words, it will be apparent to those skilled in the art from this disclosure that the end-time field current value D-Ifm may also be greater than the minimum field current value at which the electric motor 4 can generate a minute torque.

In step S250, the 4WD controller 8 determines if the accelerator position (ACC) or the corresponding throttle opening is less than 4% based on the signal from the accelerator sensor 29 or a corresponding throttle opening sensor. If the accelerator position or the corresponding throttle opening is less than 4%, the 4WD controller 8 proceeds to step S260. Otherwise, the 4WD controller 8 proceeds to step S270.

An accelerator position or the corresponding throttle opening (detected accelerator position opening degree) of less than 4% indicates that the accelerator pedal 17 is not being depressed at all or is not being depressed enough (i.e., the acceleration instruction amount is not large enough) to affect the acceleration of the vehicle. In other words, the phrase "the accelerator position opening degree is less than 4%" refers to an acceleration indicating amount sufficient to exclude the effect of the vehicle on the acceleration irrespective of whether the accelerator pedal 17 is depressed or in a state in which it is not depressed.

In step S260, the 4WD controller 8 reduces the field current by the amount of a first reduction value Dif1 and outputs the new field current Ifm to the motor control section 8C before proceeding to step S280.

Meanwhile, in step S270, the 4WD controller 8 reduces the field current by the amount of a second reduction value Dif2 and outputs the new field current Ifm to the motor control section 8C before proceeding to step S280.

The second reduction value Dif2 is set to a smaller value than the first reduction value Dif1. As a result, the decrease or change rate at which the field current value is reduced toward the prescribed field current limit value (D-Ifm) is larger when the accelerator position is less than 4% so that the prescribed field current limit value (D-Ifm) can be reached sooner.

Although in the preceding explanation, the reduction value by which the field current Ifm is reduced is set to one of two different values based on whether or not the accelerator pedal is depressed in an effectual way (i.e., whether or not there is an effectual acceleration instruction), it is also acceptable to set the reduction value of the field current Ifm to one of three or more different values or to vary the reduction value in a continuous manner in accordance with the acceleration instruction amount.

In step S280, the induced voltage E of the electric motor 4 is calculated based on the target motor field current Ifmt and the rotational speed Nm of the electric motor 4. Then, the 4WD controller 8 proceeds to step S290.

In step S290, the 4WD controller 8 uses a map or the like to calculate the corresponding target motor torque Tm(n) based on the generator load torque Th computed by the surplus torque computing section 8E and then proceeds to step S300.

In step S300, the 4WD controller 8 executes the clutch release processing section 8H and then proceeds to step S310.

The clutch release processing section 8H constitutes a clutch releasing section. In the clutch release processing section 8H, the clutch release command is issued when it is determined that the current target motor torque Tm(n) is approximately equal to the clutch disconnection torque, i.e., when the Equation (11) below is satisfied.

$$Tf-\alpha \leq Tm(n) \leq Tf+\alpha \qquad (11)$$

where: α is the tolerance value.

The clutch disconnection or release torque Tf is the torque of the electric motor 4 at the moment when the clutch 12 is to be released and the acceleration of the clutch input shaft 12a and the acceleration of the clutch output shaft 12b are approximately equal, i.e., when the torque at the clutch 12 is approximately zero. It is preferred to correct the clutch disconnection torque Tf by an appropriate amount to compensate for the response delay of the clutch operation.

The clutch disconnection torque Tf is calculated using a map and computations based on such factors as the vehicle acceleration and the friction in the torque transmission path to the rear wheels, or is a value determined experimentally, and serves as the motor torque value required to achieve zero torque at the clutch 12 in accordance with the traveling state of the vehicle. The clutch disconnection torque Tf corresponds to the sum of the torque due to friction of the electric motor 4 and the reduction gear 11 and the torque required to accelerate the electric motor 4 and the reduction gear 11 at the same acceleration rate as the rear wheels 3L and 3R, but comprises only the torque due to friction of the electric motor 4 and the reduction gear 11 when during normal travel. It is also acceptable for the clutch disconnection torque Tf to be a fixed value determined experimentally.

In step S310, the 4WD controller 8 uses the target motor torque Tm(n) of the current cycle and the target motor field current Ifmt as variables to calculate the corresponding target armature current Ia and then proceeds to step S320.

In step S320, the 4WD controller 8 computes the duty ratio C1, which serves as the generator control command value, based on the target armature current Ia and outputs the same before returning to the beginning of the control loop.

Figure 10:
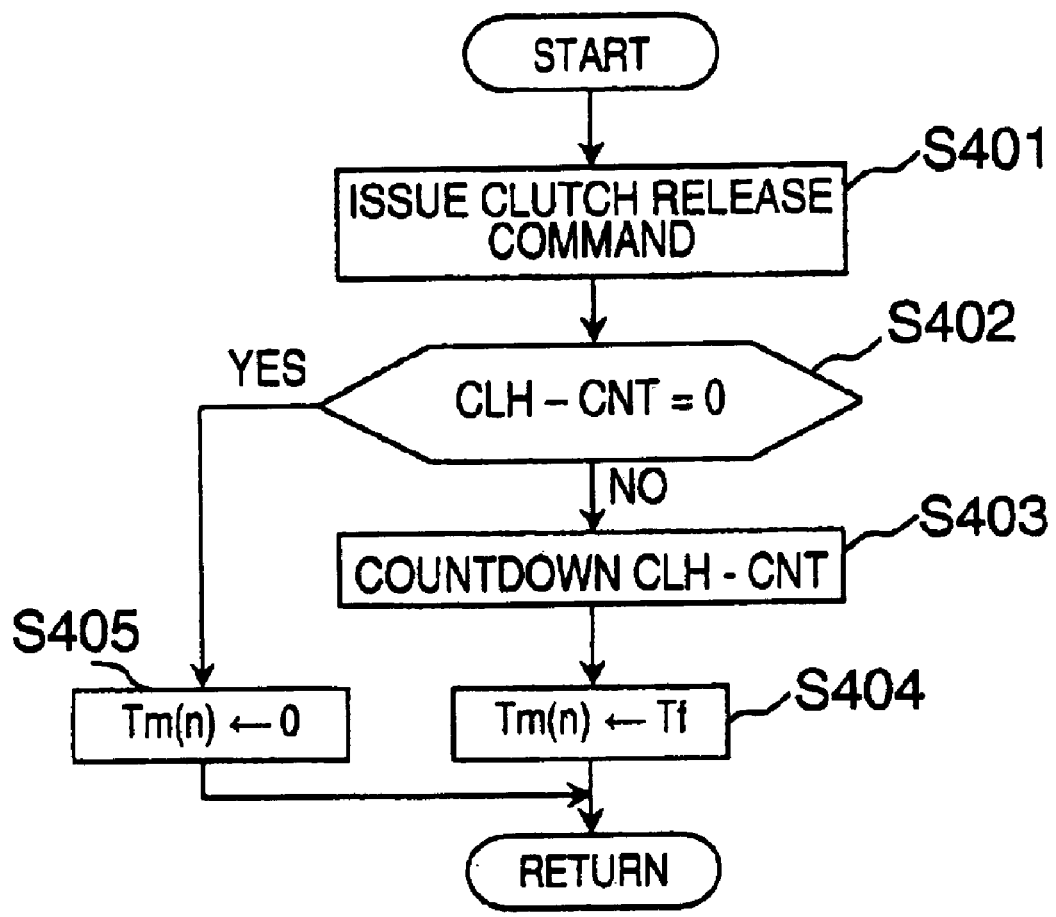
FIG. 10 is a flow chart showing the processing sequence executed by the clutch release processing section for the vehicle driving force control apparatus illustrated in FIG. 1 in accordance with the first embodiment of the present invention.

The clutch release processing section 8H will now be described with reference to FIG. 10.

The clutch release processing section 8H starts up when it is time for the vehicle to shift from the four-wheel drive state to the two-wheel drive state. In step S401, the 4WD controller 8 outputs the clutch release command and proceeds to step S402. There is a clutch response delay time that elapses between the time when the clutch release command is issued and the time when the clutch 12 is actually released, but this clutch response delay time is ascertained in advance.

In step S402, the 4WD controller 8 determines if the torque holding time counter CLH-CNT is zero. If the torque holding time counter CLH-CNT is zero, the 4WD controller 8 proceeds to step S405 where it sets the target motor torque Tm(n) to zero so as to stop the motor torque from being held at fixed value and then returns to the beginning of the control loop.

Meanwhile, if the torque holding time counter CLH-CNT is larger than zero, the 4WD controller 8 proceeds to step S403 where it counts down the torque holding time counter CLH-CNT. In step S404, the 4WD controller 8 sets Tm(n) equal to Tm(n−1) to assign the clutch release torque Tf as the target motor torque Tm(n) in order to hold the target motor torque Tm(n) at the fixed value of the clutch release torque Tf. The 4WD controller 8 then returns to the beginning of the control loop.

The aforementioned torque holding time counter CLH-CNT is initialized while the vehicle is in the four-wheel drive state. The torque holding time counter CLH-CNT is initialized to a value that absorbs the fluctuations in the clutch response delay and ensures that the clutch 12 is released reliably when the actual motor torque value is substantially held at the clutch release torque Tf.

The clutch release processing section 8H constitutes a clutch release section and a clutch release torque control section.

Next, the processing executed by the engine controller 18 will be described with reference to FIG. 11. In accordance with a prescribed sampling time cycle, the engine controller 18 executes the processing show in FIG. 11 based on the input signals.

In step S610, the engine controller 18 computes the target output torque TeN requested by the driver based on the detection signal from the accelerator sensor 29 and then proceeds to step S620.

In step S620, the engine controller 18 determines if the output torque upper limit TeM has been received from the 4WD controller 8. If it is determined that the output torque limit has been received, the engine controller 18 proceeds to step S630. Otherwise, the engine controller 18 proceeds to step S670.

In step S630, the engine controller 18 determines if the output torque upper limit TeM is larger than the target output torque TeN. If the output torque upper limit TeM is larger, the engine controller 18 proceeds to step S640. Meanwhile, if the output torque upper limit TeM is smaller than or equal to the target output torque TeN, the engine controller 18 proceeds to step S670.

In step S640, the engine controller 18 assigns the value of the output torque upper limit TeM to as the target output torque TeN, thereby increasing the target output torque TeN, and proceeds to step S670.

In step S670, the engine controller 18 calculates the current output torque Te based on the throttle opening, the engine speed, etc., and then proceeds to step S680.

In step S680, the engine controller 18 calculates the deviation $\Delta Te'$ of the target output torque TeN from the current output torque Te using the Equation (12) shown below and then proceeds to step S690.

$$\Delta Te' = TeN - Te \qquad (12)$$

In step S690, the engine controller 18 calculates a change $\Delta\theta$ in the throttle opening $\theta$ in accordance with the deviation $\Delta Te'$ and outputs a throttle opening signal corresponding to the throttle opening change amount $\Delta\theta$ to the stepper motor 19. Then, the engine controller 18 returns to the beginning of the control loop.

Now the operation of an apparatus constituted as described heretofore will be described. The following explanation assumes the designated drive mode is set to the four-wheel drive mode. The clutch 12 is not connected when the designated drive mode is set to the two-wheel drive mode.

When the torque transferred from the internal combustion engine 2 to the front wheels 1L and 1R is larger than the road surface reaction force limit torque, i.e., when acceleration slippage occurs in the front wheels 1L and 1R (which are the main drive wheels 1L and 1R), due to the road surface friction coefficient $\mu$ being small or the driver depressing the accelerator pedal 17 too deeply, the drive torque transferred to the front wheels 1L and 1R is controlled so as to approach the road surface reaction force limit torque of the front wheels 1L and 1R by having the generator 7 generate at a generator load torque Th corresponding to the magnitude of the acceleration slippage. As a result, acceleration slippage of the front wheels 1L and 1R (which are the main drive wheels) is suppressed.

Furthermore, the acceleration performance of the vehicle is improved because the surplus electric power generated by the generator 7 is used to drive the electric motor 4, which drives the rear wheels 3L and 3R (which are the subordinate drive wheels).

Since the electric motor 4 is driven by the surplus torque that exists in excess of the road surface reaction force limit torque of the main drive wheels 1L and 1R, the energy efficiency is improved, which leads to improved fuel consumption.

In a case where the rear wheels 3L and 3R are always driven, several energy conversions (mechanical energy→electrical energy→mechanical energy, etc.) take place and energy losses occur in accordance with the conversion efficiencies. Therefore, the acceleration performance of the vehicle declines in comparison with a case where only the front wheels 1L and 1R are driven. Consequently, it is preferred that driving of the rear wheels 3L and 3R be generally suppressed. Conversely, this embodiment takes into consideration the fact that when traveling on a slippery road surface or the like, even if all of the output torque Te of the engine 2 is transferred to the front wheels 1L and 1R, not all of the torque will be used as driving force. The driving force that cannot be utilized efficiently by the front wheels 1L and 1R is outputted to the rear wheels 3L and 3R and the acceleration performance is improved.

After the clutch 12 is connected to achieve the four-wheel drive state and the acceleration slippage is suppressed, the motor torque continues to decrease. When the target motor torque Tm(n-1) reaches or falls below the prescribed threshold torque value T-TM1, it is determined that the clutch 12 will be released, i.e., that the vehicle will shift into the two-wheel drive state, and the field current Ifm of the electric motor 4 is reduced at a prescribed reduction rate such that the field current Ifm is lowered to the prescribed field current limit value D-Ifm.

When the accelerator pedal 17 is released the engine torque declines and the electric power generation capacity limit of the generator 7 declines. Thus, the maximum torque value that the electric motor 4 can output is reduced and could possible become smaller than the target motor torque.

This first embodiment accommodates this possible scenario as follows. When it is determined that the accelerator pedal 17 is being depressed effectually and the vehicle is accelerating, the electric power generation (supply) status detecting section 8J of the 4WD controller 8 executes processing that estimates the electric power generation voltage limit of the generator 7 is greater than or equal to a prescribed value and sets the reduction value of the motor field current Ifm to the normal value Dif2. Meanwhile, when the accelerator pedal 17 is released and there is effectively no acceleration instruction, the electric power generation (supply) status detecting section 8J of the 4WD controller 8 estimates that the electric power generation voltage limit of the generator 7 will decline and the reduction value of the motor field current Ifm is set to the value Dif1, which is larger than Dif2. By increasing the reduction rate of the motor field current Ifm, the counter electromotive voltage of the motor 4 is suppressed in response to the decline of the electric power generation voltage limit of the generator 7. As a result, and effective voltage difference is secured for achieving the current necessary to obtain the target motor torque and the target motor torque can be delivered.

Thus, even if the accelerator petal 17 is released and electric power generation voltage limit of the generator 7 declines during the shift to two-wheel drive, the target motor torque can be obtained by increasing the reduction rate of the field current in advance.

As a result, even if the electric power generation voltage limit of the generator 7 declines, the actual motor torque can be prevented from declining and the occurrence of shock caused by the striking of teeth of the reduction gear 11 against the deceleration side can be prevented when the motor torque becomes smaller than the drive train friction while the clutch 12 is connected. It becomes possible to issue the clutch release command when the target motor torque Tm(n) becomes approximately equal to the clutch release torque Tf. In other words, the clutch 12 is released when the motor torque is such that the torque at the clutch 12 is approximately zero. Consequently, even if the electric power generation capacity limit of the generator 7 declines, the occurrence of shock when the clutch is released can be prevented.

The maximum torque value of the motor torque falls below the target motor torque because of the decline of the electric power generation capacity limit of the generator 7, there is the possibility that the actual motor torque will decline rapidly with respect to the target motor torque. This kind of decline not only makes it impossible to control the motor torque to the targeted value, but also makes it impossible to release the clutch 12 under conditions where the torque at the clutch 12 is approximately zero, thus causing shock to occur when the clutch 12 is released.

Figure 12:
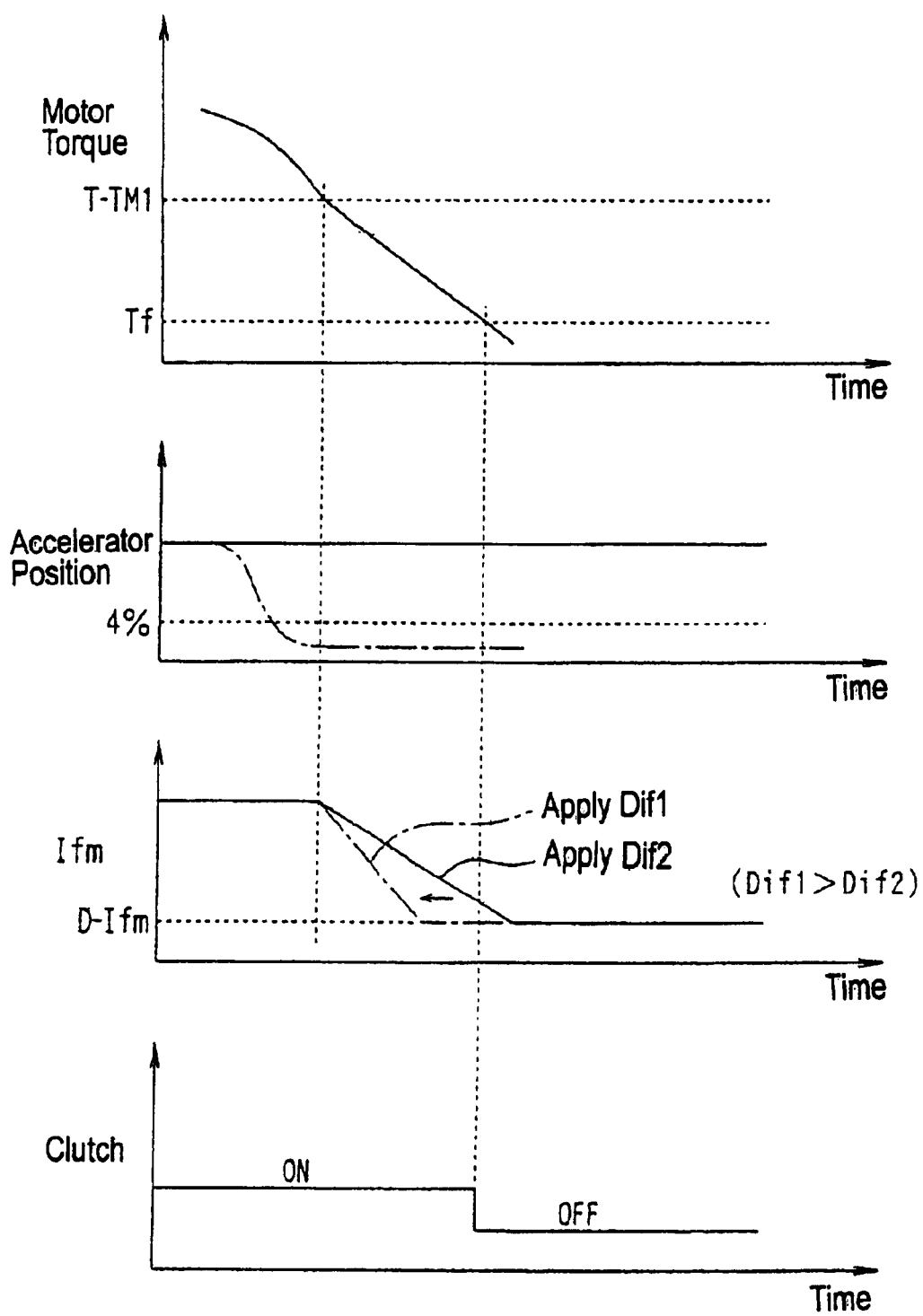
FIG. 12 shows sample time charts for the clutch release for the vehicle driving force control apparatus illustrated in FIG. 1 in accordance with the first embodiment of the present invention.

FIG. 12 is an example time chart. The single-dot chain line in FIG. 12 indicates an example of a case in which the electric power generation capacity limit of the generator 7 declines when the accelerator pedal 17 is released. In such a case, the motor torque is controlled to a value that accommodates the decline in the electric power generation capacity limit of the generator 7 by increasing the reduction rate (reduction value per unit time) of the field current. As a result, the motor torque is controlled appropriately.

Although in this embodiment the accelerator position is used to determine if the electric power generation capacity limit of the generator 7 is estimated to be small or about to become small, the invention is not limited to such an arrangement. For example, the electric power generation (supply) status detecting section 8J of the 4WD controller 8 can utilize other factors such as the rotational speed of the engine 2, the rotational speed of the generator 7, and shifting of the transmission 30 to a different gear to estimate if the electric power generation capacity limit of the generator 7 is small or will become small.

Although in this embodiment the main drive source 2 is an internal combustion engine, it is also acceptable for the main drive source to be an electric motor.

Also, although the system described above shifts into the four-wheel drive state in response to acceleration slippage of the front wheels, the present invention is also applicable to a system that shifts into the four-wheel drive state in response to the accelerator position or other parameter.

Second Embodiment

Referring now to FIGS. 1–8, 10, 11 and 13–17, a vehicle driving force control apparatus in accordance with a second embodiment will now be explained. In view of the similarity between the first and second embodiments, the parts or steps of the second embodiment that are identical to the parts or steps of the first embodiment will be given the same reference numerals as the parts or steps of the first embodiment. Moreover, the descriptions of the parts or steps of the second embodiment that are identical to the parts or steps of the first embodiment may be omitted for the sake of brevity.

The vehicle driving force control apparatus of this second embodiment of the present invention is installed in the four wheel drive vehicle that is diagrammatically illustrated in FIG. 1. In this second embodiment of the present invention, the 4WD controller 8 is configured and arranged to adjust the field current Ifh of the generator 7. In particular, the generator 7 imposes a load on the engine 2 in accordance with the field current Ifh of the generator 7 that is adjusted by the 4WD controller 8, and thus, the generator 7 generates electric power in accordance with the load torque. Accordingly, the generator 7 is configured and arranged this embodiment of the present invention as illustrated in FIG. 2.

Figure 13:
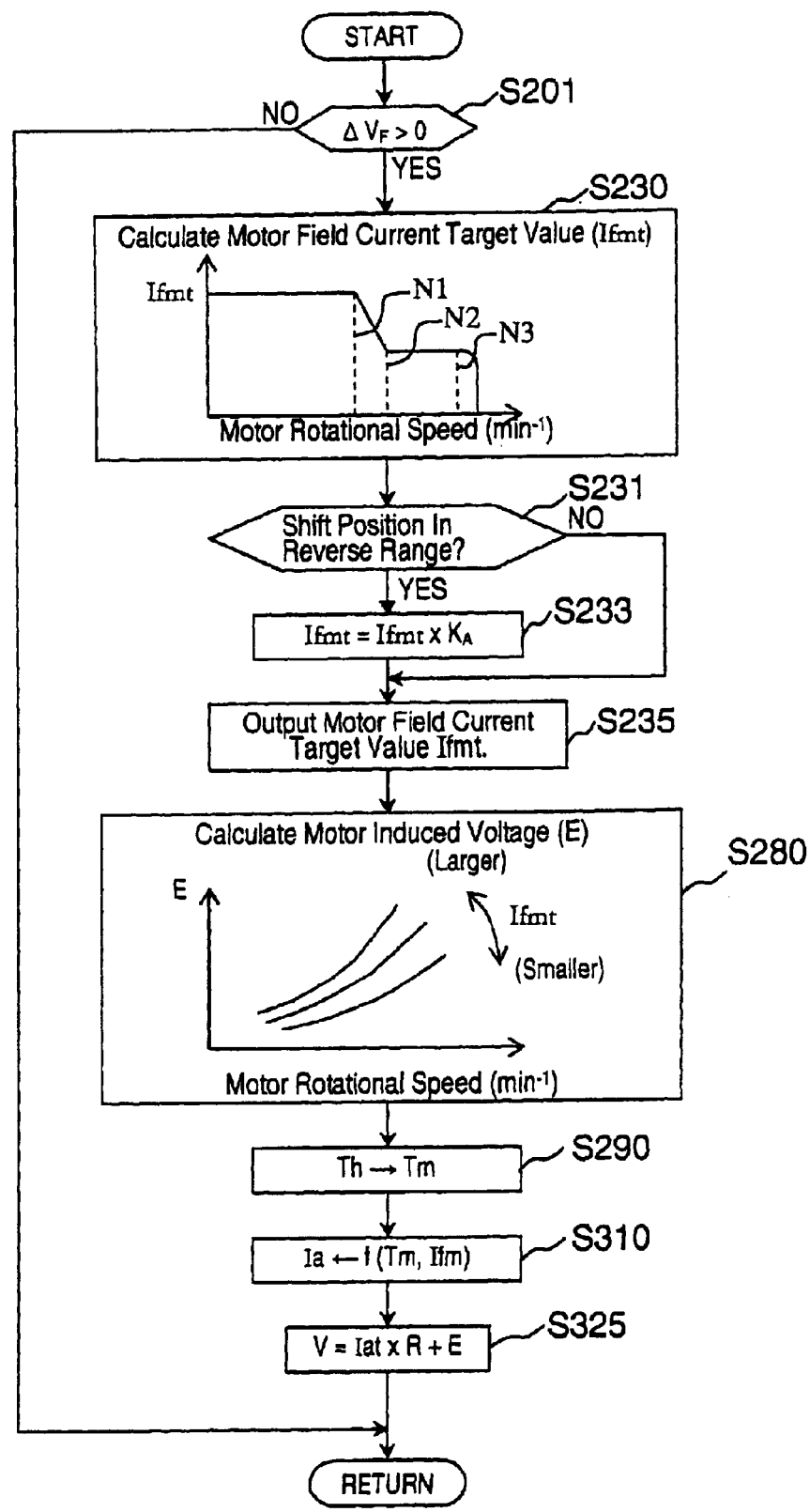
FIG. 13 is a flowchart showing an example of the processing sequence executed by the surplus torque converting section of the 4WD controller in a second embodiment.

Also, the 4WD controller 8 for the vehicle driving force control apparatus of this second embodiment is diagrammatically illustrated as a block diagram in FIG. 3. Moreover, the 4WD controller 8 for the vehicle driving force control apparatus of this second embodiment executes the processing sequence illustrated in FIGS. 4–7 in the same manner as discussed above with reference to the first embodiment. In other words, the processing sequence executed by the 4WD controller 8 of the second embodiment is generally shown in FIG. 4 as discussed above. The processing sequence executed by the drive mode selection section 8D of the second embodiment is shown in FIG. 5 as discussed above. The processing sequence executed by the surplus torque computing section 8E of the second embodiment is shown in FIG. 6 as discussed above. The processing sequence executed by the target torque limiting section 8F of the second embodiment is shown in FIG. 7 as discussed above. However, the 4WD controller 8 for the vehicle driving force control apparatus of this second embodiment executes the processing sequence in the surplus torque converting section 8G as illustrated in FIG. 13.

Figure 11:
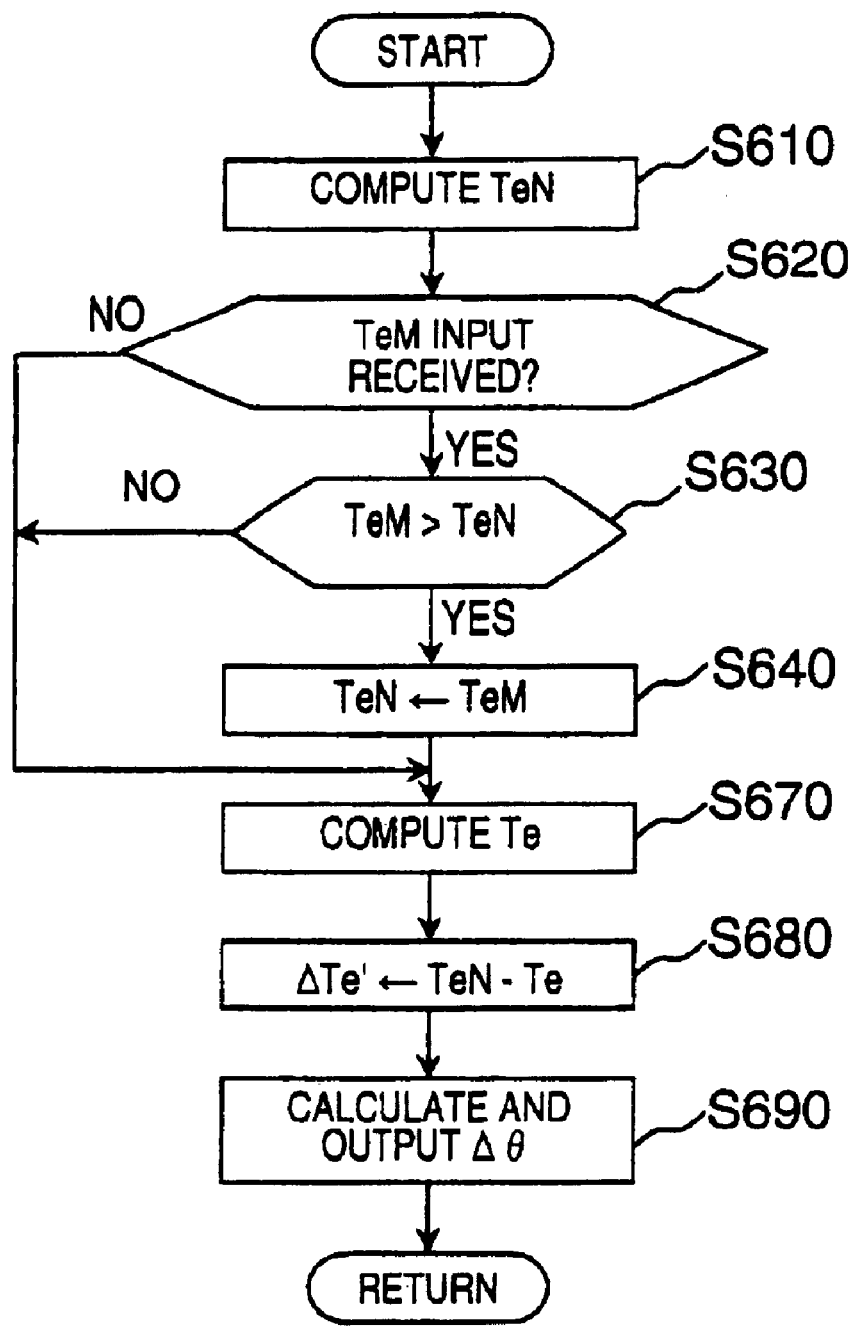
FIG. 11 is a flow chart showing the processing sequence executed by the engine controller for the vehicle driving force control apparatus illustrated in FIG. 1 in accordance with the first embodiment of the present invention.

The engine controller 18 for the vehicle driving force control apparatus of this second embodiment also executes the processing sequence illustrated in FIG. 11 as discussed above.

With the present invention of this second embodiment, as explained below, the field current of the electric motor 4 is corrected to a smaller value when the vehicle is in a four-wheel drive state in which the electric motor 4 is driving the subordinate wheel and it is determined that the generator 7 will enter a state of insufficient power generation based on the gear ratio of the transmission 30. As a result, the counter electromotive force produced by the electric motor 4 is reduced, the power generation insufficiency of the generator 7 is eliminated, and the required drive torque can be produced reliably. Thus, in this embodiment, the electric power generation status detecting section 8J executes processing to determine if the generator 7 will enter a state of insufficient power generation based on the gear ratio of the transmission 30.

The motor control section 8C adjusts the field current Ifm of the electric motor 4 based on the target motor field current Ifmt calculated in the surplus torque converting section 8G (discussed later) in order to adjust the torque of the electric motor 4 to the required value.

The motor control section 8C calculates a corresponding motor torque target value Tm based on the generator load torque target value Th computed by the surplus torque computing section 8E (discussed above). Then the clutch control section 8D calculates the clutch transmission torque $T_{CL}$ of the electric clutch 12 by executing the calculation of the equation (13) shown below based on the motor torque target value Tm. Next, the clutch control section 8D converts the clutch transmission torque $T_{CL}$ into a clutch current command value $I_{CL}$. The clutch control section 8D then pulse-width modulates (PMW) the clutch current command value $I_{CL}$, and calculates a clutch current control output CL having a duty ratio that corresponds to the clutch current command value $I_{CL}$. The clutch current control output CL is delivered to the switching transistor 48.

$$T_{CL}=Tm \times K_{DEF} \times K_{TM}+T_{CL0} \tag{13}$$

In the above equation, $K_{DEF}$ is the reduction gear ratio of the differential gear 13, $K_{TM}$ is the clutch torque margin, and $T_{CL0}$ is the initial torque of the clutch 12.

The engine controller 18 limits the engine torque Te such that the engine torque upper limit value TeM is the upper limit value of the engine torque Te regardless of how the driver operates the accelerator pedal 17.

Figure 7:
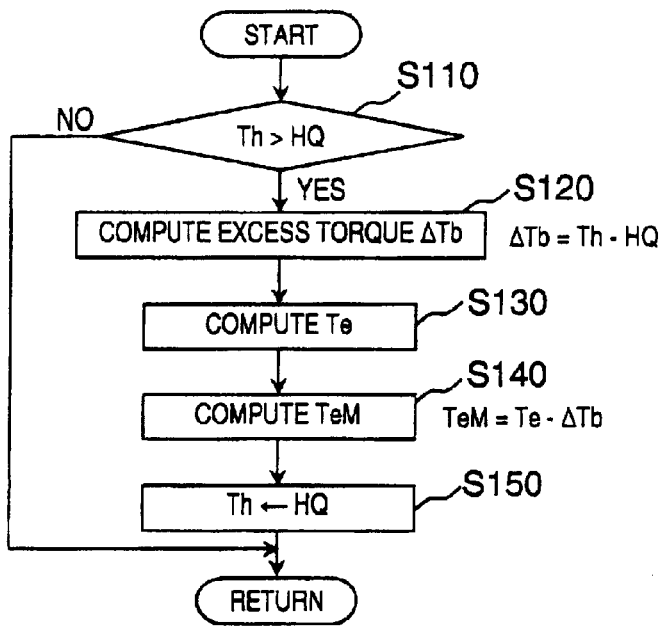
FIG. 7 is a flow chart showing the processing sequence executed by the target torque limiting (control) section of the 4WD controller for the vehicle driving force control apparatus illustrated in FIG. 1 in accordance with the illustrated embodiments of the present invention.

In step S150 of FIG. 7, the maximum load capacity HQ is assigned as the generator load torque target value Th. Then, the control loop ends and the 4WD controller 8 proceeds to the surplus torque converting section 8G.

Figure 9:
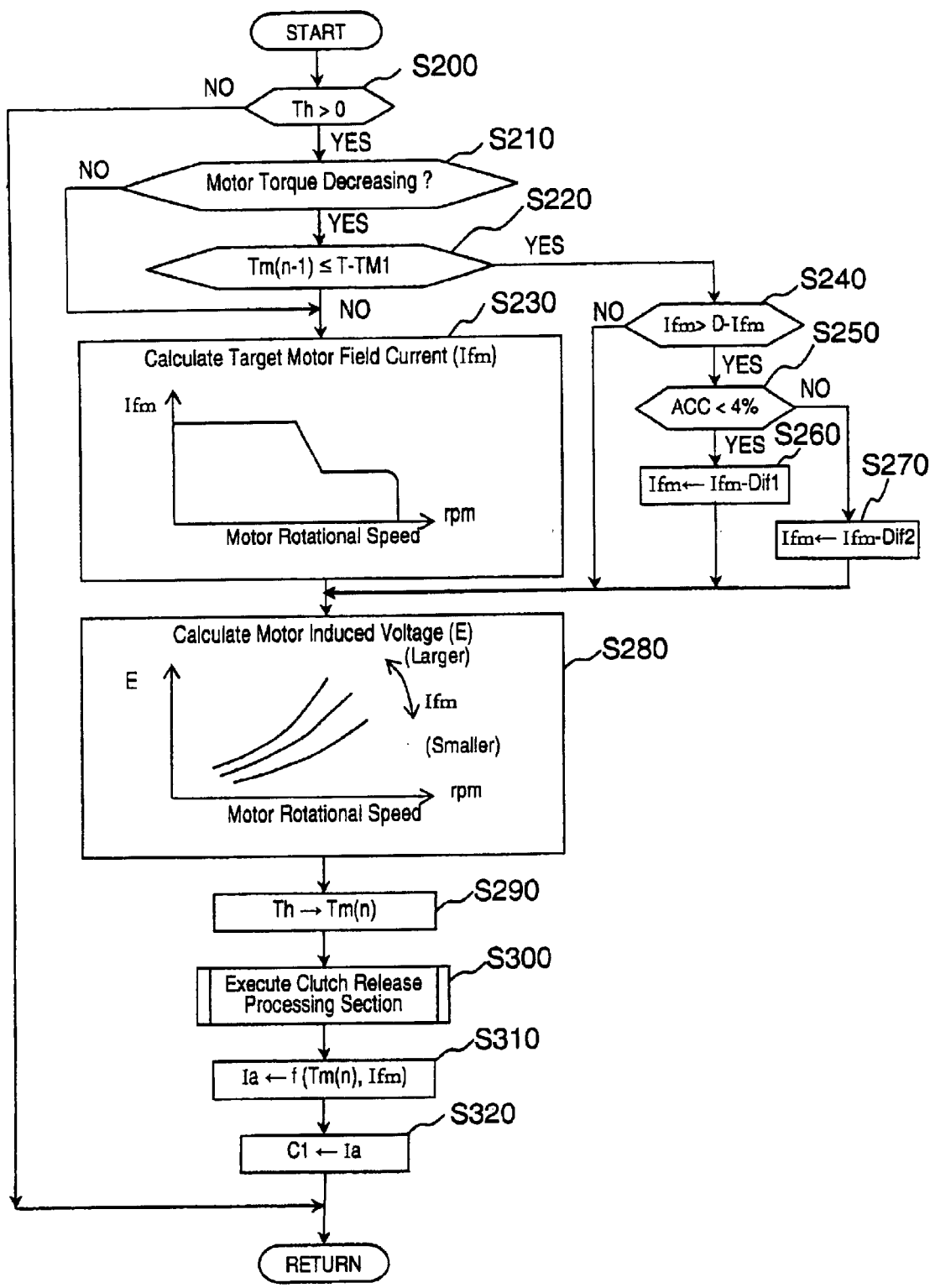
FIG. 9 is a flow chart showing the processing sequence executed by the surplus torque converting section of the 4WD controller for the vehicle driving force control apparatus illustrated in FIG. 1 in accordance with the first embodiment of the present invention.

Basically, this second embodiment uses the processing executed by the surplus torque converting section 8G of the 4WD controller 8 as seen in FIG. 13 instead of the processing sequence of the first embodiment as seen in FIG. 9. In other words, the processing sequence of this second embodiment is modified from the processing sequence of the first embodiment. Thus, in this second embodiment, the processing executed by the surplus torque converting section 8G of the 4WD controller 8 will be explained based on FIG. 13 in which the same reference numbers will be used for the steps that are common between the processing sequences of the first and second embodiments.

First, in step S201, the 4WD controller 8 determines if the slippage speed $\Delta V_F$ is larger than 0. If $\Delta V_F$ is determined to be larger than 0, the 4WD controller 8 proceeds to step S230 because the front wheels 1L and 1R are experiencing acceleration slippage. If the controller determines that $\Delta V_F$ is less than or equal to 0, then the 4WD controller 8 does not proceed to step S230 because the front wheels 1L and 1R are not experiencing acceleration slippage. Instead, the 4WD controller 8 ends the control loop and returns to the surplus torque computing section 8E (FIG. 6).

In step S230, the 4WD controller 8 receives the rotational speed Nm of the electric motor 4 detected by the motor rotational speed sensor 26 and calculates the motor field current target value Ifmt based on the rotational speed Nm of the electric motor 4 using the motor field current target value calculation map shown in FIG. 13.

The target motor field current calculation map was created based on the first gear of the Drive (D) range of the automatic transmission 30, which is the gear with the highest gear ratio in that range. The motor field current target value Ifmt follows a characteristic curve that is plotted with the motor rotational speed Nm on the horizontal axis and the motor field current target value Ifmt on the vertical axis as shown in FIG. 13. In the range of motor rotational speeds Nm from 0 to the first predetermined value N1, the motor field current target value Ifmt holds at a preset maximum current value $I_{MAX}$. If the motor rotational speed increases beyond the predetermined value N1, the motor field current target value Ifmt decreases accordingly at a comparatively large slope. Then, at rotational speeds between a second predetermined value N2 that is larger than the first predetermined value N1 and a third predetermined value N3 that is larger than the second predetermined value N2, the motor field current target value Ifmt holds at a low current value $I_L$ that is smaller than the initial current value $I_{IN}$. If the motor rotational speed Nm increases further and exceeds the first predetermined value N3, the motor field current target value Ifmt decreases at a still larger slope until it reaches 0.

Thus, the field current of the electric motor 4 is held at a fixed prescribed current value $I_{MAX}$ in the range of rotational speeds Nm from 0 to the predetermined value N1 and reduced using a known using a known weak magnetic field control method when the electric motor 4 is rotating at a speed above the predetermined value N1 (see FIG. 13). In short, when the electric motor 4 rotates at a high speed the motor torque decreases due to the rise in the induced voltage E in the electric motor 4. Therefore, as discussed earlier, when the rotational speed Nm of the electric motor 4 reaches or exceeds the prescribed value N1, the current flowing to the electric motor 4 is increased and the required motor torque Tm is obtained by reducing the field current Ifm of the electric motor 4 and lowering the induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

Next, in step S231, the 4WD controller 8 reads in the shift position detected by the shift position sensor 32 and determines if the shift position is in the Reverse (R) range, which has a smaller gear ratio than the first speed of the Drive (D) range and a larger gear ratio than the second speed of the Drive (D) range. If the shift position is not in the Reverse (R) range, the 4WD controller 8 proceeds directly to step S235. If the shift position is in the Reverse (R) range, the 4WD controller 8 proceeds to step S233 where, according to Equation (14) below, it calculates a new target motor field current Ifmt by multiplying the target motor field current Ifmt calculated in step S230 by a correction coefficient $K_A$ that is less than 1 (e.g., $K_A$=0.8). Then, the 4WD controller 8 proceeds to step S235.

$$Ifmt=Ifmt \times K_A \tag{14}$$

In step S235, the 4WD controller 8 outputs the target motor field current Ifmt that was calculated in step S230 or step S233 to the motor control section 8C and then proceeds to step S280.

In step S280, the 4WD controller 8 calculates the motor induced voltage E based on the motor rotational speed Nm and the motor field current target value Ifmt calculated in step S230 or S233 using the motor induced voltage calculation map shown in FIG. 13. The motor induced voltage calculation map is configured such that curves for different motor field current target values Ifmt are plotted on a graph having the motor rotational speed Nm on the horizontal axis and the motor induced voltage E on the vertical axis. The motor induced voltage E increases substantially linearly as the motor rotational speed Nm increases, and the motor induced voltage E also increases as the motor field current target value Ifmt increases.

In step S290, the 4WD controller 8 calculates the corresponding motor torque target value Tm based on the generator load torque target value Th computed in the surplus torque computing section 8E (FIG. 6) and then proceeds to step S310.

Figure 14:
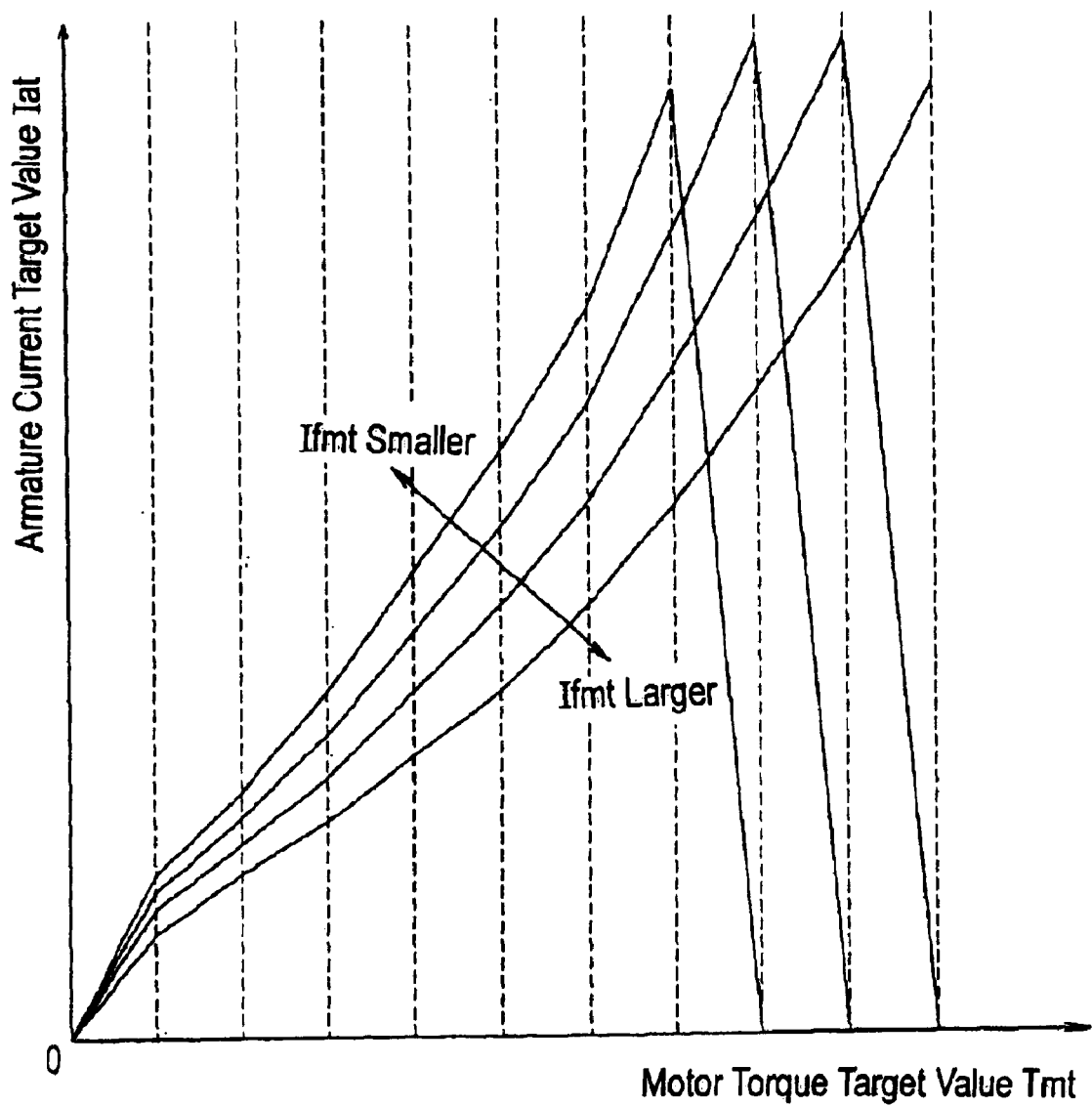
FIG. 14 is an armature current target value calculating map showing the relationship between the motor torque target value and the armature current target value for different motor field current target values.

In step S310, the 4WD controller 8 calculates the armature current value Iat based on the motor torque target value Tm and the motor field current target value Ifmt using the armature current target value calculation map shown in FIG. 14. The armature current target value calculation map is configured such that curves for different motor field current target values Ifmt are plotted on a graph having the motor torque target value Tm on the horizontal axis and the armature current target value Iat on the vertical axis. When the motor output torque Tm is 0, the armature current target value Iat is 0 regardless of the value of the motor field current target value Ifmt. As the motor output torque Tm increases the armature current target value Iat increases, but as the motor field current target value Ifmt increases the armature current target value Iat decreases. When the motor output torque Tm becomes larger, the armature current target values Iat go to 0 sequentially in order from the smallest motor field current target value Ifmt.

In step S325, the 4WD controller 8 uses Equation (15) below to calculate the voltage target value V of the generator 7 based on the armature current target value Iat, the combined resistance of the electrical line 9 and the coil of the electric motor 4, and the induced voltage E. After the 4WD controller 8 outputs the voltage target value V of the generator 7 to the generator control section 8A, the control loop ends and the 4WD controller 8 returns to the surplus torque computing section 8E (FIG. 6).

$$V = Iat \times R + E \tag{15}$$

The processing executed in steps S230 and S235 of FIG. 13 together with the motor control section 8C correspond to the field current control section, and the processing executed in steps S231 and S233 corresponds to the field current correcting section.

Next, the operation of the second embodiment will be described using the time chart shown in FIG. 15. First, it is assumed that the selector lever of the automatic transmission 30 is set to Park (P), the engine 2 has been started by turning the ignition switch 47 to the ON position, and the vehicle is in a stopped condition.

Figure 15:
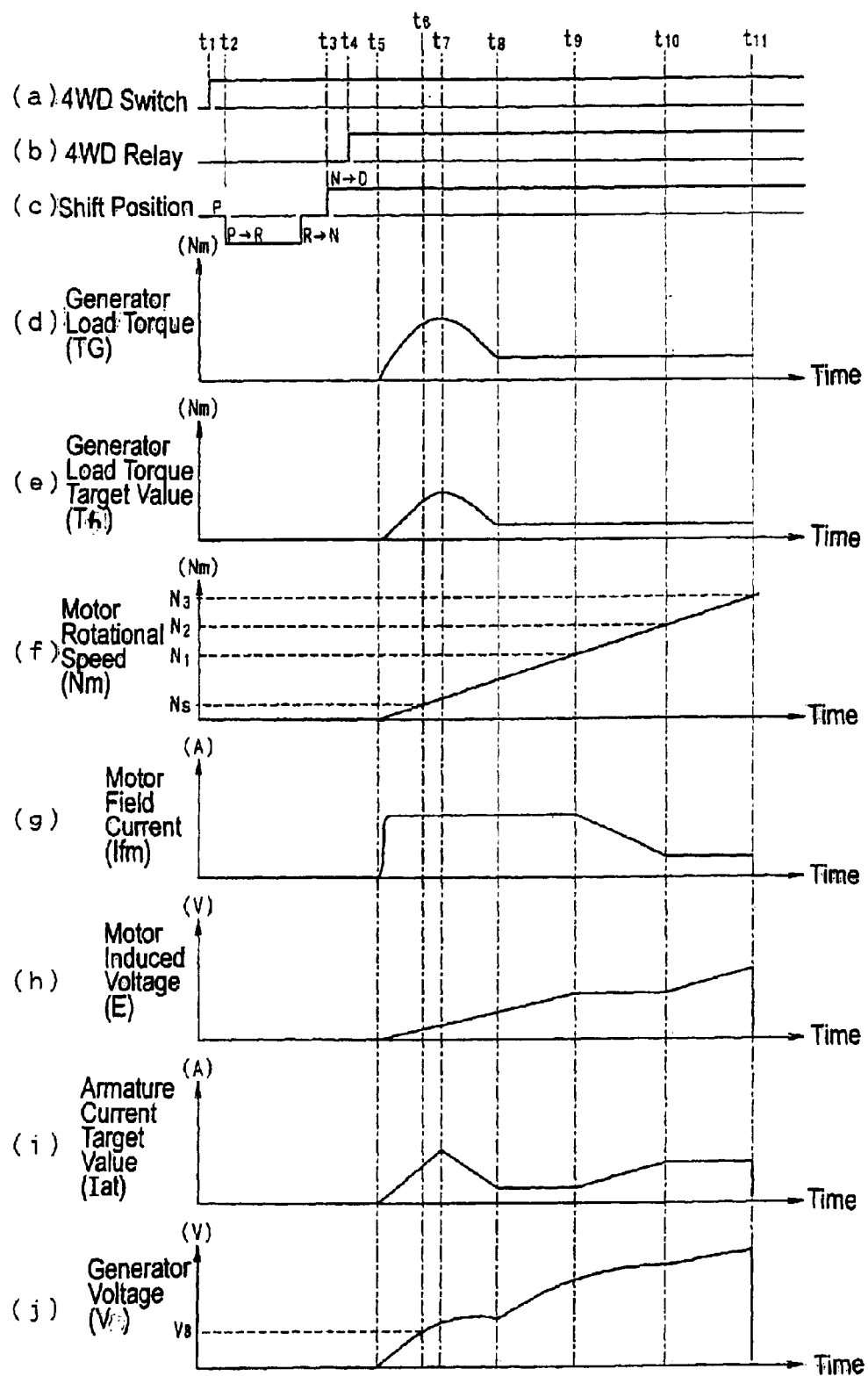
FIG. 15 is a time chart for explaining the operation of the second embodiment.

While in this stopped condition, the driver turns the 4WD drive mode switch 42 on at the point in time t1 indicated in graph (a) of FIG. 15. Since, as shown in graph (c) of FIG. 15, the shift lever is in the Park (P) position at time t1, the 4WD relay control section 8B turns the 4WD relay 44 off. Thus, the power supply to the 4WD controller 8 is stopped and electric power is not supplied from the battery 43 to the field coil FC of the generator 7, the motor relay 24 of the junction box 10, or the clutch coil 12a of the electric clutch 12.

At time t2, the selector lever is shifted from Park (P) to the Drive (D) position, passing by the Reverse (R) and Neutral (N) positions. At time t3 a prescribed amount of time, e.g., approximately 0.05 second, has elapsed since the Drive (D) range was selected, and at time t4 the 4WD relay control section 8B turns the 4WD relay 44 on, as indicated in graph (b) of FIG. 15.

At this point, the vehicle is still in a stopped state and, consequently, the average wheel speed $V_{Wf}$ of the front wheels 1L and 1R and the average wheel speed $V_{Wr}$ of the rear wheels 3L and 3R are both 0 and slippage speed $\Delta V_F$ is also 0. Therefore, the 4WD controller 8 skips steps S230 through S325 (shown in FIG. 13) of the surplus torque converting section 8G and returns to the surplus torque computing section 8E after executing step S20.

As a result, the generator control section 8A turns off both the generator control output C1 (which is based on the generator voltage target value V) and the motor field output MF. Also the clutch control section 8D turns off the clutch control output CL. Thus, the electricity generation of the generator 7 and the drive of the electric motor 4 are both stopped and the clutch 12 is controlled so as not to be connected.

From this state, it is assumed that acceleration slippage occurs in the front wheels 1L and 1R (main drive wheels) at time t5 due to the driver depressing the accelerator pedal 17 deeply and starting the vehicle into motion suddenly or due to the drive starting the vehicle into forward motion under rainy, snowy, or icy conditions in which the friction coefficient of the road surface is low (without necessarily depressing the accelerator pedal 17 deeply). The resulting speed difference between the front and rear wheels causes the slippage speed $\Delta V_F$ to become a positive value.

At this point, the clutch control section 8D controls the clutch control output CL to a prescribed duty ratio and the electric clutch 12 is connected. Simultaneously, since the slippage speed $\Delta V_F$ is positive, the 4WD controller 8 proceeds from step S2 to step S4 of the surplus torque computing section 8E (processing shown in FIG. 6) and calculates the absorption torque $T\Delta V_F$ required to suppress the acceleration slippage by multiplying the slippage speed $\Delta V_F$ by a gain K1. Then, in step S50 of FIG. 6, the 4WD controller 8 using Equation (5) to calculate the current generator load torque TG based on the current generated voltage V, the armature current Ia, and the generator rotational speed Nh. As shown in graph (d) of FIG. 15, the current generator load torque TG increases in accordance with the increase of the generated voltage V and the armature current Ia when the vehicle is first starting to move because the generator rotational speed Nh is comparatively small. Also, the generator load torque target value Th also increases as shown in graph (e) of FIG. 15 because it is calculated by finding the product of the absorption torque $T\Delta V_F$ and the current generator load torque TG.

When the vehicle first starts moving, the diode D1 is OFF and the diode D2 is ON such that the battery voltage $V_B$ is supplied to the field coil FC of the generator 7 because the generated voltage V of the generator 7 is lower than the battery voltage $V_B$, as shown in graph (j) of FIG. 15. This enables a sufficient field current Ifh to be delivered to the field coil FC, the generated voltage V to be increased, and the armature current Ia supplied to the electric motor 4 to be increased.

The generated voltage V of the generator 7 is controlled by the surplus torque converting section 8G with the processing shown in FIG. 13 and is calculated by adding the induced voltage E of the electric motor 4 to the voltage value obtained by multiplying the line resistance R by the armature current target value Iat, which is calculated based on the motor torque target value Tm and the motor field current target value Ifmt using the armature current target value calculation map shown in FIG. 14.

Although the motor field current target value Ifmt is calculated in step S230 of FIG. 13 using the motor rotational speed Nm and the motor field current target value calculation map, the motor field current target value Ifmt is set to the maximum current $I_{MAX}$ when the vehicle is first starting to move because the motor rotational speed Nm is still low.

Since the shift lever of the automatic transmission 30 is in the Drive (D) position and the automatic transmission 30 is in first gear because the vehicle speed is comparatively low, the 4WD controller 8 proceeds from step S231 directly to step S235 and outputs the motor field current target value Ifmt calculated in step S230 as is to the motor control section 8C, thereby causing the electric motor 4 to start driving.

Then, since the motor induced voltage E calculated in step S280 increases as shown in graph (h) of FIG. 15, the armature current target value Iat calculated in step S310 increases over time as shown in graph (i) of FIG. 15 and the necessary motor torque Tm can be secured. As shown in graph (f) of FIG. 15, the rotational speed Nm of the electric motor 4 increases in accordance with acceleration slippage of the front wheels 1L and 1R.

Thus, if the main drive wheels, i.e., the front wheels 1L and 1R, undergo acceleration slippage when the vehicle is accelerated rapidly from a state of rest or starts moving on a road surface having a low coefficient of friction, the subordinate drive wheels, i.e., the rear wheels 3L and 3R, are driven by the electric motor 4 so as to eliminate the acceleration slippage of the front wheels 1L and 1R and the vehicle starts into motion smoothly.

Afterwards, when the generated voltage V exceeds the battery voltage $V_B$ at time t6, the diode D2 turns OFF and the diode D1 turns ON such that the generator 7 switches from a separately excited control state in which the battery voltage $V_B$ is supplied to the field coil FC to a self excited control state in which the generated voltage V from the rectifying circuit 28 of the generator 7 is supplied to the field coil FC.

Then at time t7, the generator load torque target value Th reaches its peak and starts to decline, causing the armature current target value Iat to gradually decrease and, accordingly, the generated voltage V to slowly increase.

After time t8, the generator load torque target value Th maintains a comparatively low fixed value and, since the motor rotational speed Nm continues its rising trend, the motor induced voltage E continues on a rising trend and the motor field current target value Ifmt stays at the maximum value $I_{MAX}$. As a result, the armature current target value Iat also stays at a comparatively low fixed value and the generated voltage V increases with the increase in the motor induced voltage E.

When the motor rotational speed Nm reaches the predetermined rotational speed N1 at time t9, the motor field current target value Ifmt decreases and weak field control begins. Since the motor rotational speed Nm continues to rise, the motor induced voltage E remains fixed as shown in graph (h) of FIG. 15. Meanwhile, in conjunction with the decreasing of the motor field current target value Ifmt, the armature current target value Iat enters a gentle rising trend as shown in graph (i) of FIG. 15 and the generated voltage V also increases slowly as shown in graph (j) of FIG. 15.

When the motor rotational speed Nm reaches the predetermined rotational speed N2 at time t10, the motor field current target value Ifmt levels out at a fixed low current value $I_L$. As a result, the motor induced voltage E increases as shown in graph (h) of FIG. 15 in accordance with the increase in the motor rotational speed Nm, the armature current target value Iat remains at a fixed value as shown in graph (i) of FIG. 15, and the generated voltage V increases in accordance with the increase in the motor induced voltage E.

When the motor rotational speed Nm reaches the predetermined rotational speed N3 at time t11, the motor field current target value Ifmt goes to 0 as shown in graph (g) of FIG. 15. Consequently, the motor induced voltage E also goes to 0, the armature current target value Iat drops to a value close to 0, and the generated voltage V drops to a value close to 0.

During this period, the motor torque target value Tm calculated based on the generator load torque target value Th in step S290 of FIG. 13 gradually decreases. When the motor torque target value Tm reaches a preset clutch shut-off threshold value, the clutch control output CL supplied to the electric clutch 12 is turned off by the clutch control section 8D and the electric clutch 12 changes from the connected state to the released state, thus ending the four-wheel drive state and shifting the vehicle into the two-wheel drive state.

Meanwhile, if, when the vehicle is still in the stopped condition, the selector lever is moved from the Park (P) position to the Reverse (R) position and the vehicle is set into motion in the reverse direction, the processing will be basically the same as when the selector lever is put in the Drive (D) position and the vehicle is started into forward motion. In order to eliminate acceleration slippage caused by accelerating suddenly from a state of rest or starting into motion on a road surface having a small coefficient of friction, the electric motor 4 is driven and the drive torque of the motor is controlled so as to eliminate the acceleration slippage.

Figure 16:
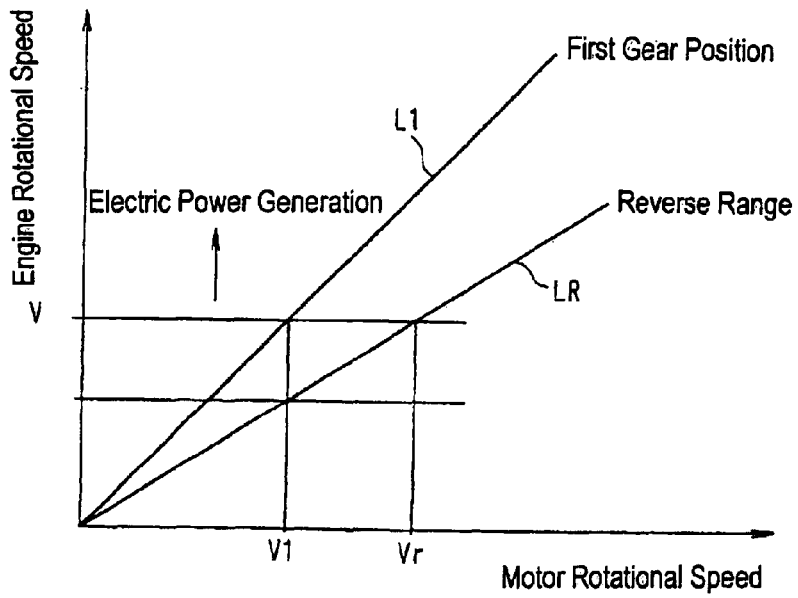
FIG. 16 is a characteristic curve diagram showing the relationship between the vehicle speed and the engine rotational speed when the gearshift is set to the first gear position of the drive range and to the reverse range in accordance with the second embodiment.

However, the Reverse (R) range of the automatic transmission 30 has a larger gear ratio than the second speed of the Drive (D) range described previously but a smaller gear ratio than the first speed, which has the largest gear ratio. Therefore, as shown in FIG. 16, a plot of the engine rotational speed Ne versus the vehicle speed has a smaller slope in the case of characteristic LR for the Reverse (R) range (indicated with a dotted line) than in the case of the characteristic L1 for the first speed of the Drive (D) range (indicated with a solid line).

As a result, when the vehicle travels in reverse using the Reverse (R) range, the generator 7 will not yet have reached a state from which it can generate electricity when the vehicle speed reaches Vg, which is the vehicle speed at which the generator 7 reaches a state where its generated voltage surpasses the counter electromotive force of the electric motor 4 and it can deliver a current when the vehicle is traveling using the first speed of the drive (D) range. Instead, only when the vehicle speed reaches the vehicle speed Vr (which is faster than V1) does the generator 7 first reach a state from which it can deliver a current and the electric power generation quantity of the generator 7 is generally smaller in the Reverse (R) range than in the first speed of the Drive (D) range.

Thus, when the vehicle is traveling in Reverse (R), the electric power generation quantity of the generator 8 declines in comparison with forward travel using the first speed of the Drive (D) range. In particular, when starting into motion from a state of rest and when shifting from the four-wheel drive state to the two-wheel drive state after the vehicle speed increases, the armature current Ia supplied to the electric motor 4 is below the armature current target value Iat and insufficient electric power generation causes the drive torque of the electric motor 4 to be too low, making it impossible to execute accurate control of the electric motor.

In this embodiment, when the vehicle travels using the Reverse (R) range, the processing of FIG. 13 is executed such that the 4WD controller 8 proceeds from step S231 to step S233 and multiplies the motor field current target value Ifmt calculated in step S230 by a correction coefficient $K_A$ set to, for example, 0.8. Thus the motor field current target value Ifmt calculated in step S230 is corrected to a smaller motor torque field current target value Ifmt and the smaller motor torque field current target value Ifmt is outputted to the motor control section 8C. The motor field current Ifm of the electric motor 4 is then controlled so as to match the motor field current target value Ifmt.

Figure 17:
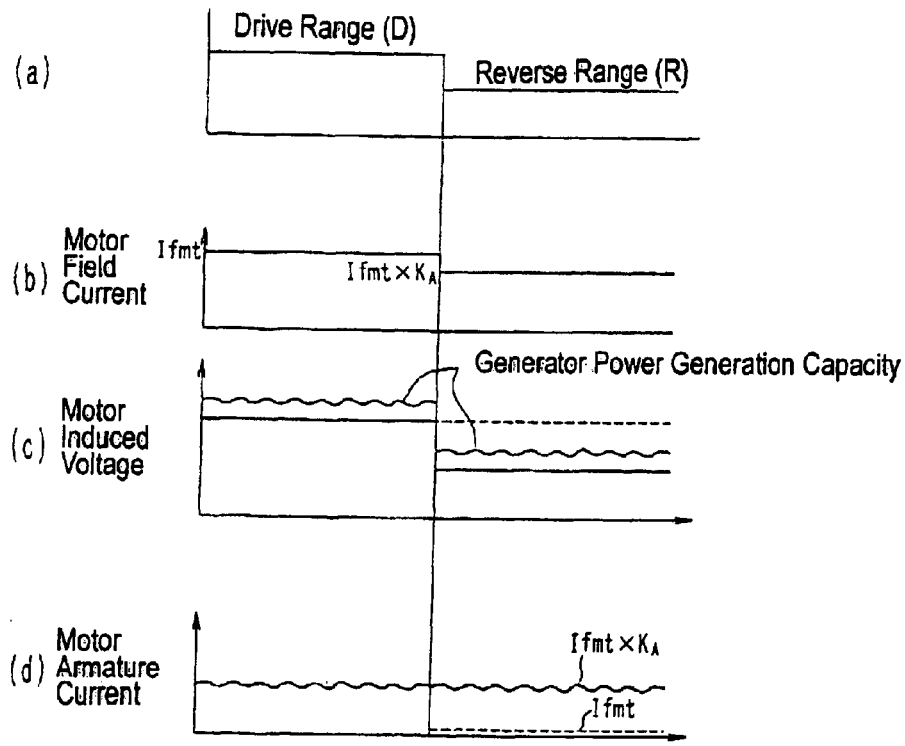
FIG. 17 is a time chart comparing the operation of the embodiment when in the drive range to the operation of the second embodiment when in the reverse range.

Consequently, when the vehicle is traveling in the Reverse (R) range, the motor field current value Ifm is smaller than the motor field current value Ifm used when traveling in the Drive (D) range, as shown in graph (b) of FIG. 17. Accordingly, since the motor induced voltage E generated in the electric motor 4 is proportional to the product of the motor rotational speed and the motor field current Ifm, the motor induced voltage E is comparatively smaller than when traveling in the Drive (D) range, as shown in graph (c) of FIG. 17. As a result, the electric current generated by the generator 7 increases according to the amount of the decrease in the motor induced voltage E and a drive current larger than the armature current target value Iat can be supplied to the electric motor 4. The armature current Ia of the electric motor can be controlled so as to accurately match the armature current target value Iat as shown in graph (d) of FIG. 17 and the required motor torque Tm can be accurately produced.

If the same motor field current target value Ifmt were used during reverse travel in the Reverse (R) range as the motor field current target value Ifmt used when traveling in the Drive (D) range, the motor induced voltage E would remain at a high value as indicated by the dotted line in graph (c) of FIG. 17 and exceed the electric power generating capacity of the generator 7. Consequently, as indicated by the dotted line in graph (d) of FIG. 17, the armature current Ia of the electric motor 4 would be insufficient, the electric motor 4 would not be able to produce the necessary motor torque Tm, and the ability of the apparatus to eliminate acceleration slippage would be affected.

Since the automatic transmission 30 is connected to the output side of the engine 2 through a torque converter, when the accelerator pedal 17 is released, the engine rotational speed Ne decreases rapidly and, accordingly, the rotational speed of the generator 7 decreases, thus worsening the electric power generation insufficiency. With this embodiment, as described previously, the motor field current Ifm is controlled to a low value when traveling in the Reverse (R) range, thus decreasing the motor induced voltage E and increasing the current generated by the generator 7. As a result, even if the engine rotational speed Ne falls to the vicinity of the idling rotational speed, the generated current is maintained and the armature current Ia of the electric motor 4 can be matched to the armature current target value Iat, allowing the motor torque Tm to be controlled accurately.

Furthermore, the acceleration performance of the vehicle is improved because the surplus electric power generated by generator 7 is used to drive the electric motor 4, which drives the rear wheels 3L and 3R (which are the subordinate drive wheels).

Since the electric motor 4 is driven by the surplus torque that exists in excess of the road surface reaction force limit torque of main drive wheels 1L and 1R, the energy efficiency is improved, which leads to improved fuel consumption.

In a case where the rear wheels 3L and 3R are always driven, several energy conversions (mechanical energy→electrical energy→mechanical energy, etc.) take place and energy losses occur in accordance with the conversion efficiencies. Therefore, the acceleration performance of the vehicle declines in comparison with a case where only the front wheels 1L and 1R are driven. Consequently, it is preferred that driving of the rear wheels 3L and 3R be suppressed. Conversely, this embodiment takes into consideration the fact that when traveling on a slippery road surface or the like, even if all of the output torque Te of the engine 2 is transferred to front wheels 1L and 1R, not all of the torque will be used as a driving force. The driving force that cannot be utilized efficiently by front wheels 1L and 1R is outputted to rear wheels 3L and 3R and the acceleration performance is improved.

Additionally, this second embodiment is provided with a field current correcting section that determines that the electric power generated by the generator 7 will become insufficient and corrects motor field current target value Ifmt to a smaller value when the gear ratio detected by the gear ratio detecting section falls below a preset gear ratio, i.e., when the transmission is shifted from the Drive (D) range to the Reverse (R) range. As a result, the fact that the electric power generated by the generator 7 will become insufficient is detected accurately and an electric power deficiency can be avoided reliably.

The second embodiment is also provided with a motor rotational speed sensor 26 that functions as an electric motor rotational speed detecting device for detecting the rotational speed of the electric motor 4. Since the motor field current target value is calculated based on the motor rotational speed Nm detected by the motor rotational speed sensor 26, the drive torque produced by the electric motor 4 can be controlled accurately.

The second embodiment is also provided with a field current correcting section that multiplies the electric motor field current target value calculated by the field current control section by a correction coefficient whose value is less than 1 when the gear ratio decreases below a predetermined gear ratio. As a result, the electric motor field current target value is reliably corrected to a lower value and the electric power generation insufficiency of the generator can be eliminated.

Although the second embodiment was described using an arrangement in which the shift position of the automatic transmission 30 is detected by a shift position sensor 32 and it is determined that the gear ratio has decreased and an electric power deficiency will occur when the Reverse (R) range is selected, the invention is not limited to such an arrangement. It is also acceptable to detect the input rotational speed and the output rotational speed of the automatic transmission 30 and detect the gear ratio based on the ratio of these rotational speeds.

Although the second embodiment was described using an arrangement in which it is determined that an electric power generation insufficiency will occur when the Reverse (R) range is selected instead of a range other than the Reverse (R) range, the invention is not limited to such an arrangement. Electric power generation insufficiency also occurs when the transmission upshifts from the first gear position to the second gear position (which has a lower gear ratio) of the Drive (D) range during four-wheel drive. Therefore, it is also acceptable to arrange for the motor field current target value Ifmt to be multiplied by a correction coefficient $K_A$ that is smaller than that described in the embodiment and thereby corrected to a smaller value when the transmission upshifts to second gear. In such a case, it is preferred that it be determined if the transmission is in the first gear position or the second gear position by calculating the ratio of the input rotational speed and the output rotational speed of the automatic transmission 30 or by detecting the gear change command value outputted from the gear change controller that controls the automatic transmission 30.

Although the second embodiment was described regarding an arrangement in which the vehicle uses an automatic transmission 30, the present invention is not limited to such an arrangement. It is also acceptable to use a continuously variable transmission, such as a belt-type continuously variable transmission or a toroidal continuously variable transmission. In such a case, the gear ratio of the continuously variable transmission can be detected by detecting the input rotational speed and the output rotational speed of the continuously variable transmission and the target motor current target value Ifmt can be corrected when the gear ratio deviates from the maximum gear ratio by a prescribed amount or by using a correction coefficient $K_A$ that varies according to the change in the gear ratio. It is also acceptable to use a manual transmission.

Although the embodiment was described regarding an arrangement in which the motor field current target value Ifmt is corrected by multiplying by a correction coefficient $K_A$ when it is detected that the electric power is insufficient, the invention is not limited to such an arrangement. It is also acceptable to calculate the new motor field current target value Ifmt by subtracting a correction coefficient from of a prescribed value from the motor field current target value Ifmt.

Although the second embodiment was described regarding an arrangement in which the generated voltage V of the generator 7 is calculated based on the motor induced voltage E and the armature current target value Iat and the field control output MF of the generator 7 is controlled based on the generated voltage V, the present invention is not limited to such an arrangement. It is also acceptable to find the differential ΔIa between the armature current target value Iat and the actual armature current Ia supplied to the electric motor 4 (which is detected by the current sensor 23) and calculate the generator field current Ifh by multiplying the differential ΔIa by a proportional control gain or by multiplying the integral value of the differential ΔIa by an integral control gain. Then, the duty ratio is calculated in accordance with the generator field current Ifh and electric power generation output of this duty ratio is supplied to the bipolar transistor 45.

The second embodiment was described regarding an arrangement in which an electric clutch 12 was used as the clutch, but the invention is not limited to such an arrangement. It is also possible to use a hydraulic clutch. In such a case, the clutch connection force should be controlled by electrically controlling a pressure control valve that controls the hydraulic pressure supplied to the hydraulic clutch. It is also acceptable to use any other clutch for which the clutch connection force can be controlled electrically.

Although the second embodiment was described regarding an arrangement in which the input shaft of the generator 7 is driven by the engine 2 using the drive belt 6, the invention is not limited to such an arrangement. It is also acceptable to connect the input shaft of the generator 7 somewhere along the rotating section between the output side of the transfer case and the front wheels 1L and 1R. This arrangement enables the load on the engine 2 during idling to be reduced.

Although the second embodiment was described regarding an arrangement in which the motor rotational speed sensor 26 is used as the motor rotational speed detecting device and the motor rotational speed Nm is detected directly with the motor rotational speed sensor 26, the present invention is not limited to such an arrangement. It is also acceptable to estimate the motor rotational speed based on the wheel speeds $Vw_{RL}$ and $Vw_{RR}$ detected by wheel sensors 27RL and 27RR and the gear ratio of the differential gear 13.

Although the second embodiment was described regarding a four-wheel drive vehicle in which the front wheels 1L and 1R are the main drive wheels and the rear wheels 3L and 3R are the subordinate drive wheels, the present invention is not limited to such a vehicle. It is also acceptable to treat the rear wheels 3L and 3R as the main drive wheels and the front wheels 1L and 1R as the subordinate drive wheels.

Also, although the second embodiment was described regarding a four-wheel drive vehicle, the present invention is not limited to a four-wheel drive vehicle. The invention can also be applied to any vehicle having two or more drive wheels arranged in the front and rear in which a portion of the wheels are main drive wheels driven by an internal combustion engine and the remaining wheels are subordinate drive wheels driven by an electric motor. The present invention can also be applied to an electric powered drive apparatus in which a generator is driven by an internal combustion engine or other rotational drive source, an electric motor is driven by the generator, and wheels are driven by the electric motor.

Third Embodiment

Referring now to FIGS. 1–8 and 18–26, a vehicle driving force control apparatus in accordance with a third embodiment will now be explained. In view of the similarity between the preceding embodiments and this embodiment, the parts or steps of this embodiment that are identical to the parts or steps of the preceding embodiments will be given the same reference numerals as the parts or steps of the preceding embodiments. Moreover, the descriptions of the parts or steps of this embodiment that are identical to the parts or steps of the preceding embodiments may be omitted for the sake of brevity.

The vehicle driving force control apparatus of this third embodiment of the present invention is installed in the four wheel drive vehicle that is diagrammatically illustrated in FIG. 1. However, in this third embodiment of the present invention, the 4WD controller 8 is configured and arranged to include the backlash elimination control section 8L.

Thus, the electric motor 4, the generator 7 and the 4WD controller 8 are configured and arranged in this embodiment of the present invention as illustrated in FIG. 2. Also, the 4WD controller 8 for the vehicle driving force control apparatus of this third embodiment is diagrammatically illustrated as a block diagram in FIG. 3. Moreover, the 4WD controller 8 for the vehicle driving force control apparatus of this third embodiment executes the processing sequence illustrated in FIGS. 4–7 in the same manner as discussed above with reference to the first embodiment. In other words, the processing sequence executed by the 4WD controller 8 of the third embodiment is generally shown in FIG. 4 as discussed above. The processing sequence executed by the drive mode selection section 8D of the third embodiment is shown in FIG. 5 as discussed above. The processing sequence executed by the surplus torque computing section 8E of the third embodiment is shown in FIG. 6 as discussed above. The processing sequence executed by the target torque limiting section 8F of the third embodiment is shown in FIG. 7 as discussed above. However, the 4WD controller 8 for the vehicle driving force control apparatus of this third embodiment executes the processing sequence in the surplus torque converting section 8G as illustrated in FIG. 13.

Figure 21:
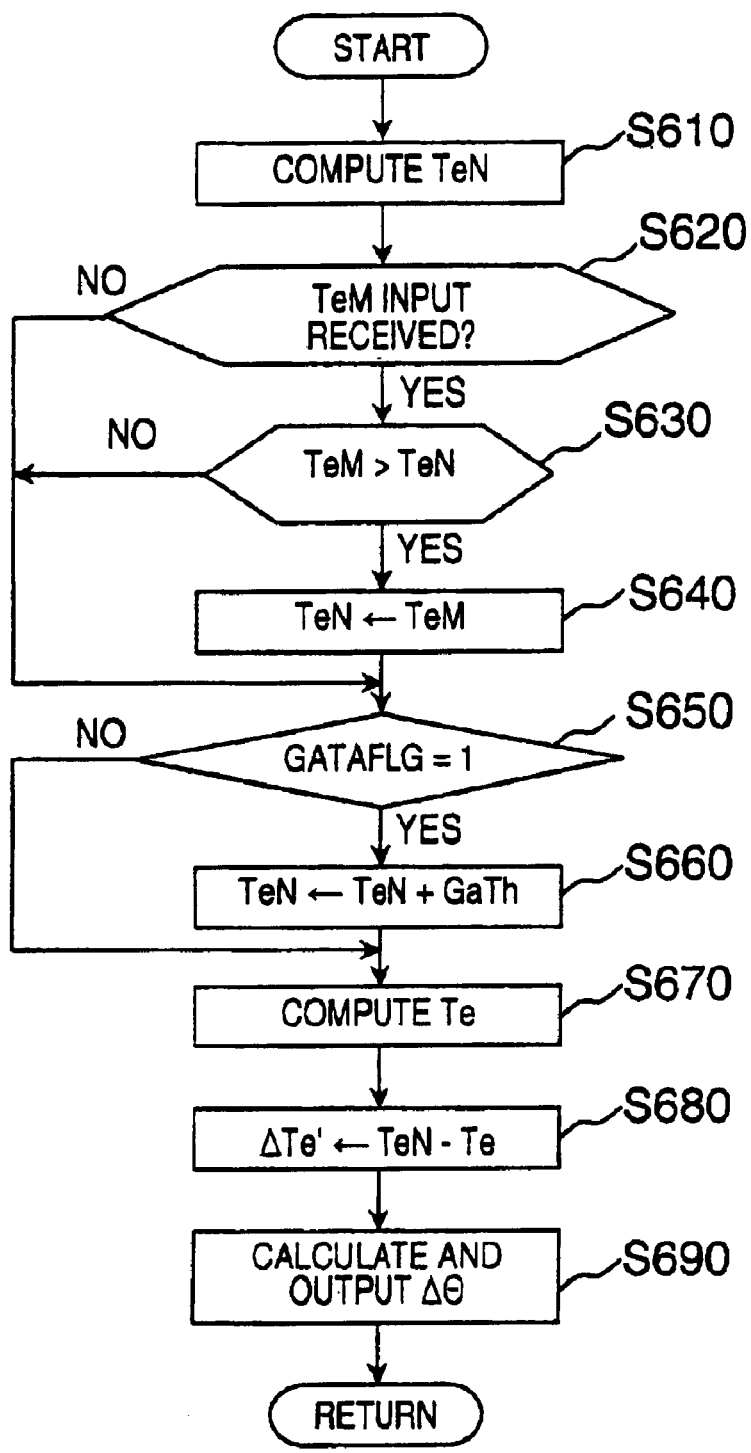
FIG. 21 is a flow chart showing the processing sequence executed by the engine controller for the vehicle driving force control apparatus illustrated in FIG. 1 in accordance with the third embodiment of the present invention.

The engine controller 18 for the vehicle driving force control apparatus of this third embodiment executes the processing sequence illustrated in FIG. 21 instead of the processing sequence of FIG. 11.

With the four-wheel drive vehicle driving force control apparatus of this embodiment of the present invention as explained below, the prescribed value of the target electric motor torque for releasing the clutch 12 when it is time for the vehicle to shift from the four-wheel drive state to the two-wheel drive state is set in accordance with the generator electric power generation quantity (which is dependent upon by the engine). More specifically, when the generator electric power generation quantity (which is dependent upon by the engine) is determined to be small by the electric power generation status detecting section 8J, the apparatus sets the prescribed value of the target electric motor torque to a large value. When the generated electric power is insufficient, the electric motor torque decreases quickly. By setting the target electric motor torque for releasing the clutch 12 to a large value and issuing the release command to the clutch early, it becomes difficult for the electric motor torque to fall below the target value before the clutch 12 is actually released. As a result, the difference between the electric motor torque and the target value at the time of clutch release is small and shock can be avoided.

The generator 7 rotates at a rotational speed Nh that is equal to the product of the rotational speed Ne of the engine 2 and the pulley ratio. It applies a load on the engine 2 in accordance with a field current Ifh that is adjusted by the 4WD controller 8 and generates a voltage in accordance with the load torque.

The motor control section 8C adjusts the field current Ifm of the electric motor 4 so as to adjust the torque of the electric motor 4 to the required value, i.e., the target motor torque Tm, which is calculated through processing, discussed later. The motor control section 8C constitutes the electric motor torque control section of the present invention. When the vehicle shifts from the four-wheel drive state to the two-wheel drive state, the target motor torque Tm is decreased gradually.

The clutch control section 8D controls the state of the clutch 12 by outputting a clutch control command to the clutch 12. More specifically, the target motor torque Tm set by the motor control section 8C. If the target motor torque Tm becomes equal to or smaller than a motor torque prescribed value $T_{TCL}$, the clutch 12 is released. As a rule, the vehicle is in the four-wheel drive state when the clutch 12 is connected and in the two-wheel drive state when the clutch 12 is disconnected. When the target motor torque Tm is equal to or larger than the motor torque prescribed value $T_{TCL}$ or when a clutch connection request results from the processing shown in FIG. 19 (discussed later), the motor rotational speed (which is the input rotational speed of the clutch) and the average rear wheel speed (which is the output rotational speed of the clutch) are matched together and the clutch 12 is connected after both rotational speeds are the same. The clutch control section 8D constitutes the clutch connection control section of the present invention.

Next, the processing executed by the surplus torque converting section 8G will be explained based on FIG. 18.

First, in step S200, the 4WD controller 8 determines if the target generator load torque Th is larger than 0. If the target generator load torque Th is determined to be larger than zero, then the 4WD controller 8 proceeds to step S230 because the front wheels 1L and 1R are experiencing acceleration slippage. If the 4WD controller 8 determines that the target generator load torque Th is less than or equal to 0, then the 4WD controller 8 returns proceeds to step S341 because the front wheels 1L and 1R are not experiencing acceleration slippage.

In step S230, the rotational speed Nm of the electric motor 4 detected by the motor rotational speed sensor 26 is received as input. The target motor field current Ifmt corresponding to the rotational speed Nm of the electric motor 4 is calculated and the target motor field current Ifmt is outputted to the motor control section 8C. Then, the 4WD controller 8 proceeds to step S280.

The target motor field current Ifmt corresponding to the rotational speed Nm of the electric motor 4 is held to a fixed prescribed current value when rotational speed Nm is below a prescribed rotational speed and the field current Ifm of the electric motor 4 is reduced by a known weak field control method when the electric motor 4 is rotating above a prescribed rotational speed. In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm is obtained by reducing the field current Ifm of the electric motor 4 and lowering the induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque Tm by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm can be obtained because the induced voltage E of the motor 4 is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

In step S280, the induced voltage E of the electric motor 4 is calculated based on the target motor field current Ifmt and the rotational speed Nm of the electric motor 4. Then, the 4WD controller 8 proceeds to step S290.

Figure 6:
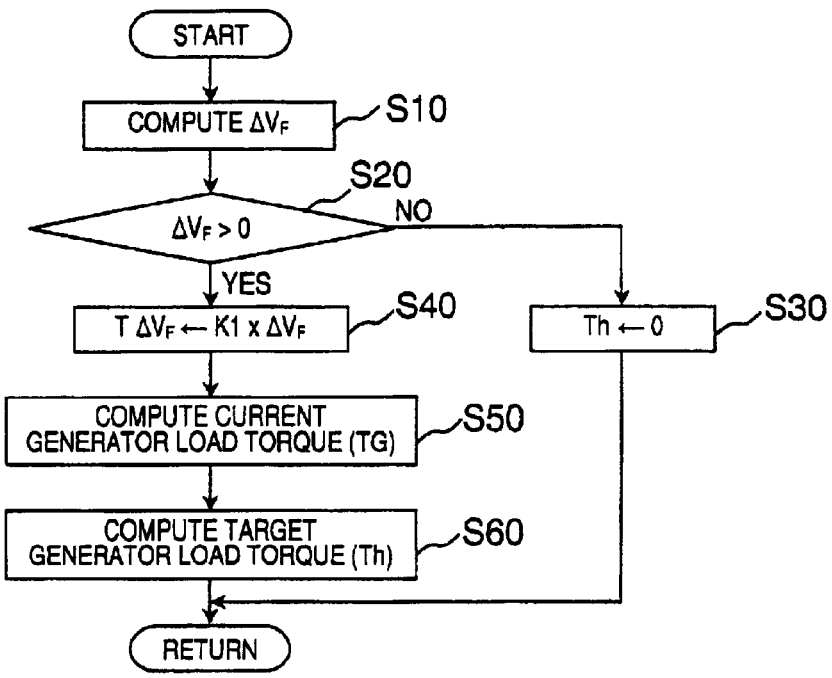
FIG. 6 is a flow chart showing the processing sequence executed by the surplus torque computing section of the 4WD controller for the vehicle driving force control apparatus illustrated in FIG. 1 in accordance with the illustrated embodiments of the present invention.

In step S290, the corresponding target motor torque Tm is calculated based on the generator load torque Th computed by the surplus torque computing section 8E (FIG. 6). Then, the 4WD controller 8 proceeds to step S310.

In step S310, the corresponding target armature current Ia is calculated using the target motor torque Tm and the target motor field current Ifmt as variables. Then, the 4WD controller 8 proceeds to step S331.

In step S331, the target voltage V of the generator 7 is calculated based on the target armature current Ia, the resistance R, and the induced voltage E using the equation (15) shown above. The resistance R is the resistance of the electrical line 9 and the resistance of the coil of the electric motor 4. Then, the 4WD controller 8 proceeds to step S333.

In step S333, the 4WD controller 8 determines if the value of the backlash elimination flag GATAFLG is 1, i.e., if backlash elimination processing is being conducted. If the value of the backlash elimination flag GATAFLG is 1, then the 4WD controller 8 proceeds to step S335. If the value is 0, then the 4WD controller 8 proceeds to step S345.

In step S335 and step S337, the voltage V and the backlash elimination-purpose target voltage GaV are compared. If the backlash elimination-purpose target voltage GaV is larger, then the value of the backlash elimination-purpose target voltage GaV is assigned as the value of voltage V and the 4WD controller 8 proceeds to step S345.

In step S345, the target voltage V of the generator 7 is outputted to the generator control section 8A and the 4WD controller 8 returns to the beginning of the control loop.

Meanwhile, if the target generator load torque Th was 0 in step S200, the 4WD controller 8 proceeds to step S341. If the backlash elimination flag GATAFLG is found to be 1 in step S341, i.e., if backlash elimination processing is being executed, then the 4WD controller 8 proceeds to step S343, where the value of the backlash elimination-purpose target voltage GaV is assigned to the voltage V and the 4WD controller 8 proceeds to step S345. Meanwhile, if the backlash elimination flag GATAFLG is found to be 0, i.e., if backlash elimination processing is not in progress, then the control loop ends and returns to the beginning.

The surplus torque converting section 8G calculates the target voltage V of the generator 7 in accordance with the target generator load torque Th while taking into consideration the control of the motor 4. However, it is also acceptable to calculate the target voltage value V required to achieve the target generator load torque Th directly from the target generator load torque Th.

Figure 19:
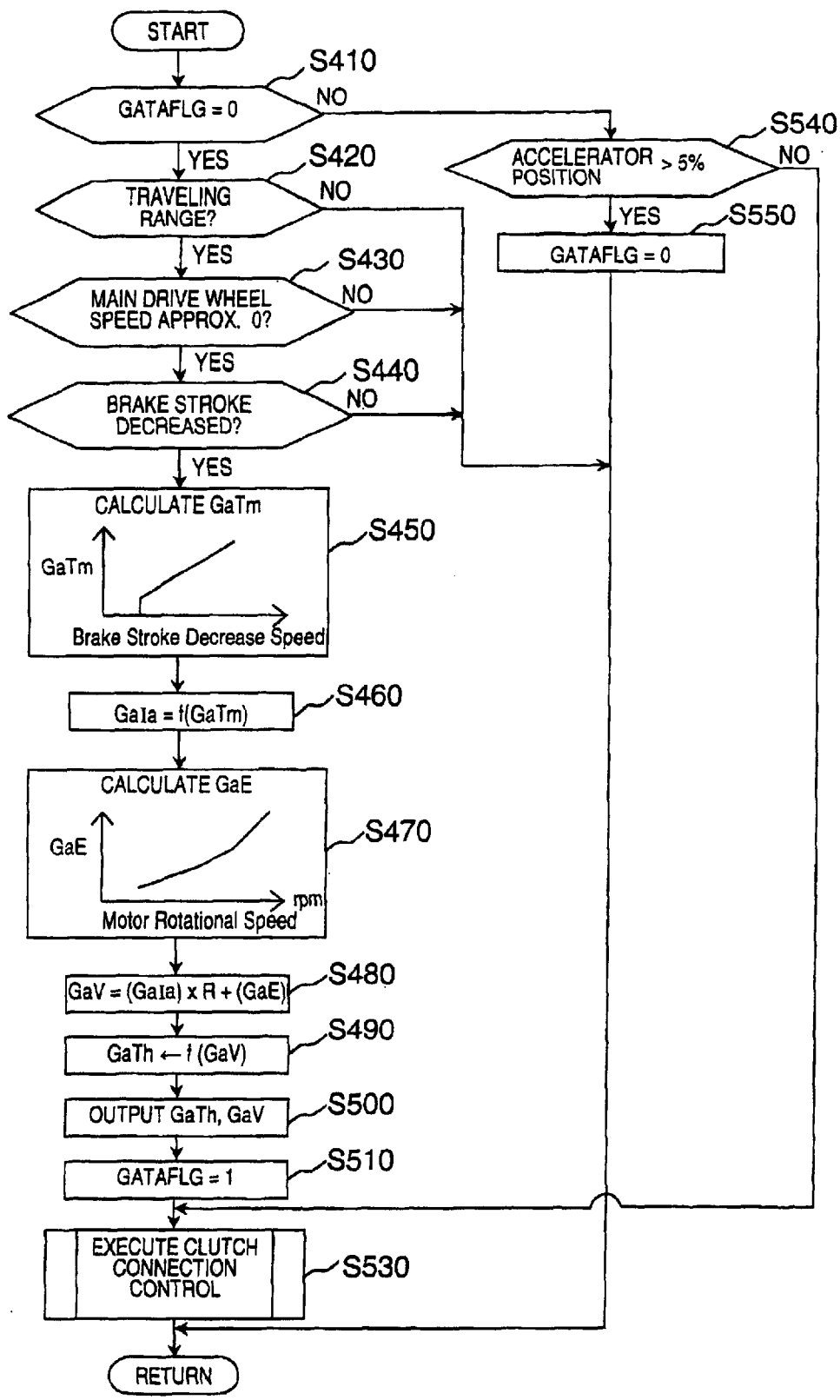
FIG. 19 is a flow chart showing the processing sequence executed by the backlash elimination processing section of the 4WD controller for the vehicle driving force control apparatus illustrated in FIG. 1 in accordance with the third embodiment of the present invention.

Next, the processing executed by the backlash eliminating section 8H will be explained with reference to FIG. 19. In accordance with a prescribed sampling time cycle, the backlash eliminating section executes the processing shown in FIG. 19 based on the input signals.

First, in step S410, the 4WD controller 8 determines if the value of the backlash elimination flag GATAFLG is 0, i.e., if backlash elimination processing is being conducted. If it is determined that the flag value is 0, i.e., backlash elimination processing is not in progress, then the 4WD controller 8 proceeds to step S420. If it is determined that the flag value is 1, i.e., backlash elimination processing is in progress, then the 4WD controller 8 proceeds to step S540.

In step S420, the 4WD controller 8 determines if the transmission is in a drive range (D, R, 1, or 2), i.e., a position other than Park or Neutral, based on the shift position detecting sensor or device 32. If it is determined that the transmission is in a drive range, i.e., that torque is being transmitted from the engine 2 to the front wheels 1L and 1R, then the controller proceeds to step S430. Conversely, if it is determined that the transmission is not in a drive range, then the control loop ends and returns to the beginning.

In step S430, the 4WD controller 8 determines if the wheel speed of the front wheels 1L and 1R (main drive wheels) is zero or almost zero. If so, i.e., if the vehicle is determined to be starting into motion from a state of rest, the 4WD controller 8 proceeds to step S440. If the vehicle is not starting into motion, then the control loop ends and returns to the beginning.

In this embodiment, step S430 is designed so that backlash elimination processing is only executed when the vehicle is starting into motion. However, it is also acceptable to design step S430 such that backlash elimination processing is executed when the vehicle is traveling. This can be accomplished by determining if the rotational speed of the electric motor 4 is less than or equal to an allowable rotational speed based on the vehicle traveling speed or the like and not executing backlash elimination processing when the motor rotational speed exceeds the allowable rotational speed.

In step S440, based on the signal from the brake stroke sensor 35, it is determined if the brake pedal 34 moving in the release direction, i.e., moving in the direction of decreasing brake instruction. If so, the 4WD controller 8 proceeds to step S450. If not, the control loop ends and returns to the beginning.

It is also acceptable to determine if the brake pedal 34 has been released and proceed to step S450 if so and end the processing and return to the beginning of the control loop if not.

In step S450, the 4WD controller 8 finds the rate of change in the release amount (i.e., decrease speed) of the brake stroke based on the signal from the brake stroke sensor 35 and calculates the backlash elimination-purpose target motor torque GaTm corresponding to the decrease speed using a preset map or mathematical function. Then, the 4WD controller 8 proceeds to step S460. In this embodiment, the backlash elimination-purpose target motor torque GaTm is set to a value proportional to the decrease amount when the decrease amount is greater than or equal to a prescribed value. However, it is also acceptable to keep the backlash elimination-purpose target motor torque GaTm fixed irregardless of the decrease amount.

In step S460, the corresponding target armature current GaIa to be used for eliminating backlash is calculated using the backlash elimination-purpose target motor torque GaTm as a variable. Then, in step S470, the induced voltage GaE of the motor 4 is calculated based on the rotational speed Nm of the motor 4 and the motor field current Ifm, which has been fixed at a prescribed value. Then, the 4WD controller 8 proceeds to step S480. If the backlash elimination control is only executed when the vehicle is starting to move from a stop, it is acceptable to ignore the fluctuations in the induced voltage GaE of the motor 4 and execute the processing using a fixed value for (i.e., without calculating) the induced voltage GaE.

In step S480 the backlash elimination-purpose target voltage GaV of the generator is calculated, and in step S490 the corresponding target generator load torque GaTh is calculated using the target voltage GaV as a variable. In step 500, the calculated values are outputted and the 4WD controller 8 proceeds to step S510.

In step S510, the backlash elimination flag GATAFLG is set to 1 and the controller proceeds to step S530. Setting the backlash elimination flag GATAFLG to 1 causes the surplus torque converting section 8G to process the motor torque in accordance with the outputted target voltage GaV and target generator load torque GaTh. In short, since backlash elimination processing is in progress, the motor 4 is put into a state of very small torque production.

In step S530, the 4WD controller 8 uses the clutch control section 8D to match the motor rotational speed (which is the input rotational speed of the clutch) and the average rear wheel speed (which is the output rotational speed of the clutch) together and connects the clutch 12 after both rotational speeds are the same. Then processing ends and the 4WD controller 8 returns to the beginning of the control loop.

Meanwhile, if the backlash elimination flag GATAFLG is not 0 in step S410, i.e., if it is determined that backlash elimination processing is in progress, the 4WD controller 8 proceeds to step S540. In step S540, the 4WD controller 8 finds the accelerator position (acceleration instruction amount) based on the signal from the accelerator sensor 19 and determines if the accelerator position is greater than 5%. If the throttle opening is greater than 5%, then the controller proceeds to step S550, where the backlash elimination flag GATAFLG is set to 0 and the control loop ends and returns to the beginning.

Meanwhile, if the throttle opening is determined to be less than or equal to 5% in step S540, then the 4WD controller 8 proceeds to step S530 and the clutch 12 is connected if it is not already connected. Then the control loop ends.

Figure 20:
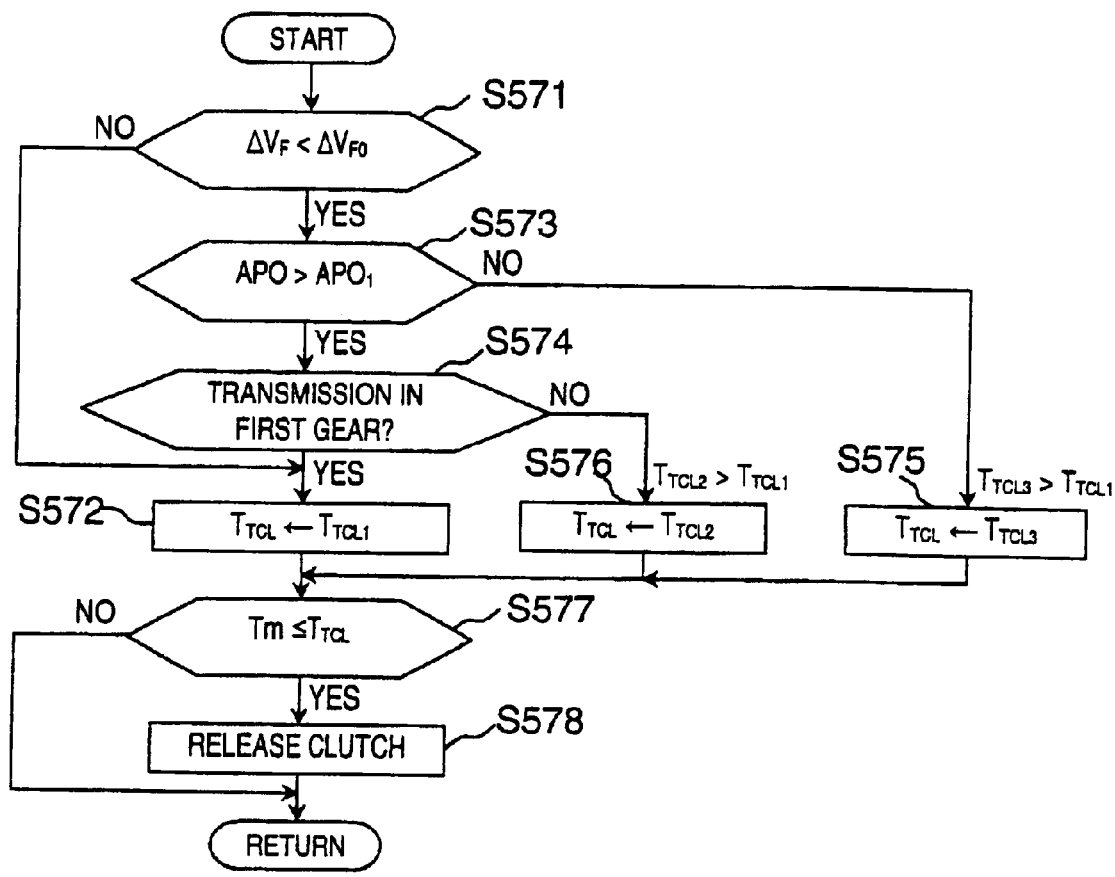
FIG. 20 is a flow chart showing the processing sequence executed by the target motor torque determining section of the clutch control section 8D for setting the target motor torque used by the 4WD controller in the vehicle driving force control apparatus illustrated in FIG. 1 in accordance with the third embodiment of the present invention.

The processing executed by the clutch control section 8D will now be described based on FIG. 20. This processing is executed before the clutch 12 is released when it is time for the vehicle to shift from the four-wheel drive state to the two-wheel drive state. More specifically, this processing sets the prescribed torque value $T_{TCL}$ that will be used as the reference target motor torque Tm (which decreases when it is time for the vehicle to shift from the four-wheel drive state to the two-wheel drive state) for releasing the clutch release. Thus, the clutch 12 is released when the target motor torque Tm calculated as previously described becomes equal to or less than the prescribed motor torque value $T_{TCL}$.

First, in step S571, the 4WD controller 8 determines if the slippage speed $\Delta V_F$ calculated by the processing shown in FIG. 5 is greater than or equal to a preset value $\Delta V_{F0}$, e.g., 5 km/h. If the slippage speed $\Delta V_F$ is greater than or equal to the preset value $\Delta V_{F0}$, the 4WD controller 8 proceeds to step S572. Otherwise, the 4WD controller 8 proceeds to step S573.

In step S573, the 4WD controller 8 determines if the accelerator pedal depression amount (operation amount), i.e., accelerator position (APO), detected by the accelerator sensor 29 is larger than a prescribed value $APO_1$. If the accelerator position APO is larger than the prescribed value $APO_1$, the controller proceeds to step S574. If the accelerator position APO is less than or equal to the prescribed value $APO_1$, the 4WD controller 8 proceeds to step S575.

In step S574, the 4WD controller 8 determines if the transmission is currently in first gear (or "first speed"), which is the gear with the largest reduction ratio (gear ratio). If the current gear is first gear, i.e., if the current reduction ratio (gear ratio) is greater than a prescribed value corresponding to "first gear," the 4WD controller 8 proceeds to step S572. If not, i.e., if the reduction ratio (gear ratio) is less or equal than the prescribed value corresponding to "first gear," the 4WD controller 8 proceeds to step S576.

In step S572, the 4WD controller 8 assigns the comparatively small prescribed value $T_{TCL1}$ as the prescribed motor torque value $T_{TCL}$ for clutch release and then proceeds to step S577.

In step S576, the 4WD controller 8 assigns the comparatively large prescribed value $T_{TCL2}$, which is larger than the prescribed value $T_{TCL1}$, as the prescribed motor torque value $T_{TCL}$ for clutch release and then proceeds to step S577.

In step S575, the 4WD controller 8 assigns the comparatively large prescribed value $T_{TCL3}$, which is larger than the prescribed value $T_{TCL1}$, as the prescribed motor torque value $T_{TCL}$ for clutch release and then proceeds to step S577.

Thus, the processing executed by steps S573 and S574 constitutes a target motor torque determining section configured to determine a prescribed drive torque value $T_{TCL}$ for releasing the clutch 12 based on the electric power supplying capacity detected by an electric power supplying status detecting section.

In step S577, the 4WD controller 8 determines if the target motor torque Tm calculated with, for example, the processing shown in FIG. 7 is less than or equal to the prescribed motor torque value $T_{TCL}$. If the target motor torque Tm is less than or equal to the prescribed motor torque value $T_{TCL}$, the 4WD controller 8 proceeds to step S578. Otherwise, the 4WD controller 8 returns to the main program.

In step S578, the 4WD controller 8 releases the clutch 12 and then returns to the main program.

With the processing just described, the prescribed motor torque value $T_{TCL}$ used as the target motor torque Tm at which the target clutch will be released is set to a larger value, i.e., the prescribed value $T_{TCL2}$ or the prescribed value $T_{TCL3}$, when the electric power generation quantity of the generator 7 (which is dependent upon by the engine 2) is determined to be small by the electric power generation status detecting section 8J, such as when either the accelerator position APO is less then or equal to the prescribed value $APO_1$, or the engine output is small, or the gear ratio of the transmission is less than or equal to a prescribed value. Thus, when the generated electric power is insufficient because the electric power generation quantity of the generator 7 (which is dependent upon by the engine 2) is small, the occurrence of shock at the time of clutch release can be avoided by keeping the difference between the electric motor torque and the target torque value small at the time of clutch release by keeping the electric motor torque from falling below the target value before the clutch 12 is released. For a given engine output, if the gear ratio of the transmission decreases due to upshifting or the like, a larger portion of the engine torque will be consumed in driving the wheels 1L and 1R and the electric power generation quantity of the generator 7 (which is dependent upon by the engine 2) will decrease relatively.

Next, the processing executed by the engine controller 18 will be described with reference to FIG. 21. The processing executed by the engine controller 18 of this third embodiment is the same as the first embodiment, except for the additional steps S650 and S660. In accordance with a prescribed sampling time cycle, the engine controller 18 executes the processing shown in FIG. 21 based on the input signals.

In step S610, the engine controller 18 computes the target output torque TeN requested by the driver based on the detection signal from the accelerator sensor 20 and then proceeds to step S620.

In step S620, the engine controller 18 determines if the output torque limit TeM has been received from the 4WD controller 8. If it is determined that the output torque limit TeM has been received, the engine controller 18 proceeds to step S630. Otherwise, the engine controller 18 proceeds to step S650.

In step S630, the engine controller 18 determines if the output torque limit TeM is larger than the target output torque TeN. If the output torque limit TeM is larger, the engine controller 18 proceeds to step S640. Meanwhile, if the output torque limit TeM is smaller than or equal to the target output torque TeN, the engine controller 18 proceeds to step S650.

In step S640, the engine controller 18 assigns the value of the output torque limit TeM to as the target output torque TeN, thereby increasing the target output torque TeN, and proceeds to step S650.

In step S650, the engine controller 18 determines if the value of the backlash elimination flag GATAFLG is 1, i.e., if backlash elimination processing is in progress. If backlash elimination processing is determined to be in progress, the engine controller 18 proceeds to step S660. If backlash elimination processing is determined not to be in progress, the control program proceeds to step S670.

In step S660, the engine controller 18 increases the target output torque TeN is increased by the amount of the backlash elimination-purpose target load torque GaTh and proceeds to step S670.

In step S670, the engine controller 18 calculates the current output torque Te based on the throttle opening, engine speed, etc., and then the engine controller 18 proceeds to step S680.

In step S680, the engine controller 18 calculates the deviation ΔTe' of the target output torque TeN from the current output torque Te using the equation (12) mentioned above, and then proceeds to step S690.

In step S690, the engine controller 18 calculates a change Δθ in the throttle opening θ in accordance with the deviation ΔTe' and outputs a throttle opening signal corresponding to the throttle opening change amount Δθ to the stepping motor 19. Then the engine controller 18 returns to the beginning of the control loop.

Now the operation of an apparatus constituted as described heretofore will be described. When the torque transferred from the engine 2 to the front wheels 1L and 1R is larger than the road surface reaction force limit torque, i.e., when acceleration slippage occurs in the front wheels 1L and 1R (which are the main drive wheels 1L and 1R), due to the road surface friction coefficient μ being small or the driver depressing the accelerator pedal 17 too deeply, the drive torque transferred to the front wheels 1L and 1R is controlled so as to approach the road surface reaction force limit torque of the front wheels 1L and 1R by having the generator 7 generate at a generator load torque Th corresponding to the amount of acceleration slippage. As a result, acceleration slippage of the front wheels 1L and 1R (which are the main drive wheels) is suppressed.

Furthermore, the acceleration performance of the vehicle is improved because the surplus electric power generated by generator 7 is used to drive the electric motor 4, which drives the rear wheels 3L and 3R (which are the subordinate drive wheels).

Since the motor 4 is driven by the surplus torque that exists in excess of the road surface reaction force limit torque of main drive wheels 1L and 1R, the energy efficiency is improved, which leads to improved fuel consumption.

In a case where the rear wheels 3L and 3R are always driven, several energy conversions (mechanical energy→electrical energy→mechanical energy, etc.) take place and energy losses occur in accordance with the conversion efficiencies. Therefore, the acceleration performance of the vehicle declines in comparison with a case where only the front wheels 1L and 1R are driven. Consequently, it is preferred that driving of the rear wheels 3L and 3R be generally suppressed. Conversely, this embodiment takes into consideration the fact that when traveling on a slippery road surface or the like, even if all of the output torque Te of engine 2 is transferred to front wheels 1L and 1R, not all of the torque will be used as driving force. The driving force that cannot be utilized efficiently by front wheels 1L and 1R is outputted to rear wheels 3L and 3R and the acceleration performance is improved.

Additionally, in this embodiment, when the brake pedal is released from a depressed condition in order to start the vehicle into motion or the like, the controller calculates a target voltage GaV for the motor 4 in accordance with a backlash elimination-purpose target motor torque GaTm that is proportional to the stroke speed of the brake pedal when it is initially released. As a result, the motor 4 generates a very small torque while the clutch 12 is connected. The very small torque, which is not sufficient to drive the rear wheels 3L and 3R (subordinate drive wheels), acts on the torque transmission path between the motor 4 and the rear wheels 3L and 3R and functions to eliminate any backlash (play) existing among the mechanisms (i.e., clutch 12, reduction gear 11, differential gear 13) comprising said torque transmission path.

Afterwards, when acceleration slippage occurs at the front wheels 1L and 1R and the vehicle enters the four-wheel drive state, the backlash has already been eliminated as just described. Consequently, not only is the occurrence of shock resulting from backlash in the power transmission system prevented, but also the response of the rear wheels 3L and 3R to being driven by the motor 4 is improved because the backlash in the power transmission system has already been eliminated before the motor starts driving the rear wheels 3L and 3R. In short, the response of the vehicle when it shifts into the four-wheel drive state is improved. Then, when the motor torque for four-wheel drive becomes larger than small motor torque GaTh, the actual motor torque will be the motor torque for four-wheel drive.

If the speed of the brake pedal is fast when it is initially released, it is highly likely that the accelerator pedal 17 will be depressed immediately and acceleration will commence, i.e., the transition to four-wheel drive will be executed early. In this embodiment, the faster the speed of the initially released brake pedal 34 is, the larger the value to which the very small torque GaTh of the motor 4 is set. As a result, when the brake release speed is faster, backlash is eliminated earlier so that earlier transition to four-wheel drive can be accommodated.

Even if the engine 2 is in a driving state, it is not necessary to eliminate the backlash if the vehicle is in a non-driving range in which the output torque of the engine 2 is not transmitted to the main drive wheels, i.e., the front wheels 1R and 1L. Therefore, the generation of unnecessary small torque is avoided in step S420 by preventing the execution of backlash elimination processing. In other words, wasting of electric energy is prevented by preventing the generation of a small electric current by the generator 7. Moreover, it is also acceptable to design the control program such that, even if backlash prevention is in progress, the 4WD controller 8 determines if the vehicle is in a driving range in step S540, for example, and, if the vehicle is in a non-driving range, the 4WD controller 8 proceeds to step S550 and stops the backlash elimination.

Backlash elimination is also stopped when the accelerator position exceeds a prescribed amount (e.g., 5% as in step S540). Although it is acceptable to set the prescribed accelerator position to 0%, in a case where acceleration slippage occurs and the vehicle shifts into four-wheel drive slightly after the vehicle begins to move, it is possible that backlash will develop during the initial small amount of vehicle movement even though the backlash was eliminated in advance. Therefore, in the embodiment, the prescribed amount was set to 5%, which is the approximate accelerator position expected to exist when the accelerator pedal 17 has been depressed slightly and the vehicle either starts moving or starts to undergo acceleration slippage. Thus, it is generally preferred to set the prescribed accelerator position to an amount that approximates the accelerator position expected to exist when the accelerator pedal 17 has been depressed slightly and the vehicle either starts moving or starts to undergo acceleration slippage.

Figure 22:
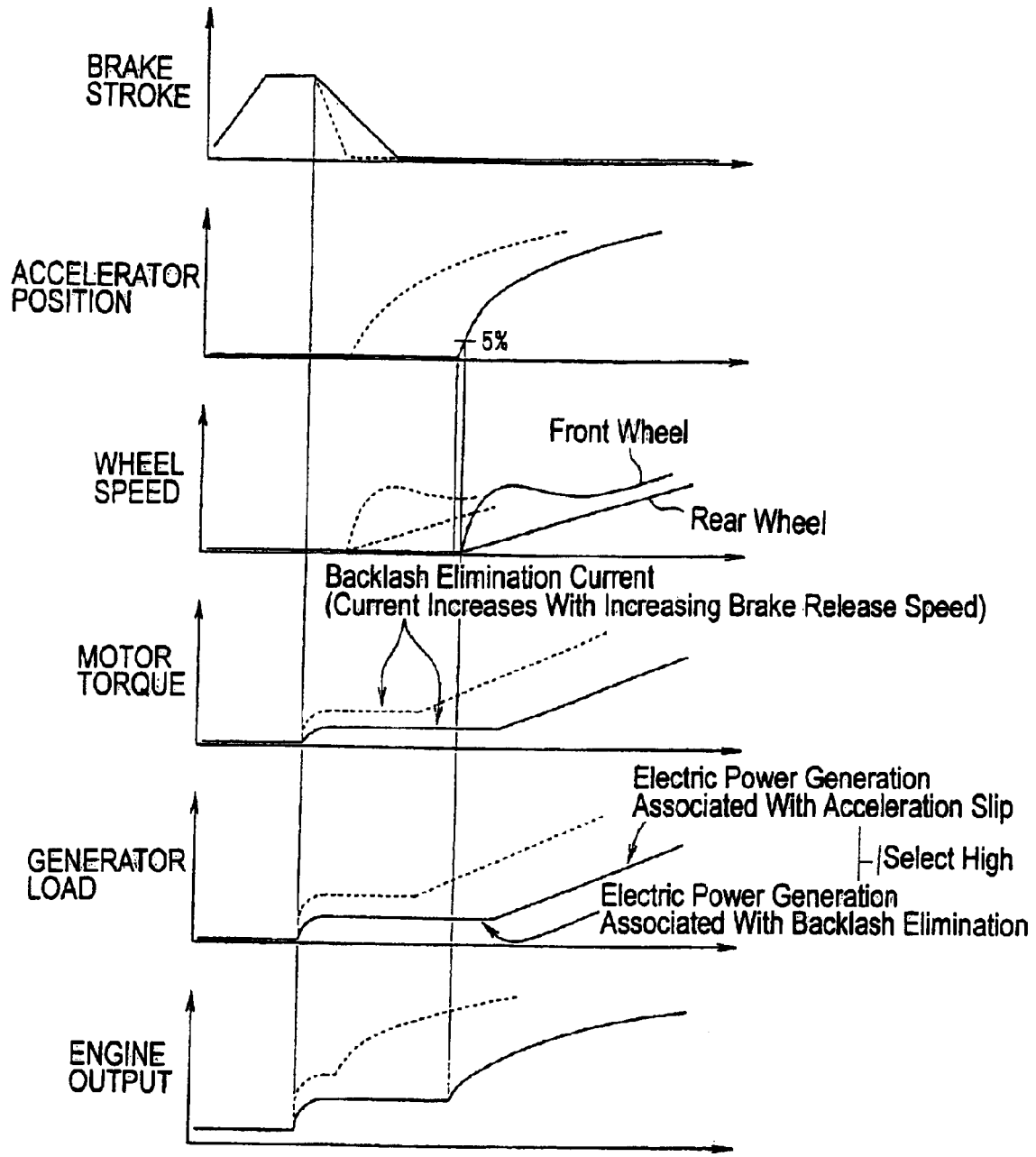
FIG. 22 is a time chart for the vehicle driving force control apparatus illustrated in FIG. 1 in accordance with the third embodiment of the present invention.

FIG. 22 is a time chart for the processing described above. In FIG. 22, both the solid lines and the broken lines indicate actual implementations of the previously described processing. The broken lines are for a case in which the brake release speed is faster and the accelerator depression timing is earlier than in the case of the solid lines. In either case, the vehicle shifts into the four-wheel drive state with good response.

Figure 23:
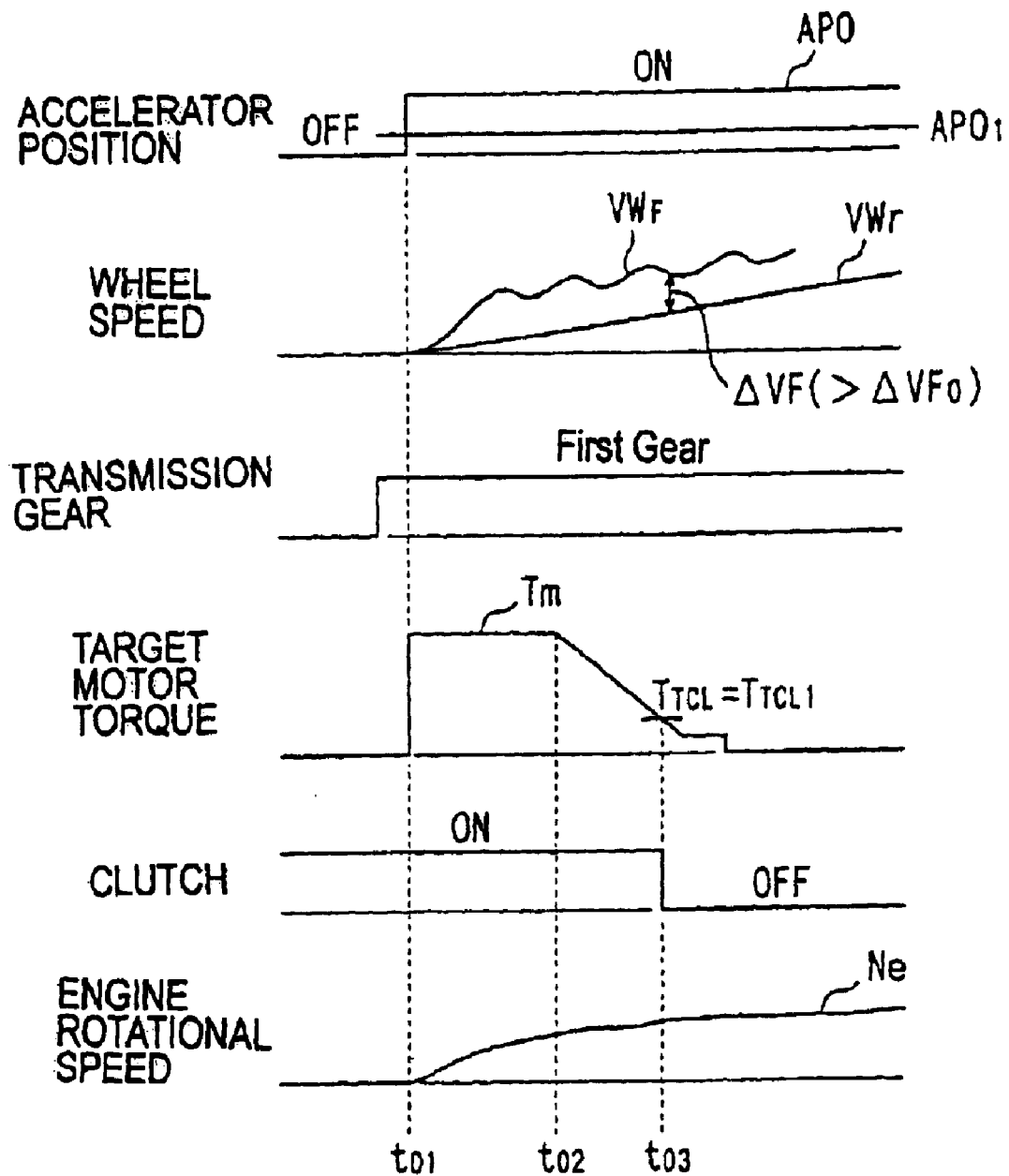
FIG. 23 is a time chart for the vehicle driving force control apparatus illustrated in FIG. 1 in accordance with the third embodiment of the present invention.

The operational effects of the processing shown in FIG. 20 will now be described using the timing chart shown in FIG. 23. In the timing chart, at time t01 the accelerator pedal 17 is depressed by a certain amount (APO>APO1) from a stopped state in which the transmission gear ratio (gear position) corresponds to first gear and the accelerator pedal 17 has been released. The main drive wheels 1L and 1R undergo acceleration slippage while rotating at an average front wheel speed $V_{wf}$. As a result, the vehicle enters the four-wheel drive state and the motor 4 is driven with a particular target motor torque Tm. Then, after time t02, the target motor torque Tm is decreased in order to shift to the two-wheel drive state. At time t03, the target motor torque Tm becomes equal to or less than the prescribed motor torque value $T_{TCL}$. Thus the clutch 12 is released and the vehicle shifts to the two-wheel drive state at time to t03.

In this simulation, since the front wheels (main drive wheels) 1L and 1R are slipping while rotating at an average speed $V_{wf}$, a speed difference, i.e., slippage speed, $\Delta V_F$ occurs between the front wheels and the rear wheels, which are moving at an average speed $V_{Fr}$ that is equal to or approximately equal to the speed of the vehicle body. In this example, since the slippage speed $\Delta V_F$ is larger than the prescribed value $\Delta V_{F0}$, the control processing of FIG. 20 assigns the comparatively small prescribed value $T_{TCL1}$ as the prescribed motor torque value $T_{TCL}$ regardless of the accelerator position APO and the transmission gear ratio (gear position). The clutch is released at time t03, which is when the motor torque Tm reaches or falls below this prescribed motor torque value $T_{TCL}$. Thus, when the main drive wheels, i.e., front wheels 1L and 1R, which are rotated by the engine 2, are slipping, the engine 2 rotates at a comparatively high rotational speed and the electric power generation quantity of the generator 7 (which is dependent upon by the engine) is determined to be large by the electric power generation status detecting section 8J. Consequently, plenty of electric power can be generated and the target motor torque can be achieved readily without the actual motor torque falling below the target value. Thus, even after the target motor torque Tm has decreased to where it is less than the prescribed motor torque value $T_{TCL}$, which was set to the comparatively small prescribed value $T_{TCL1}$, there is no deviation between the actual motor torque and the target value and shock does not occur when the clutch 12 is released. It is also acceptable to set the target motor torque according to the slippage amount because when the slippage amount of the front wheels 1L and 1R is small, the power generation quantity of the generator 7 is also small.

Figure 24:
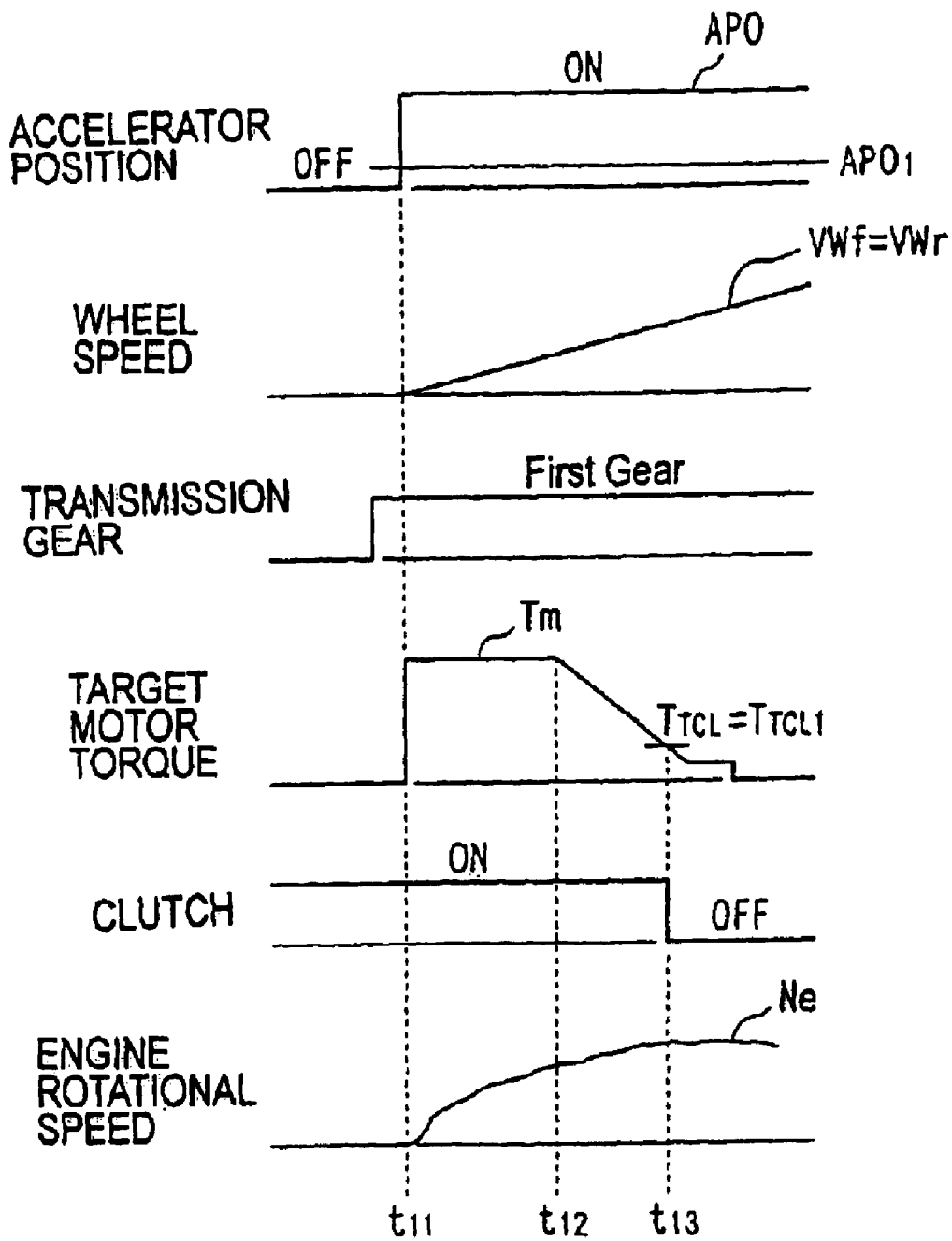
FIG. 24 is a time chart for the vehicle driving force control apparatus illustrated in FIG. 1 in accordance with the third embodiment of the present invention.
Figure 25:
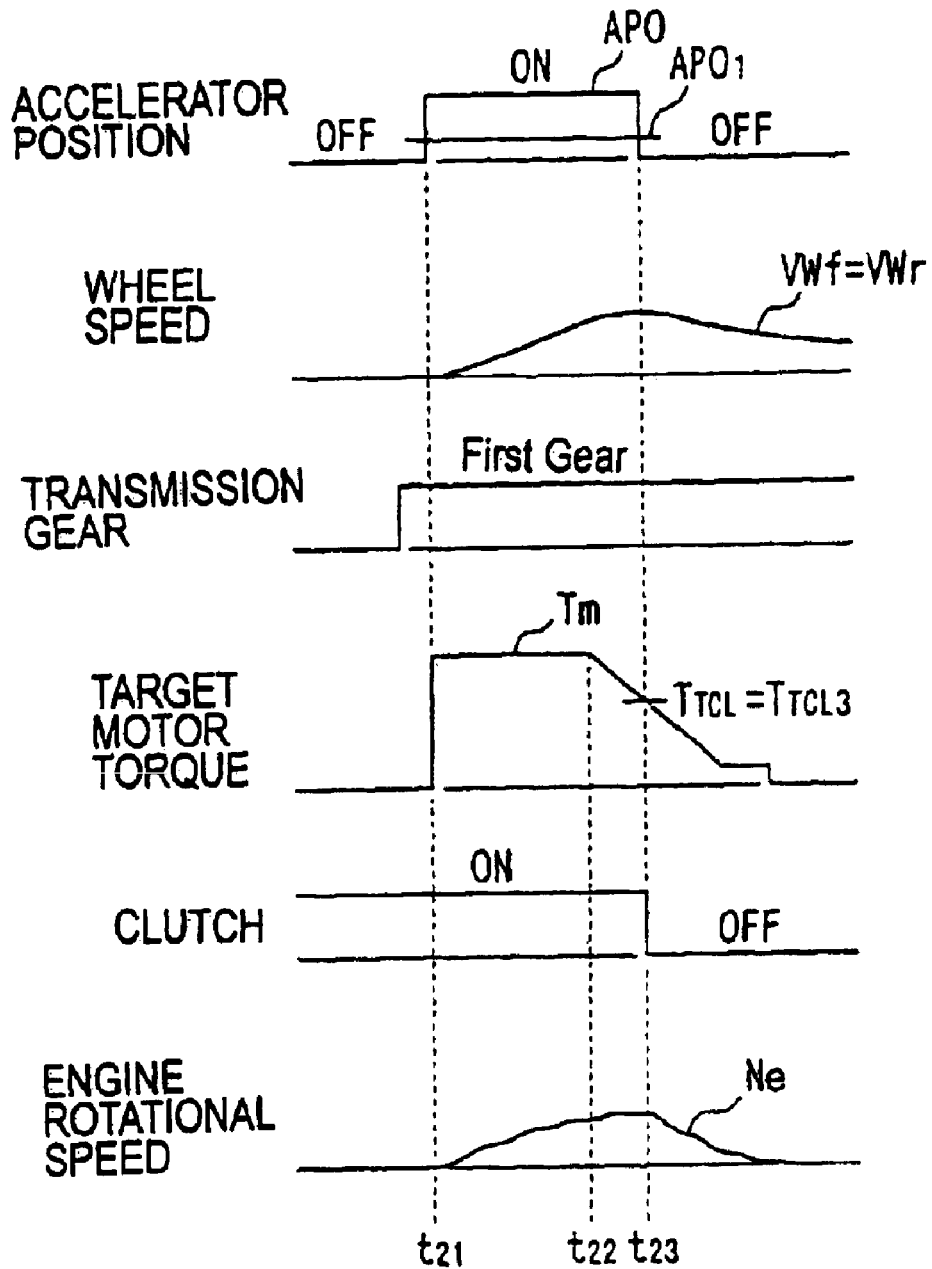
FIG. 25 is a time chart for the vehicle driving force control apparatus illustrated in FIG. 1 in accordance with the third embodiment of the present invention.

In the timing chart of FIG. 24 at time t11, the accelerator pedal 17 is depressed by a certain amount (APO>APO1) from a stopped state in which the transmission gear ratio (gear position) corresponds to first gear and the accelerator pedal 17 has been released. The vehicle starts moving without any excessive slippage occurring in the main drive wheels 1L and 1R, which rotate at an average front wheel speed $V_{wf}$. As a result, the vehicle enters the four-wheel drive state and the motor is driven with a particular target motor torque Tm. Then, after time t12, the target motor torque Tm is decreased in order to shift to the two-wheel drive state. At time t13, the target motor torque Tm becomes equal to or less than the prescribed motor torque value $T_{TCL}$. Thus the clutch is released and the vehicle shifts to the two-wheel drive state at time t13.

In this simulation, since the average speed $V_{wf}$ is such that the front wheels (main drive wheels) are not slipping excessively, the speed difference, i.e., slippage speed, $\Delta V_F$ that occurs between the front wheels and the rear wheels (which are moving at an average speed $V_{Fr}$ that is equal to or approximately equal to the speed of the vehicle body) is smaller than the prescribed value $\Delta V_{F0}$. In this example, since the accelerator position APO is held at a value larger than the prescribed value $APO_1$ and the transmission gear ratio (gear position) remains at first gear, the control processing of FIG. 20 assigns the comparatively small prescribed value $T_{TCL1}$, as the prescribed motor torque value $T_{TCL}$ (similarly to the case illustrated in FIG. 23) and the clutch is released at time t13, which is when the motor torque Tm reaches or falls below this prescribed motor torque value $T_{TCL}$. Thus, when the accelerator position is large and the gear ratio is large, the electric power generation quantity of the generator (which is dependent upon by the engine) is large. Consequently, plenty of electric power can be generated and the target motor torque can be achieved readily without the actual motor torque falling below the target value. Thus, even after the target motor torque Tm has decreased to where it is less than the prescribed motor torque value $T_{TCL}$, which was set to the comparatively small prescribed value $T_{TCL1}$, there is no deviation between the actual motor torque and the target value and shock does not occur when the clutch 12 is released.

Meanwhile, in the timing chart of FIG. 14, at time t21, the accelerator pedal 17 is depressed by a certain amount (APO>APO$_1$) from a stopped state in which the transmission gear ratio (gear position) corresponds to first gear and the accelerator pedal 17 has been released. The vehicle starts moving without any excessive slippage occurring in the main drive wheels 1L and 1R, which rotate at an average front wheel speed $V_{wf}$. As a result, the vehicle enters the four-wheel drive state and the motor is driven with a particular target motor torque Tm. Then, after time t22, the target motor torque Tm is decreased in order to shift to the two-wheel drive state. At time t23, the accelerator pedal 17 is released (APO<APO$_1$) and, substantially simultaneously, the target motor torque Tm becomes equal to or less than the prescribed motor torque value $T_{TCL}$. Thus, the clutch 17 is released and the vehicle shifts to the two-wheel drive state at time t23.

In this simulation, since the accelerator pedal 17 is released at time t23 and the accelerator position APO becomes less than or equal to the prescribed value $APO_1$, the comparatively large prescribed value $T_{TCL3}$ is assigned as the prescribed motor torque value $T_{TCL}$ and, as a result, the clutch 12 is released and the vehicle shifted into two-wheel drive substantially simultaneously with the release of the accelerator pedal 17. Thus, when the accelerator position is small, the electric power generation quantity of the generator (which is dependent upon by the engine) is small and sufficient electric power cannot be generated. Consequently the target motor torque cannot be achieved readily and there is the possibility that the actual motor torque will fall below the target value. Therefore, under such conditions as these, the prescribed motor torque value $T_{TCL}$ for releasing the clutch 12 is set to a large value to speed up the clutch release timing and prevent the motor torque falling below the target value before the clutch 12 is released. As a result, the difference between the electric motor torque and the target value at the time of clutch release is small and the occurrence of shock at the time of clutch release is avoided.

Figure 26:
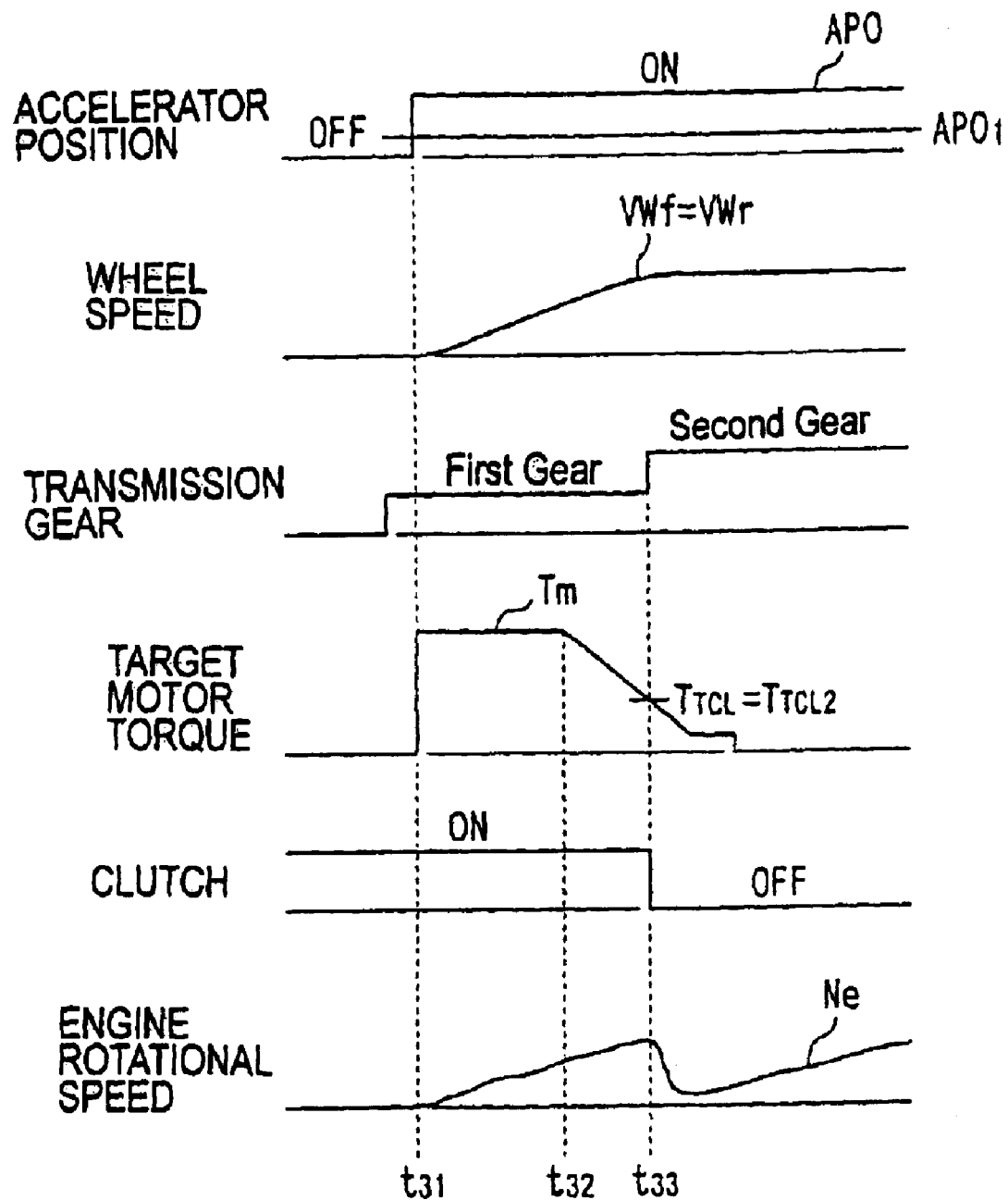
FIG. 26 is a time chart for the vehicle driving force control apparatus illustrated in FIG. 1 in accordance with the third embodiment of the present invention.

Meanwhile, in the timing chart of FIG. 26, at time t31, the accelerator pedal 17 is depressed by a certain amount (APO>APO$_1$) from a stopped state in which the transmission gear ratio (gear position) corresponds to first gear and the accelerator pedal 17 has been released. The vehicle starts moving without any excessive slippage occurring in the main drive wheels 1L and 1R, which rotate at an average front wheel speed $V_{wf}$. As a result, the vehicle enters the four-wheel drive state and the motor is driven with a particular target motor torque Tm. Then, after time t32, the target motor torque Tm is decreased in order to shift to the two-wheel drive state. At time t33, the transmission upshifts to a gear ratio (gear position) corresponding to second gear and, substantially simultaneously, the target motor torque Tm becomes equal to or less than the prescribed motor torque value $T_{TCL}$. Thus the clutch is released and the vehicle shifts to the two-wheel drive state at time t33. Since the accelerator pedal depression amount remains constant, the engine rotational speed Ne initially decreases in conjunction with the upshift but continues to increase after time t33.

In this simulation, since the transmission upshifts to a gear ratio (gear position) corresponding to second gear at time t33, the comparatively large prescribed value $T_{TCL2}$ is assigned as the prescribed motor torque value $T_{TCL}$ and, as a result, the clutch is released and the vehicle shifted into two-wheel drive substantially simultaneously with the release of the accelerator pedal. Thus, when the transmission gear ratio is small, the electric power generation quantity of the generator (which is dependent upon by the engine) is small and sufficient electric power cannot be generated. Consequently the target motor torque cannot be achieved readily and there is the possibility that the actual motor torque will fall below the target value. Therefore, under such conditions as these, the prescribed motor torque value $T_{TCL}$ for releasing the clutch is set to a large value to speed up the clutch release timing and prevent the motor torque falling below the target value before the clutch is released. As a result, the difference between the electric motor torque and the target value at the time of clutch release is small and the occurrence of shock at the time of clutch release is avoided.

Although the embodiment uses an internal combustion engine as the main drive source, it is also acceptable to use an electric motor for the main drive source.

Moreover, although the embodiment illustrates the application of the invention to a four-wheeled vehicle, it is also acceptable to apply the invention to a two-wheeled vehicle that uses an electric motor 4 as the main drive source.

Fourth Embodiment

Referring now to FIGS. 27–30, a vehicle driving force control apparatus in accordance with a fourth embodiment will now be explained. In view of the similarity between the preceding embodiments and this embodiment, the parts or steps of this embodiment that are identical to the parts or steps of the preceding embodiments will be given the same reference numerals as the parts or steps of the preceding embodiments. Moreover, the descriptions of the parts or steps of this embodiment that are identical to the parts or steps of the preceding embodiments may be omitted for the sake of brevity.

The vehicle driving force control apparatus of this fourth embodiment of the present invention is installed in the four wheel drive vehicle that is diagrammatically illustrated in FIG. 1. The vehicle driving force control apparatus of this fourth embodiment is basically the same as the third embodiment of the present invention, discussed above, except for the setting of the target torque by the clutch control section 8D is based on the processing of FIG. 27 instead of the processing of FIG. 20.

Thus, the electric motor 4, the generator 7 and the 4WD controller 8 are configured and arranged this embodiment of the present invention as illustrated in FIG. 2. Also, the 4WD controller 8 for the vehicle driving force control apparatus of this fourth embodiment is diagrammatically illustrated as a block diagram in FIG. 3. Moreover, the 4WD controller 8 for the vehicle driving force control apparatus of this fourth embodiment executes the processing sequence illustrated in FIGS. 4–7 in the same manner as discussed above with reference to the first embodiment. In other words, the processing sequence executed by the 4WD controller 8 of the fourth embodiment is generally shown in FIG. 4 as discussed above. The processing sequence executed by the drive mode selection section 8D of the fourth embodiment is shown in FIG. 5 as discussed above. The processing sequence executed by the surplus torque computing section 8E of the fourth embodiment is shown in FIG. 6 as discussed above. The processing sequence executed by the target torque limiting section 8F of the fourth embodiment is shown in FIG. 7 as discussed above. The processing sequence executed by the surplus torque converting section 8G of this fourth embodiment is shown in FIG. 18. The processing sequence executed by the backlash elimination control section 8L of this fourth embodiment is shown in FIG. 19. In this embodiment, the motor control section 8C constitutes the electric motor torque control section of the present invention, and the clutch control section 8D constitutes the clutch connection control section of the present invention.

The engine controller 18 for the vehicle driving force control apparatus of this fourth embodiment executes the processing sequence illustrated in FIG. 21 instead of the processing sequence of FIG. 11.

With the four-wheel drive vehicle driving force control apparatus of this embodiment of the present invention as described below, when it is time for the vehicle to shift from the four-wheel drive state to the two-wheel drive state the electric motor torque is set to decrease in accordance with the generator electric power generation quantity (which is dependent upon by the engine 2) when the clutch 12 is released and the vehicle shifts from the four-wheel drive state to the two-wheel drive state. More specifically, when the generator electric power generation quantity (which is dependent upon by the engine 2) is determined by the electric power generation status detecting section 8J to be small, the vehicle driving force control apparatus reduces the electric motor torque quickly so that it becomes difficult for the electric motor torque to fall below the target value. As a result, the difference between the electric motor torque and the target value at the time of clutch release is small and shock can be avoided.

The processing executed by the clutch control section 8D of the 4WD controller 8 will now be described based on FIG. 27. This processing is executed before the clutch is released when it is time for the vehicle to shift from the four-wheel drive state to the two-wheel drive state. More specifically, this processing sets slope along which the target motor torque is decreased. Thus, the clutch is released when the target motor torque Tm set using this processing becomes equal to or less than the prescribed motor torque value $T_{TCL}$.

Figure 18:
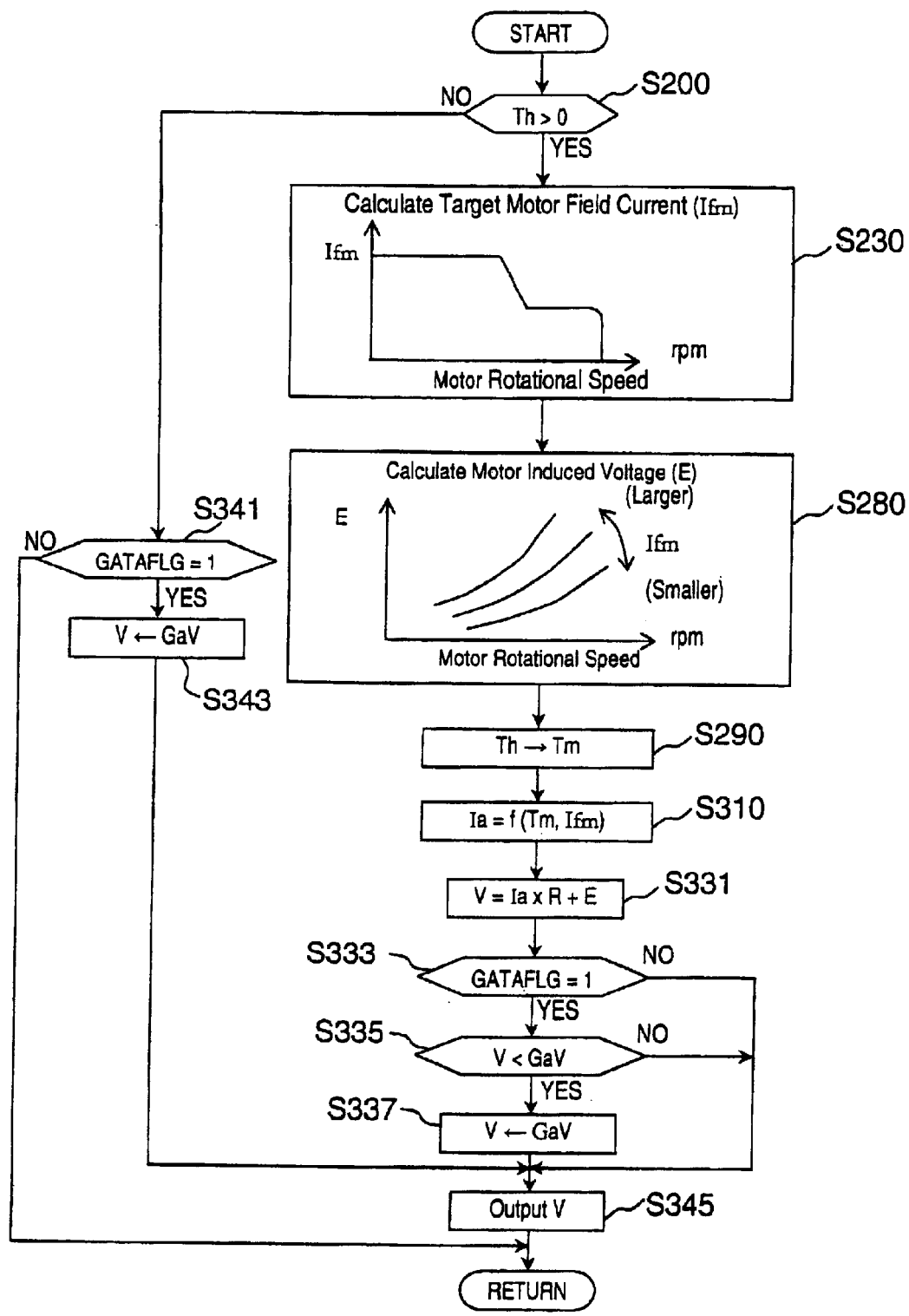
FIG. 18 is a flow chart showing the processing sequence executed by the surplus torque converting section of the 4WD controller for the vehicle driving force control apparatus illustrated in FIG. 1 in accordance with a third embodiment of the present invention.

First, in step S571', the 4WD controller 8 determines if the target motor torque Tm calculated by the processing shown in FIG. 18 is less than the previous motor torque value $Tm_0$. If the target motor torque Tm is less than the previous motor torque value $Tm_0$, the 4WD controller 8 proceeds to step S572'. Otherwise, the 4WD controller 8 proceeds to step S573'.

In step S572', the 4WD controller 8 determines if the accelerator pedal depression amount (operation amount), i.e., accelerator position (APO), detected by the accelerator sensor 29 is larger than a prescribed value $APO_1$, which is a comparatively small value set in advance. If the accelerator position APO is larger than the prescribed value $APO_1$, the controller proceeds to step S574'. If the accelerator position APO is less than or equal to the prescribed value $APO_1$, the controller proceeds to step S575'.

In step S574', the 4WD controller 8 determines if the transmission is currently in first gear (or "first speed"), which is the gear with the largest reduction ratio (gear ratio). If the current gear is first gear, i.e., if the current reduction ratio (gear ratio) is greater than a prescribed value corresponding to "first gear," the 4WD controller 8 proceeds to step S576'. If not, i.e., if the reduction ratio (gear ratio) is less or equal than the prescribed value corresponding to "first gear," the controller proceeds to step S577'.

In step S576', the 4WD controller 8 assigns the value obtained by subtracting a comparatively small prescribed value $\Delta Tm_1$ from the previous motor torque value $Tm_0$ as the target motor torque Tm and then proceeds to step S573'.

In step S577', the 4WD controller 8 assigns the value obtained by subtracting a comparatively large prescribed value $\Delta Tm_2$ from the previous motor torque value Tm0 as the target motor torque Tm and then proceeds to step S573'.

In step S575', the 4WD controller 8 assigns the value obtained by subtracting a comparatively large prescribed value $\Delta Tm_3$ from the previous motor torque value $Tm_0$ as the target motor torque Tm and then proceeds to step S573'.

In step S573', the 4WD controller 8 outputs the newly set target motor torque Tm and proceeds to step S578'.

In step S578', the 4WD controller 8 updates the previous motor torque value $Tm_0$ to the newly set target motor torque Tm.

With the processing just described, the target motor torque Tm is decreased quickly (i.e., decreased by a comparatively large prescribed value $\Delta Tm_2$ or $\Delta Tm_3$ each cycle) when the electric power generation quantity of the generator (which is dependent upon by the engine 2) is small. The electric power generation status detecting section 8J can determine that the electric power generation quantity of the 7 is small when it determines that the accelerator position APO is less then or equal to the prescribed value $APO_1$ causing the engine output to be small or when the gear ratio of the transmission is less than or equal to a prescribed value. In other words, the target motor torque Tm is decreased along a large decreasing slope or at a high rate of decrease. Thus, when the generated electric power is insufficient because the electric power generation quantity of the generator 7 (which is dependent upon by the engine) is small, the occurrence of shock at the time of clutch release can be avoided by keeping the difference between the electric motor torque and the target torque value small at the time of clutch release by keeping the electric motor torque from falling below the target value before the clutch is released. For a given engine output, if the gear ratio of the transmission decreases due to upshifting or the like, a larger portion of the engine torque will be consumed in driving the wheels, the engine rotational speed will decrease, and the electric power generation quantity of the generator 7 (which is dependent upon by the engine) will decrease relatively.

The operational effects of the processing shown in FIG. 27 will now be described using the timing chart shown in FIG. 28. In the timing chart, at time t01 the accelerator pedal is depressed by a certain amount ($APO>APO_1$) from a stopped state in which the transmission gear ratio (gear position) corresponds to first gear and the accelerator pedal 17 has been released. The main drive wheels 1L and 1R undergo acceleration slippage while rotating at an average front wheel speed $V_{wf}$. As a result, the vehicle enters the four-wheel drive state and the motor is driven with a particular target motor torque Tm. Then, after time t02, the target motor torque Tm is decreased in order to shift to the two-wheel drive state. At time t03, the target motor torque Tm becomes 0 and, almost simultaneously, the target motor torque Tm becomes equal to or less than the prescribed motor torque value $T_{TCL}$. Thus the clutch is released and the vehicle shifts to the two-wheel drive state at time t03.

Figure 27:
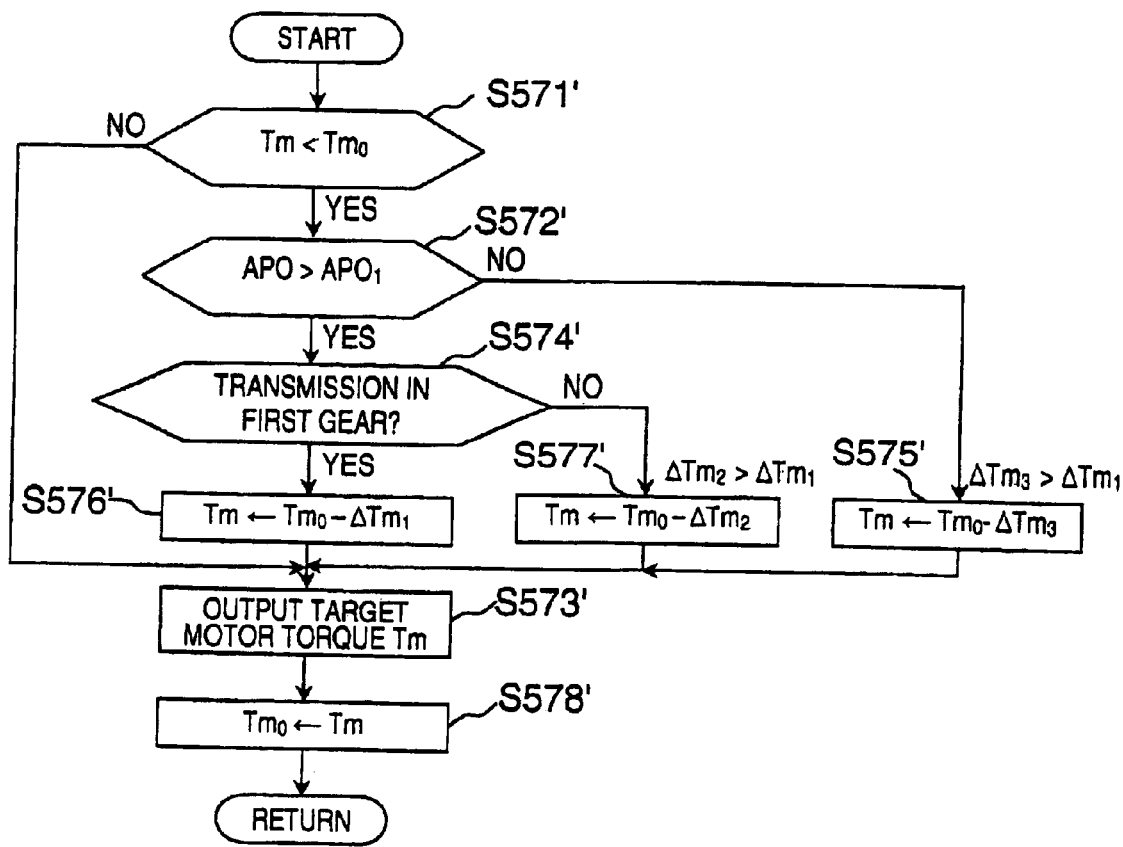
FIG. 27 is a flow chart showing the processing sequence executed by the target motor torque determining section of the clutch control section 8D for setting the target motor torque in the vehicle driving force control apparatus illustrated in FIG. 1 in accordance with a fourth embodiment of the present invention.
Figure 28:
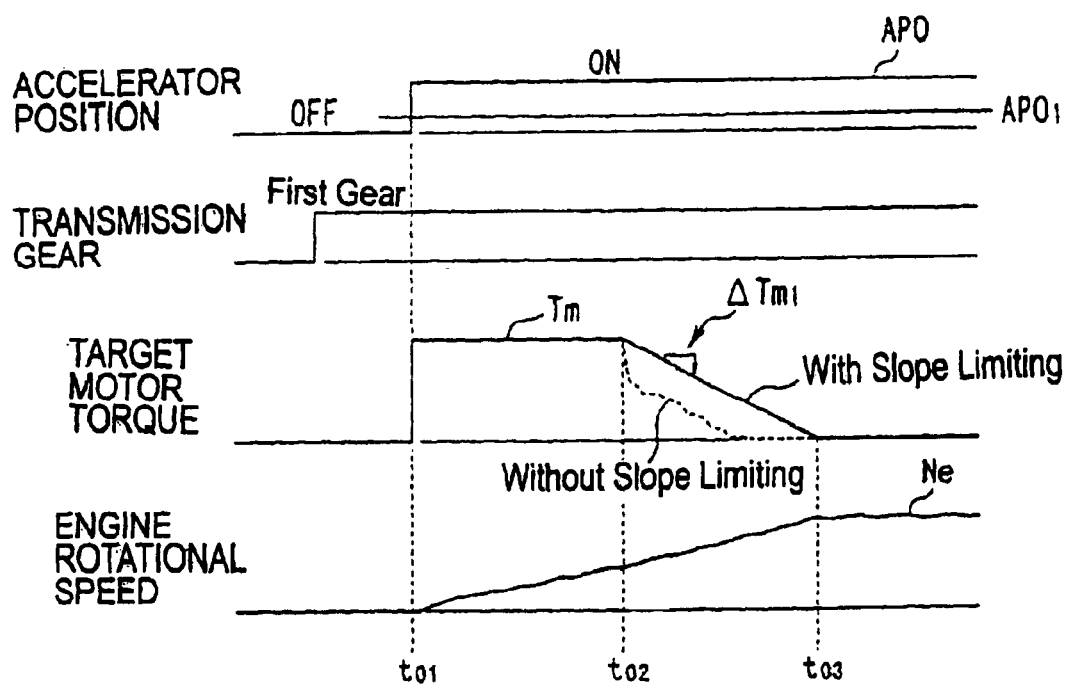
FIG. 28 is a time chart for the vehicle driving force control apparatus illustrated in FIG. 1 in accordance with the fourth embodiment of the present invention.

In this simulation, since the accelerator position APO is held at a value larger than the prescribed value $APO_1$ and the transmission gear ratio (gear position) remains at first gear (which means the transmission gear ratio is large), the control processing of FIG. 27 decreases the target motor torque Tm by the comparatively small prescribed value $\Delta Tm_1$ each sampling cycle. Thus, compared to the slope at which the target motor torque would decrease without slope limiting (which is indicated with a broken line), the final target motor torque Tm decreases more slowly, i.e., decreases along a smaller slope or at a smaller rate of change. When the accelerator position is large or the gear ratio is large as determined by the electric power generation status detecting section 8J, the electric power generation quantity of the generator 7 (which is dependent upon by the engine) is also determined to be large, as described previously. Under such conditions, plenty of electric power can be generated and the target motor torque can be achieved readily. Thus, the target motor torque can be decreased gradually without the actual motor torque falling below the target value. By releasing the clutch 12 when the motor torque is decreasing slowly, shock occurring at the time of clutch release can be held to a minimum.

Figure 29:
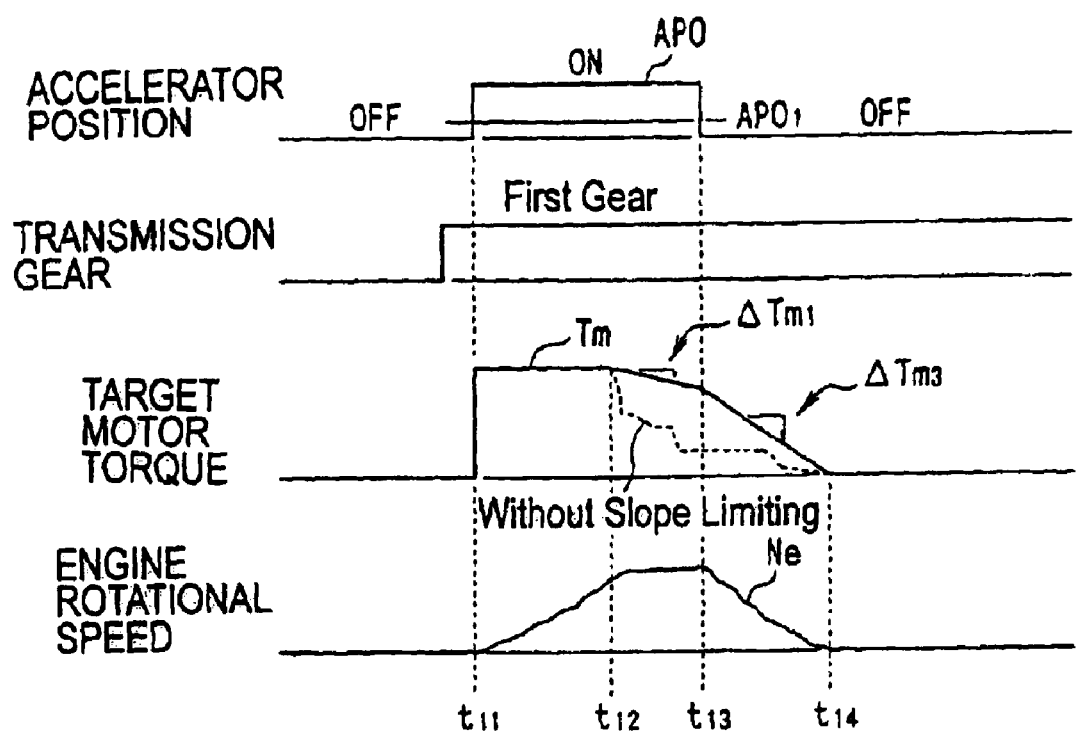
FIG. 29 is a time chart for the vehicle driving force control apparatus illustrated in FIG. 1 in accordance with the fourth embodiment of the present invention.

Meanwhile, in the timing chart of FIG. 29, at time t11 the accelerator pedal 17 is depressed by a certain amount ($APO>APO_1$) from a stopped state in which the transmission gear ratio (gear position) corresponds to first gear and the accelerator pedal has been released. As a result, the vehicle enters the four-wheel drive state and the motor is driven with a particular target motor torque Tm. Then, after time t12, the target motor torque Tm is decreased in order to shift to the two-wheel drive state. At time t13 the accelerator pedal is released ($APO<APO_1$), and at time t14 the target motor torque Tm becomes 0 and, almost simultaneously, the target motor torque Tm becomes equal to or less than the prescribed motor torque value $T_{TCL}$. Thus, the clutch 12 is released and the vehicle shifts to the two-wheel drive state at time t14.

In this simulation, the control processing of FIG. 27 decreases the target motor torque Tm by the comparatively small prescribed value $\Delta Tm_1$ each sampling cycle during the period from time t12 to time t13 because the accelerator position APO is held at a value larger than the prescribed value $APO_1$ and the transmission gear ratio (gear position) remains at first gear (which means the transmission gear ratio is large). However, after the accelerator pedal 17 is released at time t13, the control processing of FIG. 27 decreases the target motor torque Tm by the comparatively large prescribed value $\Delta Tm_3$ each sampling cycle because the accelerator position APO less than or equal to the prescribed value $APO_1$. Thus, compared to the slope at which the target motor torque would decrease without slope limiting (which is indicated with a broken line), the final target motor torque Tm decreases more quickly, i.e., decreases along a larger slope or at a higher rate of change. When the accelerator position is small, the electric power generation quantity of the generator (which is dependent upon by the engine) is also small, as described previously.

Under such conditions, sufficient electric power cannot be generated and it is difficult to achieve the target motor torque, creating the risk that the actual motor torque will fall below the target value. By reducing the target motor torque quickly, the deviation between the actual motor torque and the target value is eliminated and shock is suppressed or prevented from occurring when the clutch is released.

Figure 30:
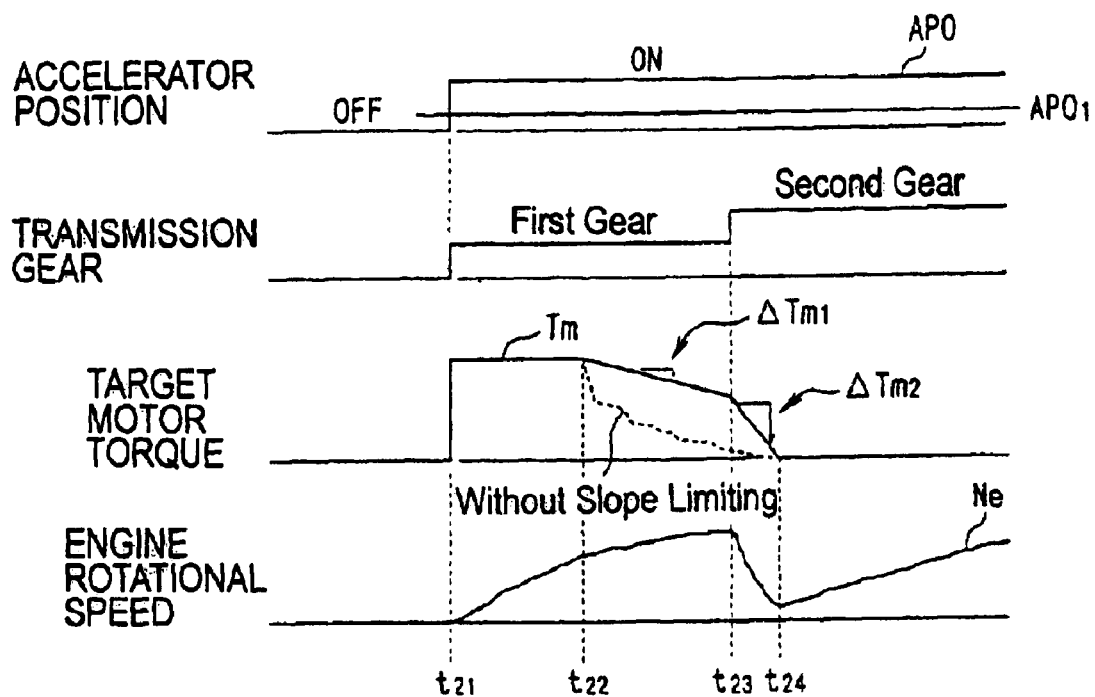
FIG. 30 is a time chart for the vehicle driving force control apparatus illustrated in FIG. 1 in accordance with the fourth embodiment of the present invention.

In the timing chart of FIG. 30, at time t21, the accelerator pedal 17 is depressed by a certain amount (APO>APO$_1$) from a stopped state in which the transmission gear ratio (gear position) corresponds to first gear and the accelerator pedal 17 has been released. As a result, the vehicle enters the four-wheel drive state and the motor 4 is driven with a particular target motor torque Tm. Then, after time t22, the target motor torque Tm is decreased in order to shift to the two-wheel drive state. At time t23 the transmission upshifts to a gear ratio (gear position) corresponding to second gear, and at time t24 the target motor torque Tm becomes 0 and, almost simultaneously, the target motor torque Tm becomes equal to or less than the prescribed motor torque value $T_{TCL}$. Thus the clutch 12 is released and the vehicle shifts to the two-wheel drive state at time t24. Since the accelerator pedal depression amount remains constant, the engine rotational speed Ne continues to increase after time t24.

In this simulation, the control processing of FIG. 27 decreases the target motor torque Tm by the comparatively small prescribed value $\Delta Tm_1$ each sampling cycle during the period from time t22 to time t23 (when the transmission upshifts to second gear) because the accelerator position APO is held at a value larger than the prescribed value APO$_1$ and the transmission gear ratio (gear position) remains at first gear (which means the transmission gear ratio is large). However, after the transmission upshifts to a gear ratio (gear position) corresponding to second gear at time t23, the control processing of FIG. 27 decreases the target motor torque Tm by the comparatively large prescribed value $\Delta Tm_2$ each sampling cycle. Thus, compared to the slope at which the target motor torque would decrease without slope limiting (which is indicated with a broken line), the final target motor torque Tm decreases more quickly, i.e., decreases along a larger slope or at a higher rate of change. When the transmission gear ratio is small, the electric power generation quantity of the generator 7 (which is dependent upon by the engine) is also determined to be small by the electric power generation status detecting section 8J, as described previously. Under such conditions, sufficient electric power cannot be generated and it is difficult to achieve the target motor torque, creating the risk that the actual motor torque will fall below the target value. By reducing the target motor torque quickly, the deviation between the actual motor torque and the target value is eliminated and shock is suppressed or prevented from occurring when the clutch is released.

Although the embodiment uses an internal combustion engine as the main drive source, it is also acceptable to use an electric motor for the main drive source.

Moreover, although the embodiment illustrates the application of the invention to a four-wheeled vehicle, it is also acceptable to apply the invention to a two-wheeled vehicle that uses an electric motor 4 as the main drive source.

Fifth Embodiment

Referring now to FIGS. 31–38, a vehicle driving force control apparatus in accordance with a fifth embodiment will now be explained. In view of the similarity between the preceding embodiments and this embodiment, the parts or steps of this embodiment that are identical to the parts or steps of the preceding embodiments will be given the same reference numerals as the parts or steps of the preceding embodiments. Moreover, the descriptions of the parts or steps of this embodiment that are identical to the parts or steps of the preceding embodiments may be omitted for the sake of brevity.

The vehicle driving force control apparatus of this fifth embodiment of the present invention is installed in the four wheel drive vehicle that is diagrammatically illustrated in FIG. 1. Thus, the electric motor 4, the generator 7 and the 4WD controller 8 are configured and arranged in this fifth embodiment of the present invention as illustrated in FIG. 2. Also, the 4WD controller 8 for the vehicle driving force control apparatus of this fifth embodiment is diagrammatically illustrated as a block diagram in FIG. 3.

Figure 31:
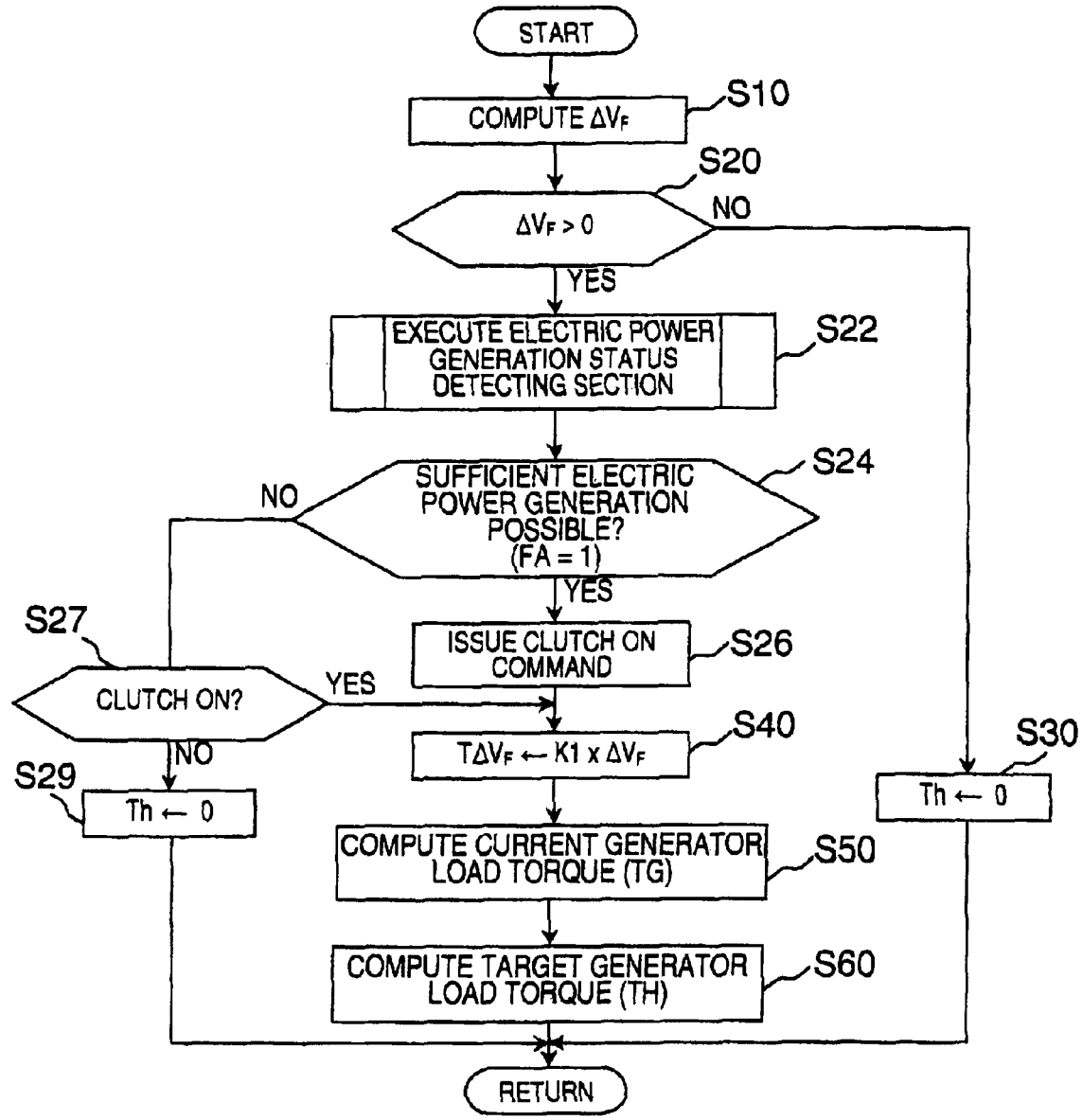
FIG. 31 is a flow chart showing the processing sequence by the surplus torque computing section of a fifth embodiment of the present invention.
Figure 32:
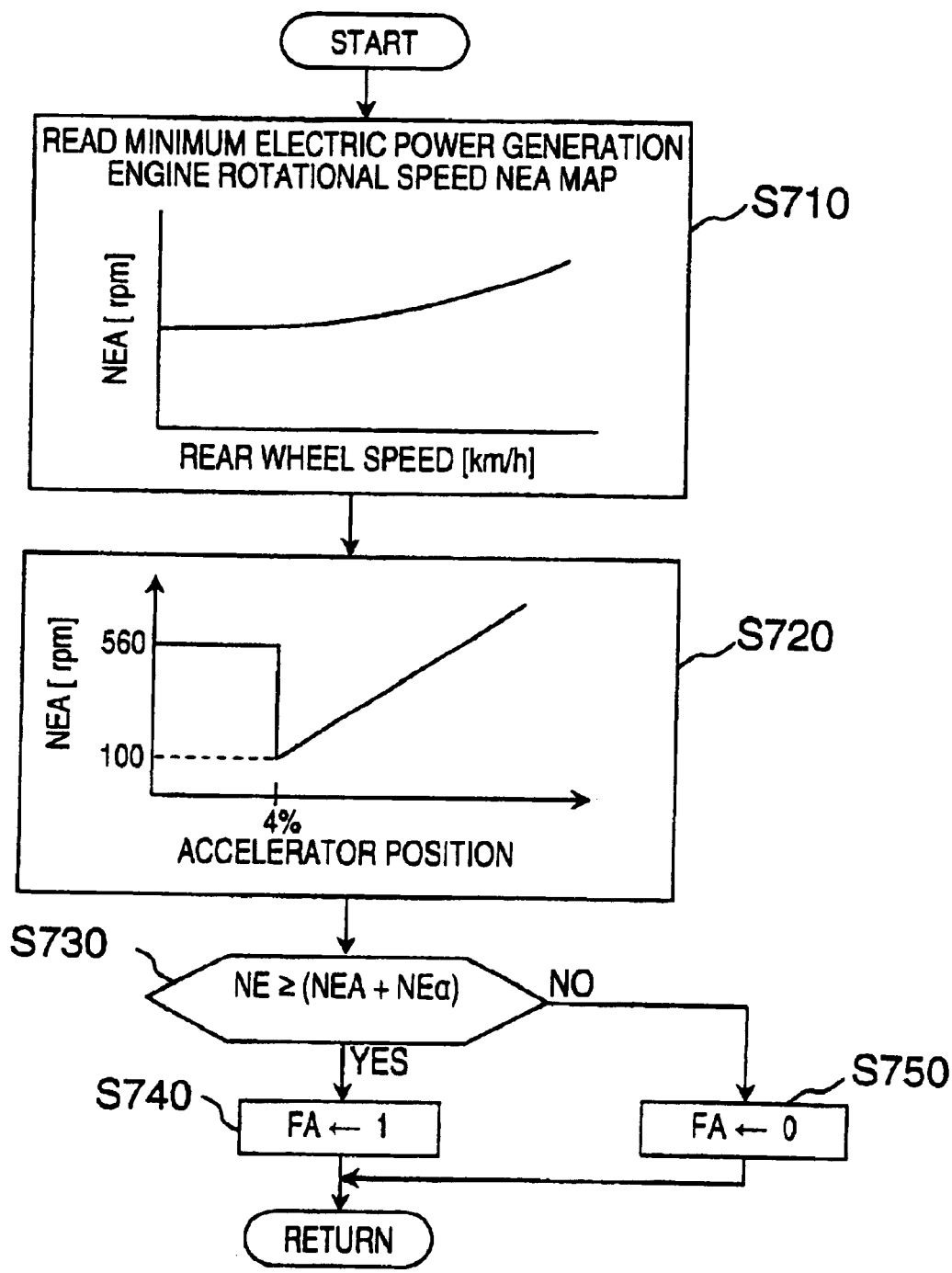
FIG. 32 is a flow chart showing the processing sequence executed by the electric power generation status detecting section of the 4WD controller illustrated in FIG. 1 in accordance with the fifth embodiment of the present invention.
Figure 34:
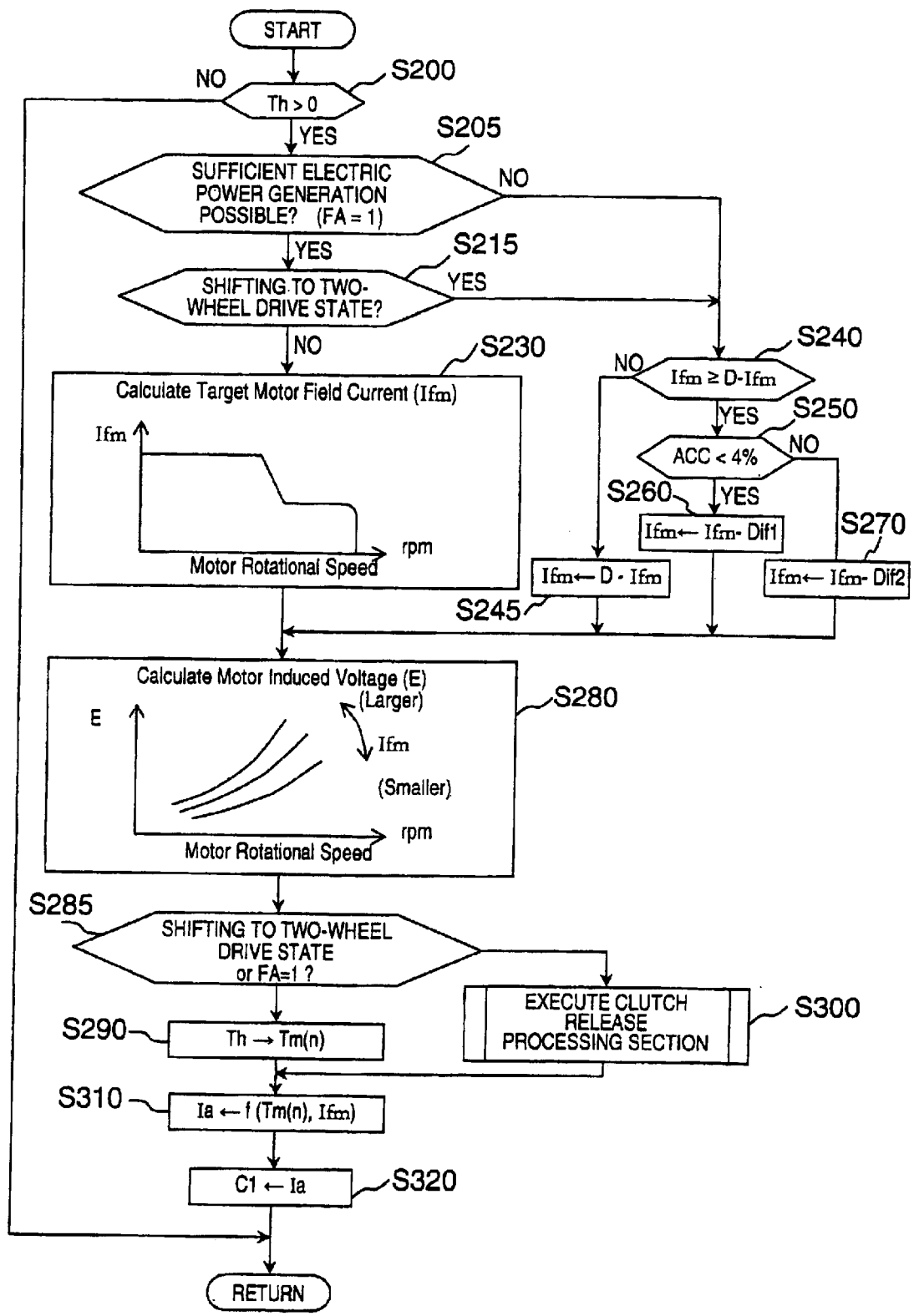
FIG. 34 is a flow chart showing the processing sequence executed by the surplus torque converting section for the vehicle driving force control apparatus illustrated in FIG. 1 in accordance with the fifth embodiment of the present invention.

Moreover, the 4WD controller 8 for the vehicle driving force control apparatus of this fifth embodiment executes the processing sequence illustrated in FIGS. 4–7 in the same manner as discussed above with reference to the first embodiment. In other words, the processing sequence executed by the 4WD controller 8 of the fifth embodiment is generally shown in FIG. 4 as discussed above. The processing sequence executed by the drive mode selection section 8D of the fifth embodiment is shown in FIG. 5 as discussed above. The processing sequence executed by the surplus torque computing section 8E of the fifth embodiment is shown in FIG. 31 instead of FIG. 6. The processing sequence executed by the target torque limiting section 8F of the fifth embodiment is shown in FIG. 7 as discussed above. However, the 4WD controller 8 for the vehicle driving force control apparatus of this fifth embodiment executes the processing sequence in the surplus torque converting section 8G as illustrated in FIG. 34. The processing sequence executed by the electric power generation status detecting section 8J of the fifth embodiment is shown in FIG. 32. This processing sequence executed by the electric power generation status detecting section 8J of the fifth embodiment can also be used for the processing sequences of the prior embodiments.

The engine controller 18 for the vehicle driving force control apparatus of this fifth embodiment also executes the processing sequence illustrated in FIG. 11 as discussed above.

With this fifth embodiment of the present invention as described below, the motor torque is forcefully adjusted to the prescribed clutch release torque and the vehicle is shifted into the two-wheel drive state when there is a possibility that the electric motor 4 will not be able to deliver the required clutch release torque when it is time to end the four-wheel drive mode. This arrangement of the vehicle driving force control apparatus prevents ill effects resulting from the generator 7, which is affected by the driving conditions of the main drive source or engine 2, and makes it possible to reliably release the clutch 12 at the clutch release torque when the vehicle shifts from the four-wheel drive state to the two-wheel drive state. The clutch release torque as used herein refers to "the electric motor output torque required to bring the torque at the clutch 12 to approximately zero." It is believed that a clutch release torque so defined is the sum of the torque corresponding to friction in the motor and in the torque transmission path between the motor 4 and the clutch 12 and the torque required to accelerate the input side of the clutch 12 to an acceleration equal to the acceleration of the subordinate drive wheels 3L and 3R. When the rear wheels 3L and 3R are rotating at a constant speed, the clutch release torque is only the torque corresponding to the friction in the motor 4 and the torque transmission path between the motor 4 and the clutch 12. Thus, since the clutch 12 can be released after controlling the motor torque to a fixed value so as to achieve the clutch release torque, the clutch 12 can be released under conditions where the motor torque is stabilized at the clutch release torque.

Now, the surplus torque computing section 8E of this fifth embodiment will be discussed which executes the processing shown in FIG. 31. First, in step S10, the wheel speeds computed based on the signals from the wheel speed sensors 27FL, 27FR, 27RL and 27RR are used to subtract the wheel speed of the rear wheels 3L and 3R (subordinate drive wheels) from the wheel speed of the front wheels 1L and 1R (main drive wheels) and find the slippage speed $\Delta VF$, which is the magnitude of the acceleration slippage of the front wheels 1L and 1R. Then, the 4WD controller 8 proceeds to step S20.

The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the Equations (1) and (2), which are present above with reference to FIG. 6.

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as in Equation (3), which is present above with reference to FIG. 6.

Conversely, if in step S20 slippage speed $\Delta VF$ is determined to be larger than zero, it is estimated that the front wheels 1L and 1R are experiencing acceleration slippage and thus control proceeds to step S22.

In step S22, the 4WD controller 8 starts up the electric power generation status detecting section 8J and then proceeds to step S24, where it determines if sufficient electric power can be generated, i.e., if FA is 1. If sufficient electric power can be generated (FA=1), then the 4WD controller 8 proceeds to step S26. If sufficient electric power cannot be generated (FA=0), then the 4WD controller 8 proceeds to step S27.

In step S26, the 4WD controller 8 outputs the clutch connection command and then proceeds to step S40 to execute four-wheel drive control.

In step S27, the 4WD controller 8 determines if the clutch is connected. If the clutch is connected, i.e., if four-wheel drive control is in progress, the 4WD controller 8 proceeds to step S40. If the clutch 12 is not connected, then the vehicle is on the verge of shifting from the two-wheel drive state to the four-wheel drive state under conditions where sufficient electric power cannot be generated. Therefore, in order to prohibit the shift to four-wheel drive, the 4WD controller 8 proceeds to step S29 where it sets Th to zero and returns to the beginning of the control loop.

Steps S22 through S29 constitute a four-wheel drive prohibiting section of this embodiment.

In step S50, the current load torque TG of the generator 7 is calculated based on the equation mentioned above, and then the 4WD controller 8 proceeds to step S60.

Next, the processing executed by the electric power generation status detecting section 8J will be explained based on FIG. 32.

First, in step S710, the 4WD controller 8 prepares a map of the minimum electric power generation engine rotational speed (which is the minimum engine rotational speed at which sufficient electric power can be generated) versus the vehicle speed for which the clutch release torque Tf can be produced (see step S710 of FIG. 32). Based on the signals from the wheel sensors 27RL and 27RR, the 4WD controller 8 computes the wheel speed (rear wheel speed) $V_{Wr}$ of the rear wheels 3L and 3R, which corresponds to the current vehicle speed. Then, based on the computed rear wheel speed $V_{Wr}$ and the map, the 4WD controller 8 determines the minimum electric power generation engine rotational speed NEA for which sufficient electric power can be generated to produce the clutch release torque Tf.

In the present embodiment, when the motor torque is set to the clutch release torque Tf, the motor field current Ifm is controlled to a value D-Ifm based on energy conservation considerations. The minimum electric power generation engine rotational speed NEA is therefore the engine speed Ne at which the generated voltage equals the voltage required to produce the clutch release torque Tf when the motor field current Ifm is set to D-Ifm.

Since the engine rotational speed Ne and the rotational speed Nh of the generator 7 are proportional, the minimum electric power generation engine rotational speed NEA can be multiplied by the pulley ratio and replaced with the minimum electric power generation generator rotational speed, which is the generator rotational speed at which generator 7 can generate sufficient electric power. In other words, the minimum electric power generation engine rotational speed NEA and the minimum electric power generation generator rotational speed are synonymous.

The map of the vehicle speed and minimum electric power generation engine rotational speed will now be explained with reference to FIG. 33. The relationship between the engine rotational speed and the maximum voltage that the generator can generate can be expressed as shown in map (a) of FIG. 33.

Figure 33:
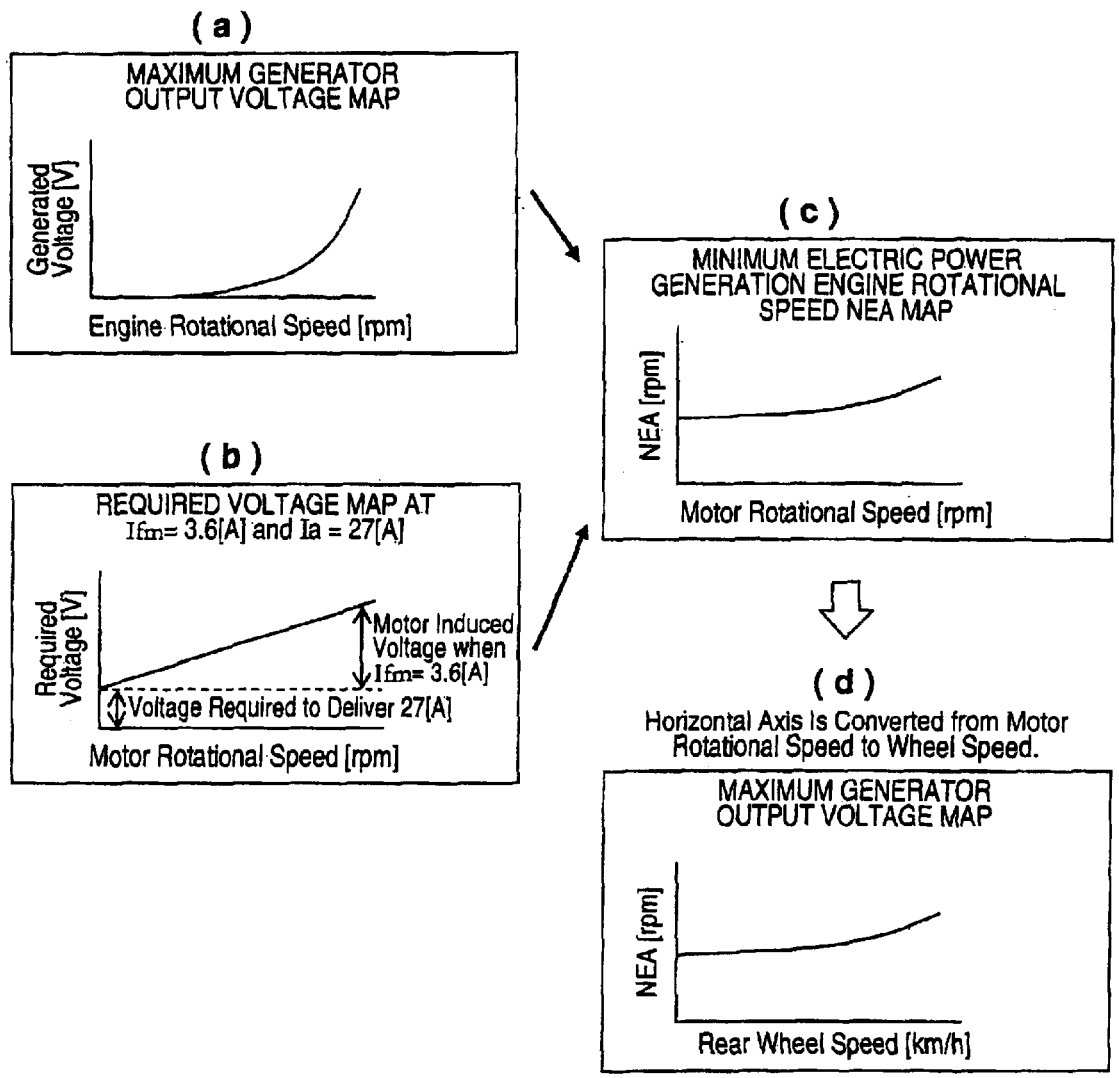
FIG. 33 is a series of maps illustrating how a map of the minimum electric power generation engine rotational speed versus the rear wheel speed is obtained.

Assuming the motor field current Ifm (=3.6 A) is constant, relationship between the voltage required to generate the armature current Ia (=27 A) required to produce the clutch release torque Tf and the motor rotational speed can be expressed in the linear manner shown in map (b) of FIG. 33.

Since the voltage generated by the generator is the voltage at the motor, the relationship between the engine rotational speed NEA and the motor rotational speed required to generate the clutch release torque shown in map (c) of FIG. 33 can be obtained from maps (a) and (b) of FIG. 33. By converting the motor rotational speed to the rear wheel speed, the plot shown in map (d) of FIG. 33, i.e., the map of step S710 in FIG. 32 is obtained.

In step S720, the 4WD controller 8 calculates the engine rotational speed difference portion NEα corresponding to the tolerance torque value and proceeds to step S730. In this embodiment, the difference portion NEα is set to increase with increasing accelerator position. However, the difference portion NEα is set to a large value even when the accelerator position is less than 4%, i.e., when the accelerator pedal is essentially not being depressed. It is also acceptable to use a fixed value for the difference portion NEα and merely increase the voltage value in map (b) of FIG. 33 in advance in accordance with the tolerance torque value.

In step S730, the 4WD controller 8 uses the equation shown below to determine if the current engine rotational speed is larger than the value obtained by adding the minimum electric power generation engine rotational speed NEA to the engine rotational speed difference portion NEα corresponding to the tolerance torque value. If the current engine rotational speed is larger than or equal to said sum, the 4WD controller 8 proceeds to step S740. If smaller, the 4WD controller 8 proceeds to step S750.

$$NE \geq (NEA + NE\alpha) \quad (16)$$

In step S740, FA is set to 1 because it has been determined that sufficient electric power can be generated and then the 4WD controller 8 ends the processing and returns to the beginning of the control loop. In step S750, is set to 0 because it has been determined that sufficient electric power can not be generated and then the 4WD controller 8 ends the processing and returns to the beginning of the control loop.

Next, the processing sequences executed by the surplus torque converting section 8G in this fifth embodiment will be explained based on FIG. 34. The processing sequence executed by the surplus torque converting section 8G in this fifth embodiment is almost identical to the processing sequences executed by the surplus torque converting section 8G in the first embodiment of FIG. 9, except that steps S205 and S215 have replaced steps S210 and S220 of the first embodiment and new step S285 has been added. In view of the similarities between the processing sequences of the first and fifth embodiments, the same reference numerals will be used for the same steps in the first and fifth embodiments.

First, in step S200, the 4WD controller 8 determines if Th is larger than 0. If Th is determined to be larger than 0, the 4WD controller 8 proceeds to step S210 because the front wheels 1L and 1R are experiencing acceleration slippage. If the 4WD controller 8 determines that Th is less than or equal to 0, then the 4WD controller 8 returns to the beginning of the control loop because the front wheels 1L and 1R are not experiencing acceleration slippage.

In step S205, the 4WD controller 8 determines if sufficient electric power can be generated (i.e., if FA=1) based on the result from the previously executed electric power generation status detecting section 8J. If it is determined that sufficient electric power can be generated, the 4WD controller 8 proceeds to step S210. If it is determined that sufficient electric power cannot be generated, the 4WD controller 8 proceeds to step S230 to shift to the two-wheel drive state.

In step S210, the 4WD controller 8 determines if the acceleration slippage has been eliminated and the vehicle will shift or is in the process of shifting from the four-wheel drive state to the two-wheel drive state. If the vehicle is determined to be shifting to the two-wheel drive state, the 4WD controller 8 proceeds to step S230. If not, the 4WD controller 8 proceeds to step S220 to execute normal control.

In this embodiment, the 4WD controller 8 determines that the vehicle is in the process of shifting to the two-wheel drive state and the clutch should be released when the following conditions are satisfied: the target motor torque is decreasing; the target motor torque is close to the clutch release torque Tf; and the target motor torque is equal to or less than a prescribed threshold torque value T−TM1 that is larger than the clutch release torque.

Thus, the clutch release torque Tf is the motor torque value needed to bring the torque at the clutch 12 to zero when the vehicle is traveling and is either determined experimentally or calculated using maps and computations in accordance with the vehicle acceleration and friction in the torque transmission path of the motor. The clutch release torque Tf is estimated to be the sum of the torque $Tf_1$ resulting from friction in the motor and the reduction gear and the torque $Tf_2$ required to accelerate the motor and reduction gear to an acceleration equal to the acceleration of the rear wheels (i.e., $Tf=Tf_1+Tf_2$). In this embodiment, it is assumed that the contribution of the torque $Tf_1$ resulting from friction in the motor and the reduction gear is larger than the contribution of the torque $Tf_2$ required to accelerate the motor and reduction gear to an acceleration equal to the acceleration of the rear wheels and a fixed value corresponding to the torque $Tf_1$ resulting from friction in the motor and the reduction gear, which is determined experimentally, is used as the clutch release torque $T_f$.

The equation (9), discussed above, is used to determine if the target motor torque, which is the torque command value sent to the motor 4, is decreasing. This equation merely compares the target motor torque with the value of the previous processing cycle. It is also acceptable to determine that the target motor torque is decreasing when the target motor torque decreases continuously over a plurality of processing cycles using Equation (10), discussed above.

In step S220, the 4WD controller 8 receives the rotational speed Nm of the motor 4 from the motor rotational speed sensor 26 and calculates the target motor field current Ifmt corresponding to the rotational speed Nm of the motor 4. The 4WD controller 8 then outputs the newly calculated target motor field current Ifmt to the motor control section 8C before proceeding to step S280.

The target motor field current Ifmt corresponding to the rotational speed Nm of the electric motor 4 is held to a fixed prescribed current value when rotational speed Nm is below a prescribed rotational speed and the field current Ifm of the electric motor 4 is reduced by a known weak field control method when the electric motor 4 is rotating above a prescribed rotational speed. In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm(n) is obtained by reducing the field current Ifm of the electric motor 4 and lowering the induced voltage E. As a result, even if the electric motor 4 rotates at a high speed, the required motor torque Tm(n) can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm can be obtained because the induced voltage E of the motor 4 is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

Meanwhile, if it is determined that the vehicle is shifting to the two-wheel drive state and the clutch should be released, the 4WD controller 8 proceeds to step S230. In step S230, the 4WD controller 8 determines if the field current Ifm is larger than a prescribed field current limit value D-Ifm. If so, the 4WD controller 8 proceeds to step S240. If the field current Ifm is less than or equal to the prescribed field current limit value D-Ifm, the 4WD controller 8 proceeds to step S235 where it keeps the field current Ifm at the prescribed field current limit value D-Ifm. The 4WD controller 8 then proceeds to step S270.

The prescribed field current limit value D-Ifm is the minimum field current value at which the electric motor is capable of generating very small torque. Setting the limit value to such a small value serves to curb power consumption during two-wheel drive operation. Needless to say, it is acceptable for the prescribed field current limit value D-Ifm to be larger than the minimum field current value at which the electric motor is capable of generating very small torque.

In step S240, the 4WD controller 8 determines if the accelerator position is less than 4% based on the signal from the accelerator sensor. If the accelerator position is less than 4%, the 4WD controller 8 proceeds to step S250. Otherwise, the 4WD controller 8 proceeds to step S260.

An accelerator position of less than 4% indicates that the accelerator pedal is not being depressed at all or is not being depressed enough (i.e., the acceleration instruction amount is not large enough) to affect the acceleration of the vehicle.

In step S250, the 4WD controller 8 reduces the field current by the amount of a first reduction value Dif1 and outputs the new field current Ifm to the motor control section 8C before proceeding to step S280.

Meanwhile, in step S260, the 4WD controller 8 reduces the field current by the amount of a second reduction value Dif2 and outputs the new field current Ifm to the motor control section 8C before proceeding to step S280.

The second reduction value Dif2 is set to a larger value than the first reduction value Dif1. As a result, the rate at which the field current value is reduced toward the prescribed field current limit value D-Ifm is larger when the accelerator position is less than 4% so that the prescribed field current limit value D-Ifm can be reached sooner.

Although in the preceding explanation the reduction rate at which the field current Ifm is reduced is set to one of two different values based on whether or not the accelerator pedal is depressed in an effectual way (i.e., whether or not there is an effectual acceleration instruction), it is also acceptable to set the reduction rate of the field current Ifm to one of three or more different values or to vary the reduction rate in a continuous manner in accordance with the acceleration instruction amount. Also, since the purpose of determining whether or not the accelerator position is less than 4% in step S240 is to estimate if the electric power generation capacity will decline, it is also acceptable determine if the electric power generation capacity will decline or is at risk of declining based on the engine rotational speed or the rotational speed of the generator and proceed to step S250 if so and step S260 if not.

In step S280, the induced voltage E of the electric motor 4 is calculated based on the target motor field current Ifmt and the rotational speed Nm of the electric motor 4. Then the 4WD controller 8 proceeds to step S280.

In step S280, the 4WD controller 8 determines if the vehicle is in the process of shifting from the four-wheel drive state to the two-wheel drive state or if the value of FA is 1. If the vehicle is shifting to the two-wheel drive state, the 4WD controller 8 proceeds to step S300. If not, the 4WD controller 8 proceeds to step S290.

The determination as to whether or not the vehicle is in the process of shifting from the four-wheel drive state to the two-wheel drive state can be accomplished in the same manner as in steps S205 and S210. It is also acceptable to set a flag indicating whether or not the vehicle is in the process of shifting to the two-wheel drive state in step S210 and use the flag to accomplish the determination.

In step S290, the 4WD controller 8 uses a map or the like to calculate the corresponding target motor torque Tm(n) based on the generator load torque Th computed by the surplus torque computing section 8E and then proceeds to step S310.

Meanwhile, in step S300 the 4WD controller 8 executes the clutch release processing section 8H and then proceeds to step S310.

In step S310 the 4WD controller 8 uses the target motor torque Tm(n) of the current cycle and the target motor field current Ifmt as variables to calculate the corresponding target armature current Ia and then proceeds to step S320.

In step S320, the 4WD controller 8 computes the duty ratio c1, which serves as the generator control command value, based on the target armature current Ia and outputs the same before returning to the beginning of the control loop.

The clutch release processing section 8H for this fifth embodiment is described above with reference to FIG. 10. The clutch release processing section 8H of this fifth embodiment constitutes a clutch release section and a clutch release torque control section.

When the clutch 12 is connected, the vehicle enters a four-wheel drive state and acceleration slippage is suppressed. Then, the motor torque is decreased and the vehicle is shifted to the two-wheel drive state.

Figure 35:
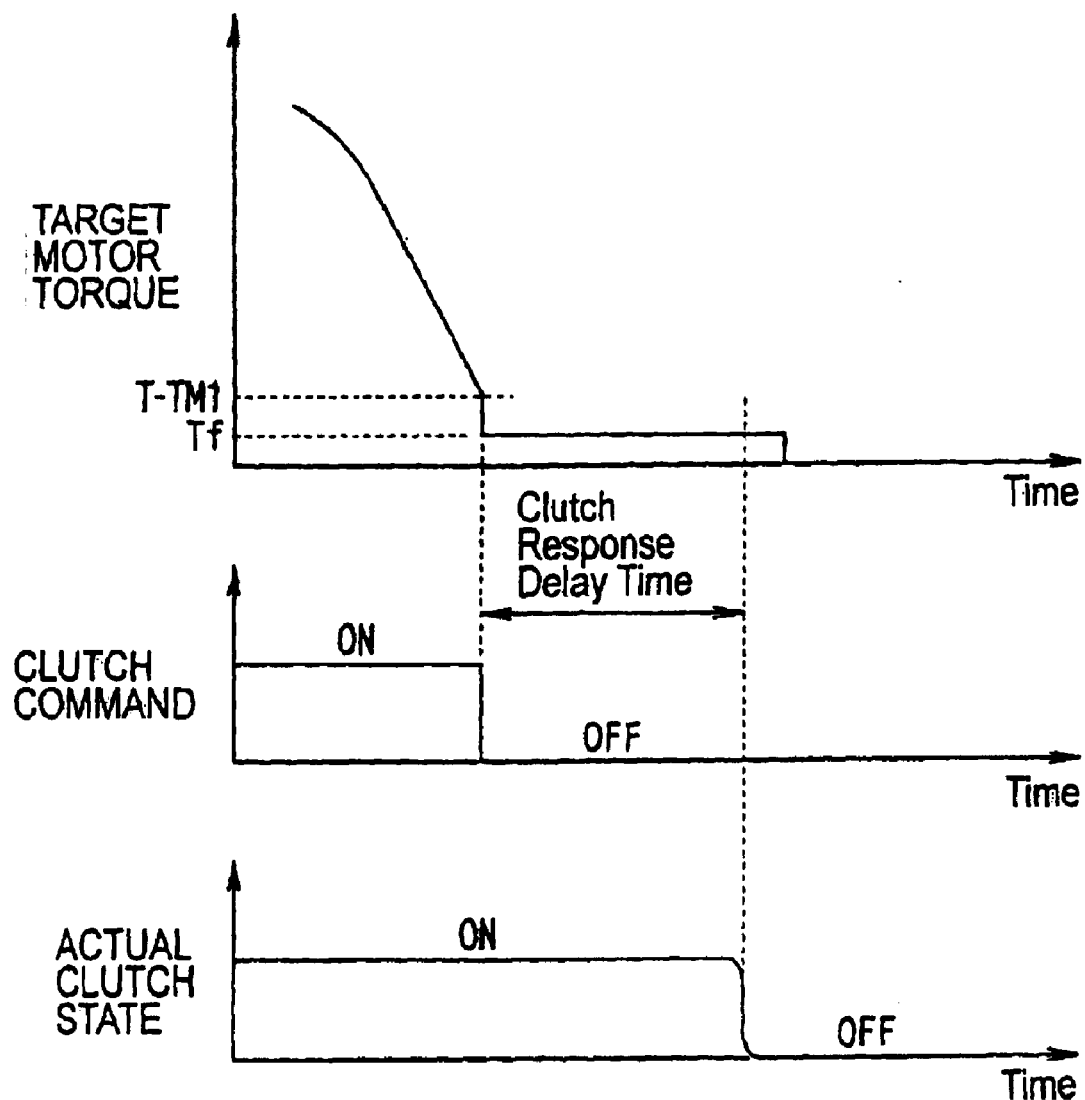
FIG. 35 is a clutch release time chart for a normal shift from the four-wheel drive state to the two-wheel drive state in the vehicle driving force control apparatus illustrated in FIG. 1 in accordance with the fifth embodiment of the present invention.

As shown in FIG. 35, when the target motor torque approaches the clutch release torque Tf and becomes equal to or less than a prescribed threshold value T–TM1, the 4WD controller 8 sets the target motor torque Tm to the clutch release torque Tf and issues the clutch release command so as to initiate the shift to the two-wheel drive state. After the response delay time of the clutch 12 has elapsed, the clutch 12 is released under conditions where the actual motor torque is held fixed approximately at the clutch release torque Tf. In short, since the clutch 12 is released under conditions where the torque at the clutch 12 is approximately zero, shock is prevented from occurring when the clutch 12 is released while the vehicle is traveling.

Since the actual motor torque is held at a fixed torque value that is approximately equal to the clutch release torque Tf for a duration immediately before and after the actual release of the clutch 12, the actual motor torque value can be ensured to be approximately at the clutch release torque Tf when the clutch 12 is released, even if the response delay time of the clutch 12 fluctuates somewhat. As a result, the occurrence of shock is reliably prevented at the time of clutch release.

In cases where the electric power generation capacity of the generator 7 declines and it is determined that the maximum voltage that the generator can generate will not be sufficient to produce a torque that exceeds the clutch release torque Tf by the amount of the tolerance torque value, the controller forcefully sets the target motor torque to the clutch release torque Tf and shifts the vehicle into the two-wheel drive state before the target motor torque has approached the clutch release torque Tf and become equal to or less than the prescribed threshold value T–TM1. This arrangement makes it possible to ensure that the motor torque is at the clutch release torque Tf when the clutch is released and to prevent the occurrence of shock when the clutch is released in association with shifting from the four-wheel drive state to the two-wheel drive state.

The reason for the forced setting of the motor torque to the clutch release torque Tf is based on a torque value that exceeds the clutch release torque Tf by a tolerance torque value is to ensure that the motor torque can be maintained approximately at the clutch release torque Tf until the clutch is actually released.

In other words, the tolerance torque value should be set from the perspective of ensuring that the sufficient electric power generation capacity is available to hold the motor torque at the clutch release torque Tf at least for the duration of the clutch response delay.

Figure 36:
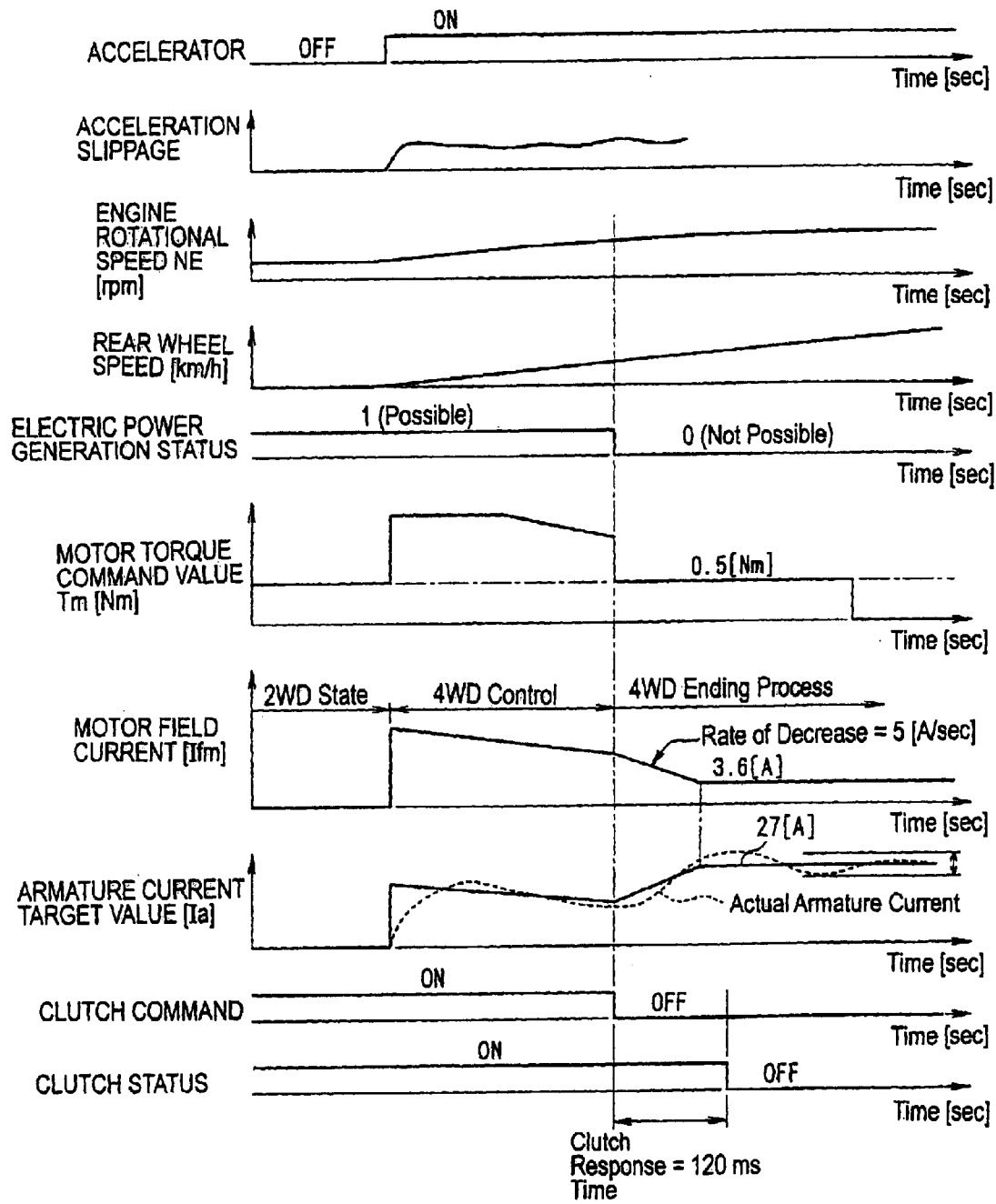
FIG. 36 is a clutch release time chart for a shift from the four-wheel drive state to the two-wheel drive state based on electric power generation capacity for the vehicle driving force control apparatus illustrated in FIG. 1 in accordance with the fifth embodiment of the present invention.
Figure 37:
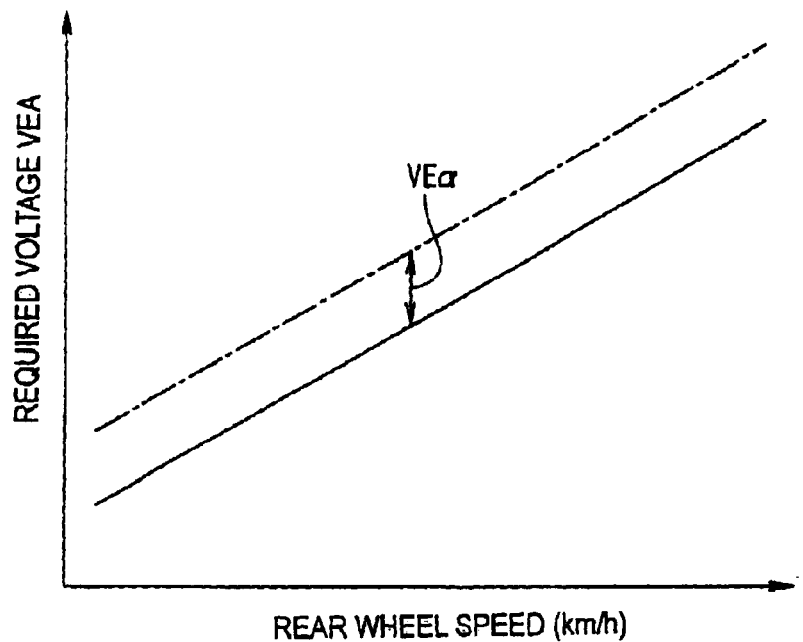
FIG. 37 shows an example of an alternative map for determining the status of the electric power generation capacity for the vehicle driving force control apparatus illustrated in FIG. 1 in accordance with the fifth embodiment of the present invention.

FIG. 36 is a time chart for a case in which the target motor torque Tm is forcefully set to the clutch release torque Tf. As shown in FIG. 36, the electric power generation capacity declines before acceleration slippage has been eliminated. The occurrence of shock at the time of clutch release is prevented by shifting to the two-wheel drive state before the electric power declines more than is necessary, i.e., before the maximum motor torque value falls below the clutch release torque Tf.

The reason the value NEα corresponding to the tolerance torque value is set so as to increase with increasing accelerator position in step S720 is that the larger the accelerator position is, the larger the decline in electric power generation capacity would be if the accelerator was released at that moment in time. Thus, the value NEα corresponding to the tolerance torque value is set to a larger value in anticipation of said larger decline. The value NEα can be determined in advance experimentally. Also, the reason the value NEα is also set to a large value when the accelerator is actually released is that the engine rotational speed declines greatly when the accelerator is released.

Figure 38:
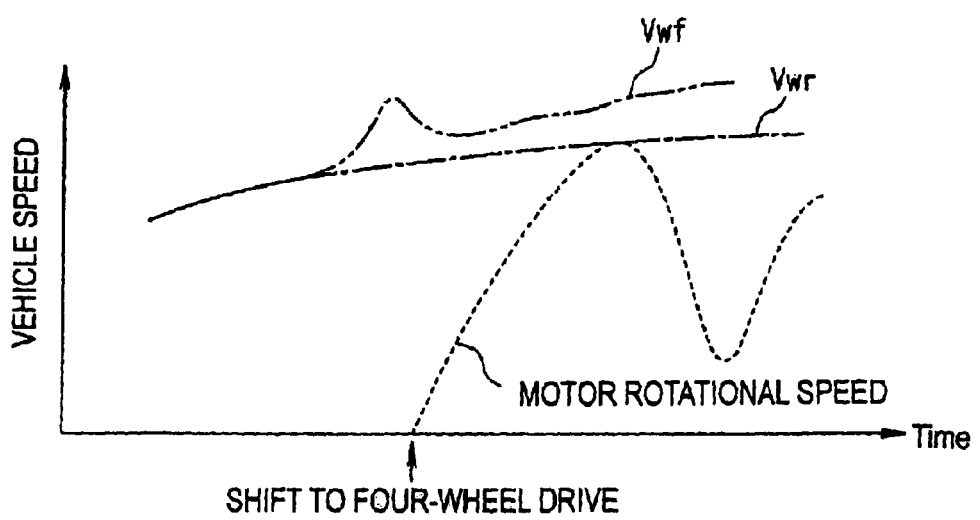
FIG. 38 illustrates the problems associated with shifting from the two-wheel drive state to the four-wheel drive state for the vehicle driving force control apparatus illustrated in FIG. 1 in accordance with the fifth embodiment of the present invention.

In the above explanation, the determination as to whether or not sufficient electricity can be generated is conducted in step S710 based on a map of the minimum electric power generation engine rotational speed NEA versus the rear wheel speed. However, it is also feasible to determine if sufficient electric power can be generated based on the required voltage of the motor (i.e., required generator output voltage) and the rear wheel speed using the map shown in FIG. 37, which was obtained directly from map (b) of FIG. 33 and is equivalent to map (d) of FIG. 33. In FIG. 38, the value VEα corresponds to the tolerance torque value.

However, a more stable determination can be accomplished by using the map of the minimum electric power generation engine rotational speed NEA versus the rear wheel speed.

This fifth embodiment is also configured to determine if sufficient electric power can be generated when acceleration slippage occurs and the vehicle will shift from the two-wheel drive state to the four-wheel drive state and prohibit the shift to the four-wheel drive state if sufficient electric power cannot be generated.

In an apparatus that does not determine if sufficient electric power can be generated before shifting from the two-wheel drive state to the four-wheel drive state, the motor will start rotating when, as shown in FIG. 38, the front wheels slip and acceleration slippage occurs between the front wheel speed $V_{Wf}$ and the rear wheel speed $V_{Wr}$. Then, if sufficient electric power cannot be generated, the 4WD controller 8 will immediately return the vehicle to the two-wheel drive state, creating the possibility that a hunching phenomenon will occur. Conversely, this embodiment can suppress the occurrence of hunching and prevent unnecessary driving of the motor when sufficient electric power cannot be generated.

As explained previously, the fifth embodiment determines if sufficient electric power can be generated based on a map of the minimum electric power generation engine rotational speed versus the rear wheel speed, as shown in step S710. The reason a map of the minimum electric power generation engine rotational speed versus the motor rotational speed is not used is that the motor rotational speed is not stable, as shown in FIG. 38. If the determination were made based on the motor rotational speed, the determination results would vacillate between a determination that sufficient electric power can be generated and a determination that sufficient electric power cannot be generated and the vehicle would hunch between the four-wheel drive state and the two-wheel drive state, possibly degrading the riding comfort of the vehicle. Furthermore, after the vehicle has actually shifted to the four-wheel drive state, the rear wheel speed, which is equivalent to the vehicle speed, is used for determining if sufficient electric power can be generated. However, if the vehicle driving force control apparatus is configured to determine the electric power generation status only when shifting from the four-wheel drive state to the two-wheel drive state, then it is also acceptable to using the motor rotational speed instead of the rear wheel speed.

Although the fifth embodiment uses a fixed clutch release torque Tf that equals the torque value $Tf_1$ resulting from friction in the motor and the reduction gear when the vehicle is traveling at a constant speed (i.e., when the acceleration is zero), the present invention is not limited to such an arrangement. It is also acceptable to adjust the clutch release torque Tf based on the acceleration (negative acceleration when decelerating) of the rear wheels or the vehicle body. In such a case, the clutch command output torque T–TM2 can also be changed in accordance with the adjustment of the clutch release torque Tf or set to a value that anticipates the fluctuation resulting from said adjustment.

Although the fifth embodiment is for a case in which four-wheel drive is achieved by driving an electric motor 4 with voltage generated by a generator 7, the invention is not limited to such an arrangement. The invention can also be applied to a system that is provided with a battery that can supply electric power to the electric motor 4. In such a system, it is sufficient for the battery to be arranged to deliver a very small amount of electric power and it is also acceptable to deliver electric power from a generator 7 as well as from the battery.

Although in the fifth embodiment the main drive source is an internal combustion engine, it is also acceptable for the main drive source to be an electric motor.

Also, although the system of the fifth embodiment shifts into the four-wheel drive state in response to acceleration slippage of the front wheels, the present invention is also applicable to a system that shifts into the four-wheel drive state in response to the accelerator position or other parameter.

In each of the above embodiments, the term "configured" as used herein to describe a component, section or part of a device includes hardware and/or software that is constructed and/or programmed to carry out the desired function.

Moreover, in each of the above embodiments, terms that are expressed as "means-plus function" in the claims should include any structure that can be utilized to carry out the function of that part of the present invention.

Also in each of the above embodiments, the terms of degree such as "substantially", "about" and "approximately" as used herein mean a reasonable amount of deviation of the modified term such that the end result is not significantly changed. For example, these terms can be construed as including a deviation of at least±5% of the modified term if this deviation would not negate the meaning of the word it modifies.

This application claims priority to Japanese Patent Application Nos. 2002-247554, 2002-259158, 2002-259161, 2002-259162 and 2002-291241. The entire disclosures of Japanese Patent Application Nos. 2002-247554, 2002-259158, 2002-259161, 2002-259162 and 2002-291241 are all hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus of a vehicle provided with at least one first drive wheel, and a second drive wheel driven independently of the first drive wheel, the driving force control apparatus comprising:
    a power source configured to supply electric power;
    an electric motor configured to be supplied with electric power from the power source and transfer a drive torque to the first drive wheel;
    an electric power supplying status detecting section configured to determine an electric power supplying capacity of the power source based on a power supplying condition of the power source; and
    an electric motor torque control section configured to control a control torque command of the electric motor such that a target motor torque is limited based on the power supplying capacity determined by the electric power supplying status detecting section.

2. The vehicle driving force control apparatus as recited in claim 1, wherein
    the power supplying condition used in the electric power supplying status detecting section to determine the power supplying capacity is an electric power supplying capacity amount of the power source.

3. The vehicle driving force control apparatus as recited in claim 1, wherein
    the power supplying condition used in the electric power supplying status detecting section to determine the power supplying capacity is an electricity generation shortage determination of the power source.

4. The vehicle driving force control apparatus as recited in claim 1, wherein
    the electric power supplying status detecting section includes an acceleration instruction detecting section that is configured to detect an acceleration command amount; and
    the electric power supplying status detecting section is further configured to estimate the power supplying condition of the power source based on the acceleration command amount detected by the acceleration instruction detecting section such that the electric power supplying capacity is estimated to be smaller as the acceleration command amount detected by the acceleration instruction detecting section becomes smaller.

5. The vehicle driving force control apparatus as recited in claim 1, wherein
    the electric power supplying status detecting section includes a gear ratio detecting section that is configured to detect a gear ratio of a transmission of the vehicle that is operatively connected to the second drive wheel; and
    the electric power supplying status detecting section is further configured to estimate the power supplying condition of the power source based on the gear ratio of the transmission detected by the gear ratio detecting section such that the electric power supplying capacity is estimated to be smaller as the gear ratio detected by the gear ratio detecting section results in a lower engine speed.

6. The vehicle driving force control apparatus as recited in claim 1, wherein
    the electric power supplying status detecting section includes an acceleration slippage detection section configured to detect an acceleration slippage amount in the second drive wheel; and
    the electric power supplying status detecting section is further configured to estimate the power supplying condition of the power source based on the acceleration slippage amount detected by the acceleration slippage detection section such that the electric power supplying capacity is estimated to be smaller as the acceleration slippage amount detected by the acceleration slippage detection section becomes smaller.

7. The vehicle driving force control apparatus as recited in claim 1, wherein
    the electric power supplying status detecting section is further configured to determine the electric power supplying capacity that can be generated based on a maximum voltage that the power source can supply to the electric motor and an induced voltage of the electric motor.

8. The vehicle driving force control apparatus as recited in claim 1, wherein
    the electric power supplying status detecting section is configured to determine the electric power supplying capacity that can be generated based on a rotational speed of a generator of the power source and a vehicle speed of the vehicle.

9. The vehicle driving force control apparatus as recited in claim 1, wherein
    the electric motor torque control section cooperates with a drive torque determining section and a field current control section to control the control torque command of the electric motor,
    the drive torque determining section being configured to determine whether the drive torque of the electric motor is at most equal to a prescribed threshold torque; and
    the field current control section being configured to adjust the control torque command of the electric motor based on the power supplying condition determined by reducing a field current of the electric motor toward a prescribed field current limit value at a reduction rate, when the drive torque determining section determines that the drive torque of the electric motor is no greater than the prescribed threshold torque, the field current control section being further configured to set the reduction rate to a larger value as the electric power supplying capacity of the power source is estimated to become smaller.

10. The vehicle driving force control apparatus as recited in claim 1, wherein
    the electric motor torque control section cooperates with a field current control section, a gear ratio detecting section and a field current correcting section to control the control torque command of the electric motor,
    the field current control section being configured to control a field current of the electric motor, the gear ratio detecting section being configured to detect a gear ratio of a transmission of the vehicle that is operatively connected to the second drive wheel, and the field current correcting section configured to adjust the control torque command of the electric motor based on the power supplying condition determined by changing the field current to a smaller field current value, when the electric power supplying status detecting section determines based on the gear ratio that the power source will enter a state of insufficient electric power supplying capacity for the electric motor to deliver a target torque.

11. The vehicle driving force control apparatus as recited in claim 1, further comprising a clutch connection control section configured to connect a clutch installed between the first drive wheel and the electric motor when the vehicle is in a multi-wheel drive mode in which at least the first drive wheel driven by the electric motor connected through the clutch is driven and at least one other drive wheel is driven by a drive source not connected by the clutch, the clutch connection control section including a target motor torque determining section configured to determine a prescribed drive torque value for releasing the clutch based on the electric power supplying capacity detected by the electric power supplying status detecting section, the electric motor torque control section being further configured to control the control torque command of the electric motor such that the drive torque of the electric motor matches a target drive torque, and the clutch connection control section being further configured to release the clutch upon the target drive torque falling below the prescribed drive torque value such that the vehicle shifts to the non-all wheel drive mode in which at least the clutch disconnects the electric motor from the first drive wheel through the clutch, while the vehicle is traveling.

12. The vehicle driving force control apparatus as recited in claim 1, further comprising a clutch connection control section configured to connect a clutch installed between the first drive wheel and the electric motor when the vehicle is in a multi-wheel drive mode in which at least the first drive wheel driven by the electric motor connected through the clutch is driven and at least one other drive wheel is driven by a drive source not connected by the clutch, and release the clutch to disconnect the electric motor from the first drive wheel when the vehicle is in a non-all wheel drive mode; and the electric motor torque control section being further configured to control the control torque command of the electric motor by setting the drive torque of the electric motor to decrease during shifting from the multi-wheel drive mode to the non-all wheel drive mode, based on the electric power supplying capacity detected by the electric power supplying status detecting section.

13. The vehicle driving force control apparatus as recited in claim 1, further comprising a clutch connection control section configured to connect a clutch installed between the first drive wheel and the electric motor when the vehicle is in a multi-wheel drive mode in which at least the first drive wheel driven by the electric motor connected through the clutch is driven and at least one other drive wheel is driven by a drive source not connected by the clutch, and release the clutch to disconnect the electric motor from the first drive wheel when the vehicle is in a non-all wheel drive mode, the electric motor torque control section configured to control the drive torque of the electric motor to a prescribed clutch release torque prior to the vehicle shifting from the multi-wheel drive mode to the non-all wheel drive mode; and the clutch connection control section being further configured to release the clutch, based on the electric power supplying status detecting section determining that the power source will enter a state of insufficient electric power supplying capacity for the electric motor to deliver the drive torque at an amount that exceeds the prescribed clutch release torque.

14. The vehicle driving force control apparatus as recited in claim 1, wherein the power source includes an internal combustion engine configured to drive at least the second drive wheel, and a generator driven by the internal combustion engine and operatively coupled to the electric motor.

15. The vehicle driving force control apparatus as recited in claim 14, wherein the electric motor torque control section cooperates with a drive torque determining section and a field current control section to control the control torque command of the electric motor, the drive torque determining section being configured to determine whether the drive torque of the electric motor is at most equal to a prescribed threshold torque; and the field current control section being configured to adjust the control torque command of the electric motor based on the power supplying condition determined by reducing a field current of the electric motor toward a prescribed field current limit value at a reduction rate, when the drive torque determining section determines that the drive torque of the electric motor is no greater than the prescribed threshold torque, the field current control section being further configured to set the reduction rate to a larger value as the electric power supplying capacity of the generator is estimated to become smaller.

16. The vehicle driving force control apparatus as recited in claim 15, wherein the electric power supplying status detecting section includes an acceleration instruction detecting section that detects an acceleration command amount; and the electric power supplying status detecting section is further configured to estimate the electric power supplying capacity limit based on the acceleration command amount detected by the acceleration instruction detecting section such that the electric power supplying capacity limit is estimated to be smaller as the acceleration command amount detected by the acceleration instruction detecting section becomes smaller.

17. The vehicle driving force control apparatus as recited in claim 14, wherein the electric motor torque control section cooperates with a field current control section, a gear ratio detecting section and a field current correcting section to control the control torque command of the electric motor, the field current control section being configured to control a field current of the electric motor, the gear ratio detecting section being configured to detect a gear ratio of a transmission of the vehicle that is operatively connected between the internal combustion engine and the second drive wheel, and the field current correcting section configured to adjust the control torque command of the electric motor based on the power supplying condition determined by changing the field current to a smaller field current value, when the electric power supplying status detecting section determines based on the gear ratio that the generator will enter a state of insufficient electric power supplying capacity for the electric motor to deliver a target torque.

18. The vehicle driving force control apparatus as recited in claim 17, wherein the electric power supplying status detecting section is further configured to determine that the generator will enter the state of insufficient power generation, based on detecting that the gear ratio detected by the gear ratio detecting section falls below a prescribed gear ratio.

19. The vehicle driving force control apparatus as recited in claim 17, further comprising an electric motor rotational speed detecting section configured to detect a rotational speed of the electric motor, and the field current correcting section being further configured to adjust the field current controlled by the field current control section by calculating an electric motor field current target value based on the electric motor rotational speed detected by the electric motor rotational speed detecting section.

20. The vehicle driving force control apparatus as recited in claim 19, wherein the field current correcting section is further configured to adjust the field current controlled by the field current control section to the smaller field current value by multiplying the electric motor field current target value by a correction coefficient that is less than one, when the gear ratio falls below the prescribed gear ratio.

21. The vehicle driving force control apparatus as recited in claim 1, further comprising a clutch operatively disposed in a torque transmission path between the electric motor and the first drive wheel and configured to selectively connect and disconnect the drive torque of the electric motor to the first drive wheel.

22. The vehicle driving force control apparatus as recited in claim 21, further comprising a clutch connection control section configured to release the clutch to disconnect the drive torque of the electric motor to the first drive wheel, when the drive torque of the electric motor is no greater than a prescribed threshold torque and the clutch has a clutch-releasing torque at which torque at the clutch is substantially zero.

23. The vehicle driving force control apparatus as recited in claim 21, further comprising a clutch connection control section configured to engage the clutch to connect the drive torque of the electric motor to the first drive wheel when the vehicle is in a multi-wheel drive mode in which at least the first drive wheel driven by the electric motor connected through the clutch is driven and at least one other drive wheel is driven by a drive source not connected by the clutch, the clutch connection control section including a target motor torque determining section configured to determine a prescribed drive torque value for releasing the clutch based on the electric power supplying capacity detected by the electric power supplying status detecting section, the electric motor torque control section being further configured to control the control torque command of the electric motor such that the drive torque of the electric motor matches a target drive torque, and the clutch connection control section being further configured to release the clutch upon the target drive torque falling below the prescribed drive torque value such that the vehicle shifts to the non-all wheel drive mode in which at least the clutch disconnects the electric motor from the first drive wheel through the clutch, while the vehicle is traveling.

24. The vehicle driving force control apparatus as recited in claim 23, wherein the clutch connection control section is further configured to increase the prescribed drive torque value, when the electric power supplying capacity detected by the electric power supplying status detecting section is smaller than a prescribed capacity value.

25. The vehicle driving force control apparatus as recited in claim 23, wherein the electric power supplying status detecting section includes an acceleration instruction detecting section configured to detect an acceleration command amount; and the clutch connection control section is further configured to increase the prescribed drive torque value, based on detecting that the acceleration command amount detected by the acceleration instruction detecting section is no greater than a prescribed acceleration command value.

26. The vehicle driving force control apparatus as recited in claim 23, wherein the electric power supplying status detecting section includes a gear ratio detecting section configured to detect a gear ratio of a transmission of the vehicle installed between the internal combustion engine and the second drive wheel; and the clutch connection control section is further configured to increase the prescribed drive torque value, based on detecting that the gear ratio detected by the gear ratio detecting section is no greater than a prescribed gear ratio value.

27. The vehicle driving force control apparatus as recited in claim 24, wherein the electric power supplying status detecting section includes an acceleration slippage detection section configured to detect an acceleration slippage amount in the second drive wheel; and the clutch connection control section is further configured to increase the prescribed drive torque value, as the acceleration slippage amount becomes smaller as detected by the acceleration slippage detection section.

28. The vehicle driving force control apparatus as recited in claim 21, further comprising a clutch connection control section configured to engage the clutch to connect the drive torque of the electric motor to the first drive wheel when the vehicle is in a multi-wheel drive mode in which at least the first drive wheel driven by the electric motor connected through the clutch is driven and at least one other drive wheel is driven by a drive source not connected by the clutch, and release the clutch to disconnect the electric motor from the first drive wheel when the vehicle is in a non-all wheel drive mode; and the electric motor torque control section being further configured to control the control torque command of the electric motor by setting the drive torque of the electric motor to decrease during shifting from the multi-wheel drive mode to the non-all wheel drive mode, based on the electric power supplying capacity detected by the electric power supplying status detecting section.

29. The vehicle driving force control apparatus as recited in claim 28, wherein the electric motor torque control section is further configured to decrease the drive torque at a faster rate, when the electric power supplying capacity detected by the electric power supplying status detecting section is at least below a prescribed capacity value.

30. The vehicle driving force control apparatus as recited in claim 28, wherein the electric power supplying status detecting section includes an acceleration instruction detecting section configured to detect an accelerator instruction command amount; and the electric motor torque control section is further configured to decrease the drive torque at a faster rate, as the accelerator instruction command amount detected by the acceleration instruction detecting section becomes smaller.

31. The vehicle driving force control apparatus as recited in claim 28, wherein the electric power supplying status detecting section includes a gear ratio detecting section configured to detect a gear ratio of a transmission of the vehicle operatively connected to the second drive wheel; and the electric motor torque control section is further configured to decrease the drive torque at a faster rate, as the gear ratio detected by the gear ratio detecting section becomes smaller.

32. The vehicle driving force control apparatus as recited in claim 21, further comprising a clutch connection control section configured to engage the clutch to connect the drive torque of the electric motor to the first drive wheel when the vehicle is in a multi-wheel drive mode in which at least the first drive wheel driven by the electric motor connected through the clutch is driven and at least one other drive wheel is driven by a drive source not connected by the clutch, and release the clutch to disconnect the electric motor from the first drive wheel when the vehicle is in a non-all wheel drive mode, the electric motor torque control section configured to control the drive torque of the electric motor to a prescribed clutch release torque prior to the vehicle shifting from the multi-wheel drive mode to the non-all wheel drive mode; and the clutch connection control section being further configured to release the clutch, based on the electric power supplying status detecting section determining that the power source will enter a state of insufficient electric power supplying capacity for the electric motor to deliver the drive torque at an amount that exceeds the prescribed clutch release torque.

33. The vehicle driving force control apparatus as recited in claim 32, wherein the electric power supplying status detecting section is configured to determine the electric power supplying capacity that can be generated based on a maximum voltage that the power source can supply to the electric motor and an induced voltage of the electric motor.

34. The vehicle driving force control apparatus as recited in claim 33, wherein the electric power supplying status detecting section is configured to estimate the induced voltage of the electric motor based on at least one of a rotational speed of the electric motor and a vehicle speed of the vehicle.

35. The vehicle driving force control apparatus as recited in claim 32, wherein the electric power supplying status detecting section is configured to determine the electric power supplying capacity that can be generated based on a rotational speed of a generator of the power source and a vehicle speed of the vehicle.

36. The vehicle driving force control apparatus as recited in claim 32, wherein the electric motor torque control section is configured to control the drive torque of the electric motor to the prescribed clutch release torque such that the prescribed clutch release torque is substantially equal to an output torque of the electric motor to bring a torque at the clutch to substantially zero.

37. The vehicle driving force control apparatus as recited in claim 36, wherein the electric motor torque control section is further configured to maintain the drive torque of the electric motor at the prescribed clutch release torque during a release operation of the clutch.

38. The vehicle driving force control apparatus as recited in claim 32, wherein the electric power supplying status detecting section includes an acceleration instruction detecting section that configured to detect an accelerator instruction command amount;

a torque calculation section configured to set a boundary drive torque for the electric motor by adding a prescribed tolerance torque value to the prescribed clutch release torque; and a tolerance torque adjusting section configured to set the prescribed tolerance torque value to a larger amount as the accelerator instruction command amount detected by the acceleration instruction detecting section becomes larger.

39. The vehicle driving force control apparatus as recited in claim 32, further comprising a clutch engagement prohibiting section configured to prohibit the clutch from engagement when the electric power supplying status detecting section determines that the power source cannot supply sufficient electric power for the electric motor to deliver the drive torque at an amount that exceeds the prescribed clutch release torque.

40. The vehicle driving force control apparatus as recited in claim 1, further comprising:

a drive source configured to transfer a drive torque to the second wheel; and a drive mode selection section configured to select a multi-wheel drive mode in which at least the first and second wheels are driven and a non-all wheel drive mode in which one of the first and second wheels is not driven.

41. The vehicle driving force control apparatus as recited in claim 40, further comprising:
- a clutch operatively disposed in a torque transmission path between the electric motor and the first drive wheel and configured to selectively connect and disconnect the drive torque of the electric motor to the first drive wheel; and
- a clutch release control section configured to output a clutch release command to disengage the clutch when the multi-wheel drive mode is selected by the drive mode selection section.

42. The vehicle driving force control apparatus as recited in claim 41 further comprising
- the clutch release control section being configured to output the clutch release command when the drive torque of the electric motor is no greater than the prescribed threshold torque and the clutch has a clutch-releasing torque at which torque at the clutch is substantially zero.

43. The vehicle driving force control apparatus as recited in claim 41, further comprising
- a clutch connection control section configured to engage the clutch to connect the drive torque of the electric motor to the first drive wheel when the vehicle is in the multi-wheel drive mode, and release the clutch to disconnect the drive torque of the electric motor to the first drive wheel when the vehicle is in the non-all wheel drive mode, and
- the clutch connection control section including a target motor torque determining section configured to determine a prescribed drive torque value for releasing the clutch based on the electric power supplying capacity detected by the electric power supplying status detecting section,
- the electric motor torque control section being further configured to control the control torque command of the electric motor such that the drive torque of the electric motor matches a target drive torque, and
- the clutch connection control section being further configured to release the clutch upon the target drive torque falling below the prescribed drive torque value such that the vehicle shifts to the non-all wheel drive mode in which at least the clutch disconnects the electric motor from the first drive wheel through the clutch, while the vehicle is traveling.

44. The vehicle driving force control apparatus as recited in claim 43, wherein
- the clutch connection control section is further configured to increase the prescribed drive torque value, when the electric power supplying capacity detected by the electric power supplying status detecting section is smaller than a prescribed capacity value.

45. The vehicle driving force control apparatus as recited in claim 43, wherein
- the electric power supplying status detecting section includes an acceleration instruction detecting section configured to detect an acceleration command amount; and
- the clutch connection control section is further configured to increase the prescribed drive torque value, based on detecting that the acceleration command amount detected by the acceleration instruction detecting section is no greater than a prescribed acceleration command value.

46. The vehicle driving force control apparatus as recited in claim 43, wherein
- the electric power supplying status detecting section includes a gear ratio detecting section configured to detect a gear ratio of a transmission of the vehicle installed between the drive source and the second drive wheel; and
- the clutch connection control section is further configured to increase the prescribed drive torque value, based on detecting that the gear ratio detected by the gear ratio detecting section is no greater than a prescribed gear ratio value.

47. The vehicle driving force control apparatus as recited in claim 44, wherein
- the electric power supplying status detecting section includes an acceleration slippage detection section configured to detect an acceleration slippage amount in the second drive wheel; and
- the clutch connection control section is further configured to increase the prescribed drive torque value, as the acceleration slippage amount becomes smaller as detected by the acceleration slippage detection section.

48. The vehicle driving force control apparatus as recited in claim 41, further comprising
- a clutch connection control section configured to engage the clutch to connect the drive torque of the electric motor to the first drive wheel when the vehicle is in the multi-wheel drive mode, and release the clutch to disconnect the drive torque of the electric motor to the first drive wheel when the vehicle is in the non-all wheel drive mode, and
- the electric motor torque control section being further configured to control the control torque command of the electric motor by setting the drive torque of the electric motor to decrease during shifting from the multi-wheel drive mode to the non-all wheel drive mode, based on the electric power supplying capacity detected by the electric power supplying status detecting section.

49. The vehicle driving force control apparatus as recited in claim 48, wherein
- the electric motor torque control section is further configured to decrease the drive torque at a faster rate, when the electric power supplying capacity detected by the electric power supplying status detecting section is at least below a prescribed capacity value.

50. The vehicle driving force control apparatus as recited in claim 48, wherein
- the electric power supplying status detecting section includes an acceleration instruction detecting section configured to detect an accelerator instruction command amount; and
- the electric motor torque control section is further configured to decrease the drive torque at a faster rate, as the accelerator instruction command amount detected by the acceleration instruction detecting section becomes smaller.

51. The vehicle driving force control apparatus as recited in claim 48, wherein
- the electric power supplying status detecting section includes a gear ratio detecting section configured to detect a gear ratio of a transmission of the vehicle installed between the drive source and the second drive wheel; and
- the electric motor torque control section is further configured to decrease the drive torque at a faster rate, as the gear ratio detected by the gear ratio detecting section becomes smaller.

52. The vehicle driving force control apparatus as recited in claim 41, further comprising a clutch connection control section configured to engage the clutch to connect the drive torque of the electric motor to the first drive wheel when the vehicle is in the multi-wheel drive mode, and release the clutch to disconnect the drive torque of the electric motor to the first drive wheel when the vehicle is in the non-all wheel drive mode, and the electric motor torque control section configured to control the drive torque of the electric motor to a prescribed clutch release torque prior to the vehicle shifting from the multi-wheel drive mode to the non-all wheel drive mode; and the clutch connection control section being further configured to release the clutch, based on the electric power supplying status detecting section determining that the power source will enter a state of insufficient electric power supplying capacity for the electric motor to deliver the drive torque at an amount that exceeds the prescribed clutch release torque.

53. The vehicle driving force control apparatus as recited in claim 52, wherein the electric power supplying status detecting section is configured to determine the electric power supplying capacity that can be generated based on a maximum voltage that the power source can supply and an induced voltage of the electric motor.

54. The vehicle driving force control apparatus as recited in claim 53, wherein the electric power supplying status detecting section is configured to estimate the induced voltage of the electric motor based on at least one of a rotational speed of the electric motor and a vehicle speed of the vehicle.

55. The vehicle driving force control apparatus as recited in claim 52, wherein the electric power supplying status detecting section is configured to determine the electric power supplying capacity that can be generated based on a rotational speed of a generator of the power source and a vehicle speed of the vehicle.

56. The vehicle driving force control apparatus as recited in claim 52, wherein the electric motor torque control section is configured to control the drive torque of the electric motor to the prescribed clutch release torque such that the prescribed clutch release torque is substantially equal to an output torque of the electric motor to bring a torque at the clutch to substantially zero.

57. The vehicle driving force control apparatus as recited in claim 56, wherein the electric motor torque control section is further configured to maintain the drive torque of the electric motor at the prescribed clutch release torque during a release operation of the clutch.

58. The vehicle driving force control apparatus as recited in claim 52, wherein the electric power supplying status detecting section includes an acceleration instruction detecting section that configured to detect an accelerator instruction command amount;

a torque calculation section configured to set a boundary drive torque for the electric motor by adding a prescribed tolerance torque value to the prescribed clutch release torque; and a tolerance torque adjusting section configured to set the prescribed tolerance torque value to a larger amount as the accelerator instruction command amount detected by the acceleration instruction detecting section becomes larger.

59. The vehicle driving force control apparatus as recited in claim 52, further comprising a clutch engagement prohibiting section configured to prohibit the clutch from engagement when the electric power supplying status detecting section determines that the power source cannot supply sufficient electric power for the electric motor to deliver the drive torque at an amount that exceeds the prescribed clutch release torque.

60. The vehicle driving force control apparatus as recited in claim 40, wherein the drive source includes an internal combustion engine configured to drive the second drive wheel, and the power source includes a generator driven by the internal combustion engine and operatively coupled to the electric motor.

61. The vehicle driving force control apparatus as recited in claim 60, wherein the electric motor torque control section cooperates with a drive torque determining section and a field current control section to control the control torque command of the electric motor, the drive torque determining section being configured to determine whether the drive torque of the electric motor is at most equal to a prescribed threshold torque; and the field current control section being configured to adjust the control torque command of the electric motor based on the power supplying condition determined by reducing a field current of the electric motor toward a prescribed field current limit value at a reduction rate, when the drive torque determining section determines that the drive torque of the electric motor is no greater than the prescribed threshold torque, the field current control section being further configured to set the reduction rate to a larger value as the electric power supplying capacity of the internal combustion engine is estimated to become smaller.

62. The vehicle driving force control apparatus as recited in claim 61, wherein the electric power supplying status detecting section includes an acceleration instruction detecting section that detects an acceleration command amount; and the electric power supplying status detecting section is further configured to estimate the electric power supplying capacity limit based on the acceleration command amount detected by the acceleration instruction detecting section such that the electric power supplying capacity limit is estimated to be smaller as the acceleration command amount detected by the acceleration instruction detecting section becomes smaller.

63. The vehicle driving force control apparatus as recited in claim 60, wherein the electric motor torque control section cooperates with a field current control section, a gear ratio detecting section and a field current correcting section to control the control torque command of the electric motor, the field current control section being configured to control a field current of the electric motor, the gear ratio detecting section being configured to detect a gear ratio of a transmission of the vehicle that is operatively connected to the second drive wheel, and the field current correcting section configured to adjust the control torque command of the electric motor based on the power supplying condition determined by changing the field current to a smaller field current value, when the electric power supplying status detecting section determines based on the gear ratio that the power source will enter a state of insufficient electric power supplying capacity for the electric motor to deliver a target torque.

64. The vehicle driving force control apparatus as recited in claim 63, wherein the electric power supplying status detecting section is further configured to determine that the generator will enter the state of insufficient power generation, based on detecting that the gear ratio detected by the gear ratio detecting section falls below a prescribed gear ratio.

65. The vehicle driving force control apparatus as recited in claim 63, further comprising an electric motor rotational speed detecting section configured to detect a rotational speed of the electric motor, and the field current correcting section being further configured to correct the field current controlled by the field current control section by calculating an electric motor field current target value based on the electric motor rotational speed detected by the electric motor rotational speed detecting section.

66. The vehicle driving force control apparatus as recited in claim 65, wherein the field current correcting section is further configured to correct the field current controlled by the field current control section to the smaller field current value by multiplying the electric motor field current target value by a correction coefficient that is less than one, when the gear ratio falls below the prescribed gear ratio.

67. A vehicle driving force control apparatus of a vehicle provided with at least one first drive wheel, and a second drive wheel driven independently of the first drive wheel, the driving force control apparatus comprising:

electric power supply means for supplying electric power;

electric driving means for transferring a drive torque to the first drive wheel based on the electric power from the electric power supply means;

electric power supplying status detecting means for determining an electric power supplying capacity of the electric power supply means based on a power supplying condition of the electric power supply means; and electric motor torque control means for controlling a control torque command of the electric driving means such that a target motor torque is limited based on the power supplying capacity determined by the electric power supplying status detecting means.

68. A method of controlling a vehicle driving force of a vehicle provided with at least one first drive wheel, and a second drive wheel driven independently of the first drive wheel, the method comprising:

supplying electric power from a power source to an electric motor;

transferring a drive torque to the first drive wheel based on the electric power supplied to the electric motor from the power source;

determining an electric power supplying capacity of the power source based on a power supplying condition of the power source; and controlling a control torque command of the electric motor to limit a target motor torque based on the electric power supplying capacity of the power source.

* * * * *